US012771183B2

(12) United States Patent
Huh et al.

(10) Patent No.: US 12,771,183 B2

(45) Date of Patent: Oct. 20, 2026

(54) ELECTRONIC DEVICE COMPRISING WIRELESS CHARGING CIRCUIT

(71) Applicant: SAMSUNG ELECTRONICS CO., LTD., Suwon-si (KR)

(72) Inventors: Jaeyoung Huh, Suwon-si (KR); Sungchul Park, Suwon-si (KR); Hyunsub Park, Suwon-si (KR); Jonghoon Lim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 850 days.

(21) Appl. No.: 18/104,472

(22) Filed: Feb. 1, 2023

(65) Prior Publication Data

US 2023/0179029 A1 Jun. 8, 2023

Related U.S. Application Data

(63) Continuation of application No. PCT/KR2022/010804, filed on Jul. 22, 2022.

(30) Foreign Application Priority Data

Jul. 23, 2021 (KR) ........................ 10-2021-0097214

(51) Int. Cl.

*H02J 50/90* (2016.01)
*G06F 1/16* (2006.01)

(Continued)

(52) U.S. Cl.

CPC ............ *H02J 50/90* (2016.02); *G06F 1/1632* (2013.01); *G06F 1/1652* (2013.01); *G06F 1/266* (2013.01);

(Continued)

(58) Field of Classification Search

CPC ...... G06F 1/1632; G06F 1/1652; G06F 1/266; G06F 1/1616; G06F 1/1677;

(Continued)

(56) References Cited

U.S. PATENT DOCUMENTS 9,476,704 B2 * 10/2016 Choi ..................... G06F 1/1677
9,620,985 B2 4/2017 Rosenfeld (Continued)

FOREIGN PATENT DOCUMENTS

CN 111864914 A * 10/2020 ............ H02J 7/0031
CN 112510779 A * 3/2021 .......... H02J 7/00032

(Continued)

OTHER PUBLICATIONS

Korean Office Action issued Sep. 22, 2025 in corresponding Korean Patent Application No. 10-2021-0097214 and English-language translation.

(Continued)

*Primary Examiner* — Jared Fureman

(74) *Attorney, Agent, or Firm* — Nixon & Vanderhye P.C.

(57) ABSTRACT

An electronic device according to various embodiments of the disclosure may include: a housing, a wireless charging circuit, and at least one processor electrically connected to the wireless charging circuit, the housing may include a first portion and a second portion, the second portion may change in a position relative to the first portion based on a state of the electronic device, and the at least one processor may be configured to: control the wireless charging circuit to receive first power from a power supply device through a first magnetic field having a first center and control the wireless charging circuit to receive the first power from the power supply device through a second magnetic field having a second center different from the first center, based on a (Continued)

positional relationship between the first portion and the second portion of the housing.

16 Claims, 37 Drawing Sheets

(51) Int. Cl.
*G06F 1/26* (2006.01)
*H02J 7/90* (2026.01)
*H02J 50/00* (2016.01)
*H02J 50/12* (2016.01)
*H02J 50/40* (2016.01)
*H04M 1/02* (2006.01)

(52) U.S. Cl.
CPC ............ *H02J 7/933* (2026.01); *H02J 50/005* (2020.01); *H02J 50/12* (2016.02); *H02J 50/402* (2020.01); *H04M 1/0216* (2013.01)

(58) Field of Classification Search
CPC ............. H04M 1/0216; H04M 1/0214; H04M 1/0243; H04M 1/0206; H04M 1/0241; G09F 9/301; H02J 50/90; H02J 50/005; H02J 50/12; H02J 50/402; H02J 7/0042
See application file for complete search history.

(56) References Cited

U.S. PATENT DOCUMENTS 10,072,947 B1 * 9/2018 Mantler .................... G01B 7/31
10,164,482 B2 12/2018 Park et al.
10,250,063 B2 * 4/2019 Woo .................... H02J 7/00712
10,498,162 B2 * 12/2019 Lo ........................... H01F 38/14
10,523,276 B2 * 12/2019 Stone ....................... H04B 5/79
10,879,747 B2 12/2020 Hong et al.
10,978,920 B2 * 4/2021 Brooks ................. G06F 1/1632
11,133,706 B2 9/2021 Song et al.
11,437,847 B2 * 9/2022 Kim ...................... H02J 7/0042
11,695,301 B2 * 7/2023 Sun ......................... H02J 50/12 320/108
12,057,620 B2 * 8/2024 Kim ...................... H02J 50/005
12,288,991 B2 * 4/2025 Jang ........................ H02J 50/12
2012/0139358 A1 * 6/2012 Teggatz ................. H04B 5/263 307/104
2014/0253024 A1 * 9/2014 Rautiainen ................ G06F 1/26 320/108
2015/0084589 A1 3/2015 Tsai et al.
2015/0318710 A1 11/2015 Lee et al.
2015/0326053 A1 * 11/2015 Amano ................... H02J 50/10 320/108
2016/0322851 A1 11/2016 Yeh et al.
2016/0380488 A1 12/2016 Widmer et al.
2017/0126065 A1 5/2017 Park et al.
2018/0006488 A1 1/2018 Kim et al.
2019/0110567 A1 4/2019 Brzezinski et al.
2020/0333836 A1 * 10/2020 Kim .................... G06F 3/03545
2021/0083523 A1 3/2021 Olgun et al.
2021/0099019 A1 4/2021 Lee et al.
2021/0313844 A1 10/2021 Oh et al.
2023/0006470 A1 * 1/2023 Jang ........................ H02J 50/70
2024/0088722 A1 * 3/2024 Wu ....................... H02J 50/402

FOREIGN PATENT DOCUMENTS

JP 2015198570 11/2015
JP 6499879 4/2019
KR 10-2013-0127386 11/2013
KR 10-2015-0063933 6/2015
KR 10-2016-0077933 7/2016
KR 10-2017-0013550 2/2017
KR 10-2018-0108317 10/2018
KR 10-2020-0028729 A 3/2020
KR 102121102 6/2020
KR 10-2021-0021246 2/2021
KR 10-2021-0037377 4/2021
KR 10-2022-0062381 5/2022
KR 10-2022-0131713 9/2022
KR 10-2022-0149979 11/2022

OTHER PUBLICATIONS

International Search Report for PCT/KR2022/010804 mailed Nov. 8, 2022, 6 pages.
Written Opinion of the ISA for PCT/KR2022/010804 mailed Nov. 8, 2022, 3 pages.
Korean Notice of Allowance dated Jul. 10, 2026 for KR Application No. 10-2021-0097214.

* cited by examiner

ELECTRONIC DEVICE COMPRISING WIRELESS CHARGING CIRCUIT

CROSS-REFERENCE TO RELATED APPLICATIONS

This application is a continuation of International Application No. PCT/KR2022/010804 designating the United States, filed on Jul. 22, 2022, in the Korean Intellectual Property Receiving Office and claiming priority to Korean Patent Application No. 10-2021-0097214, filed on Jul. 23, 2021, in the Korean Intellectual Property Office, the disclosures of which are incorporated by reference herein in their entireties.

BACKGROUND

Field

The disclosure relates to an electronic device including a wireless charging circuit.

Description of Related Art

Recently released electronic devices may provide wireless charging through a wireless charging circuit. Electronic devices including a wireless charging circuit may receive power for a battery through a wireless charging pad without a wired connection, and a wireless charging pad capable of fast charging is also emerging in line with the development of RF technology. Such wireless charging may enhance convenience for users of electronic devices.

Wireless charging method of an electronic device may include a magnetic induction method and a magnetic resonance method. The magnetic resonance method has a relatively long charging distance compared to the magnetic induction method, and may charge a plurality of electronic devices at the same time.

In order for the power supply device to wirelessly charge an electronic device in a magnetic resonance method, the power supply device may transmit power to the wireless charging coil of the electronic device using a charging coil in the power supply device. In this case, the center of the charging coil in the power supply device and the center of the wireless charging coil of the electronic device may be misaligned depending on the mounting state of the electronic device, so transmission efficiency of power transmitted to the electronic device may deteriorate. For example, in the case of a foldable electronic device, a housing may include a first portion, a second portion, and a hinge structure for connecting the second portion to the first portion so as to rotate about a first axis as a center. The centers of the charging coil of the power supply device and the wireless charging coil of the foldable electronic device may be misaligned depending on the positional relationship (e.g., a folding angle) between the second portion including the wireless charging coil and the first portion, so transmission efficiency of power transmitted to the foldable electronic device may deteriorate.

SUMMARY

Embodiments of the disclosure may determine a wireless charging coil to receive power transmitted from the power supply device based on a positional relationship between the power supply device and the electronic device.

An electronic device according to various example embodiments of the disclosure may include: a housing, a wireless charging circuit, and at least one processor electrically connected to the wireless charging circuit, the housing may include: a first portion and a second portion, wherein the second portion may change in a position relative to the first portion based on the state of the electronic device, and the at least one processor may be configured to: control the wireless charging circuit to receive first power from a power supply device through a first magnetic field having a first center and control the wireless charging circuit to receive the first power from the power supply device through a second magnetic field having a second center different from the first center, based on a positional relationship between the first portion and the second portion of the housing, based on relative positions of the power supply device and the first portion of the housing being fixed.

According to various example embodiments of the disclosure, a method of operating an electronic device including a housing that includes a first portion and a second portion connected to the first portion may include: controlling a wireless charging circuit of the electronic device to receive first power from a power supply device based on a first magnetic field having a first center, and controlling the wireless charging circuit to receive the first power from the power supply device based on a second magnetic field having a second center different from the first center and based on a positional relationship between the first portion and the second portion of the housing, based on relative positions of the power supply device and the first portion of the housing being fixed.

According to various example embodiments of the disclosure, the electronic device may receive power through a wireless charging coil capable of reducing misalignment of a center with the charging coil of the power supply device, thereby securing the efficiency of power transmission from the power supply device.

In addition, according to various example embodiments, the electronic device may display a guide on a display of the electronic device when the amount of power received from the power supply device is less than threshold power to reduce or prevent deterioration of the charging efficiency of the electronic device.

In addition, various effects that are directly or indirectly recognized through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described in greater detail with reference to the accompanying drawings. However, this is not intended to limit the disclosure to specific embodiments, and it should be understood that various modifications, equivalents, and/or alternatives of the embodiments of the disclosure are included.

Figure 1:
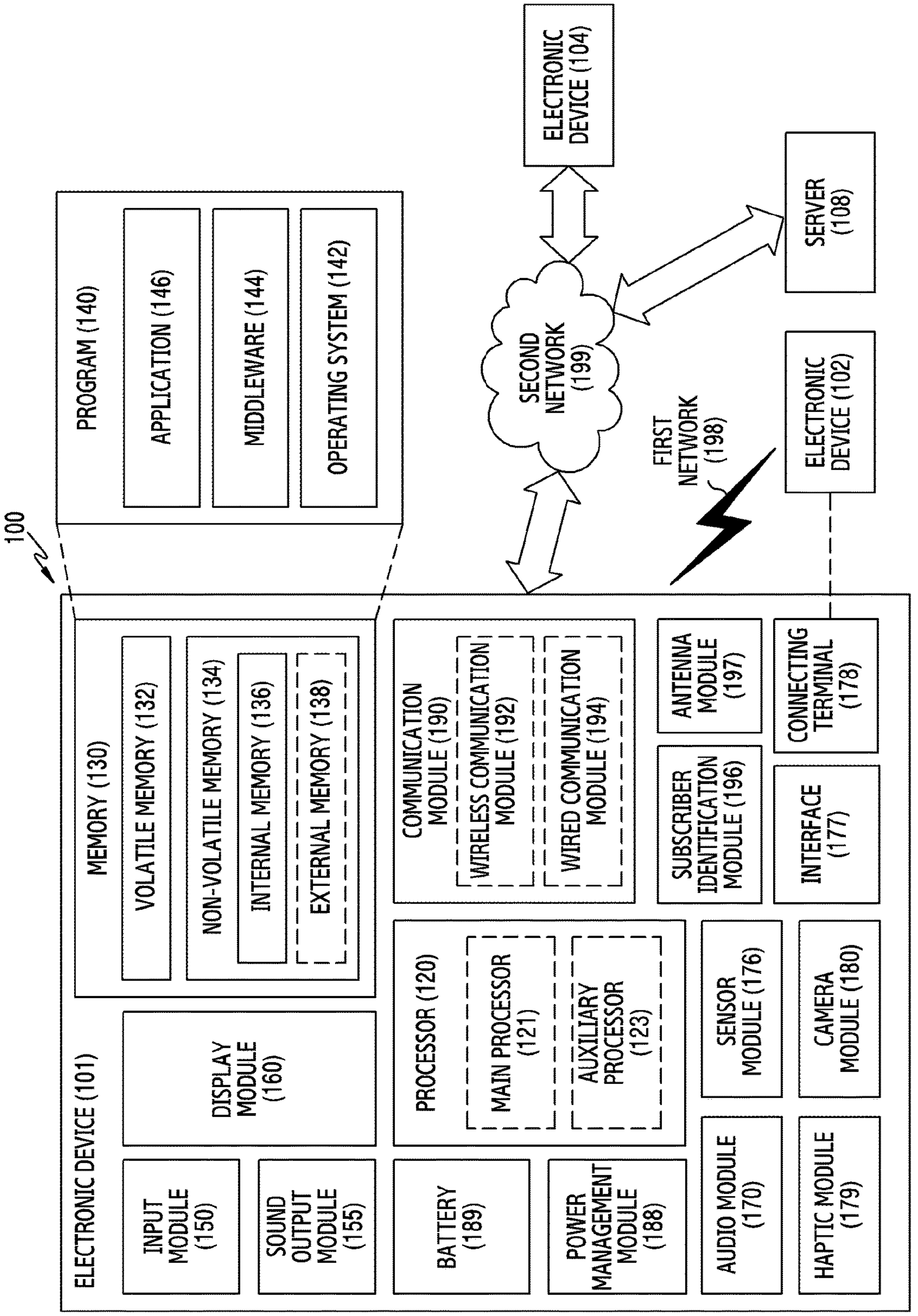
FIG. 1 is a diagram illustrating an electronic device in a network environment according to an embodiment.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
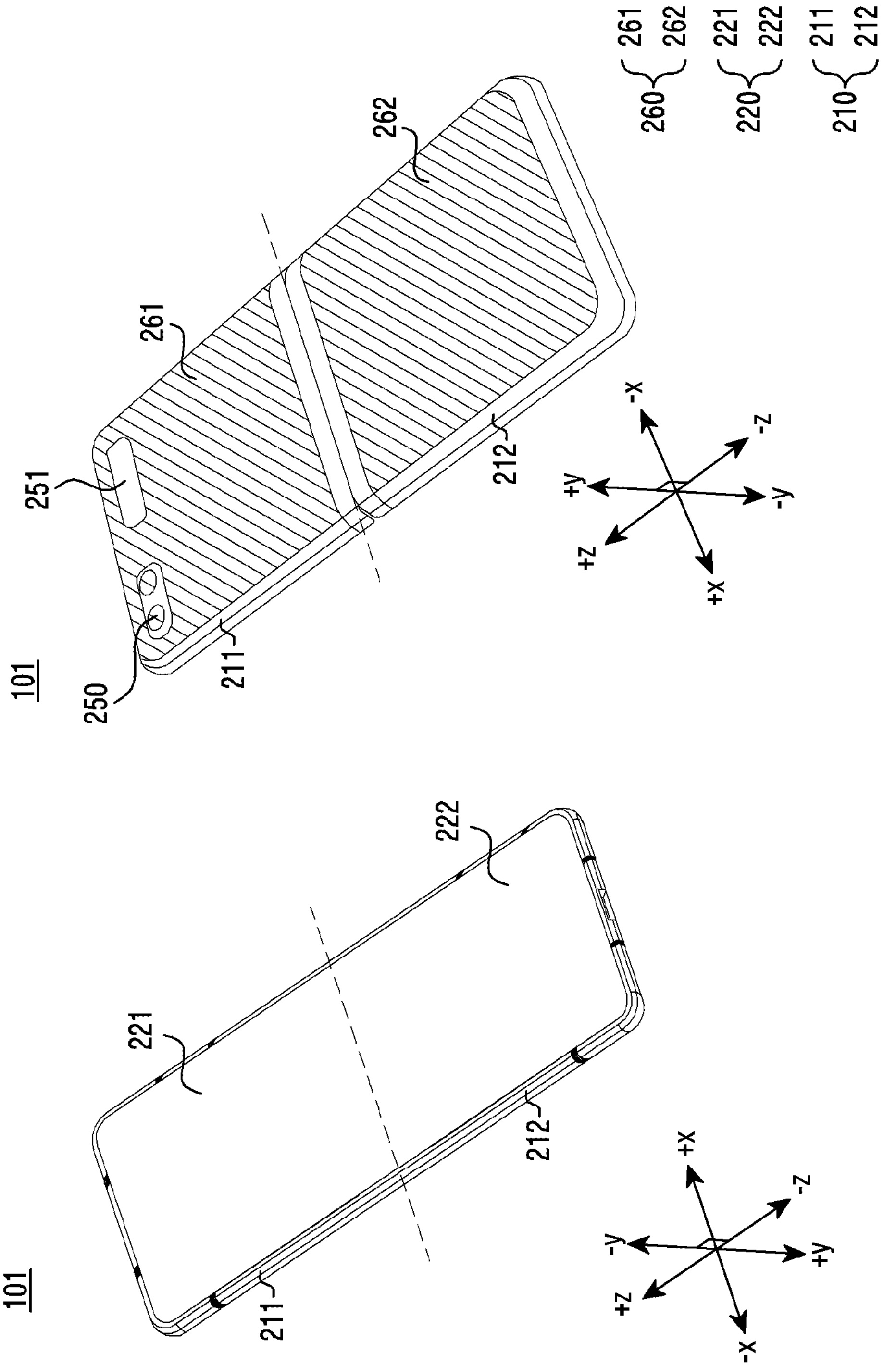
FIG. 2A are perspective views illustrating the front and rear of an electronic device in an unfolded state according to an embodiment.

FIG. 2A includes perspective views illustrating the front and rear of an electronic device in an unfolded state according to various embodiments.

Referring to FIG. 2A, an electronic device 101 according to an embodiment may include a housing 210, a flexible display 220 disposed on the housing 210, and/or a rear cover 260. In the disclosure, the surface on which the flexible display 220 is disposed may be referred to as a front surface of the electronic device 101. In addition, the opposite surface of the front surface may be referred to as a rear surface of the electronic device 101. Further, the surface surrounding a space between the front surface and the rear surface may be referred to as a side surface of the electronic device 101.

In an embodiment, the housing 210 may include a first portion 211 and a second portion 212. The first portion 211 and the second portion 212 may form a portion of the rear surface and at least a portion of the side surface of the electronic device 101. In an embodiment, the first portion 211 and/or the second portion 212 may include a conductive material (e.g., a metal).

According to an embodiment, the rear cover 260 may be coupled to the housing 210 to form the rear surface of the electronic device 101. For example, a first rear cover 261 may be coupled to the first portion 211, and the second rear cover 262 may be coupled to the second portion 212. In an example, the first portion 211 and the first rear cover 261, and the second portion 212 and the second rear cover 262 may form at least a portion of the rear surface of the electronic device 101. In an embodiment, although the housing 210 of the electronic device 101 has been described as a configuration separated from the rear cover 260, in an embodiment, the housing 210 may be integrally formed with the rear cover 260.

In an embodiment, the rear cover 260 may include an insulating material (e.g., plastic resin). In an embodiment, the rear cover 260 may include a conductive material (e.g., aluminum).

According to an embodiment, the first portion 211 and the second portion 212 may be disposed on both sides of a folding axis (e.g., a first axis), as a center, parallel to the x-axis and have an overall symmetrical shape with respect to the folding axis (e.g., the first axis). However, not limited to a symmetrical shape, the first portion 211 and the second portion 212 may have an asymmetrical shape with respect to the folding axis (e.g., the first axis).

According to an embodiment, the electronic device 101 may be in an unfolded state, a folded state, and/or an intermediate state. In an embodiment, the state of the electronic device 101 may vary depending on an angle or distance between the first portion 211 and the second portion 212. For example, the state in which the first portion 211 and the second portion 212 are disposed at an angle of 180 degrees may be an unfolded state.

As another example, the state in which the first portion 211 and the second portion 212 are disposed to face each other may be a folded state. As another example, the state in which the first portion 211 and the second portion 212 are disposed to have a certain angle therebetween may be an intermediate state. However, a specific angle formed between the first portion 211 and the second portion 212 in the folded state and in the unfolded state are provided for convenience of description, and the disclosure is not limited thereto.

In an embodiment, at least a portion of the first portion 211 and the second portion 212 is formed of a metal material (e.g., aluminum) or a non-metal material having a rigidity selected to support the flexible display 220.

In an embodiment, the housing 210, the rear cover 260, and the flexible display 220 may form an inner space in which various components (e.g., a printed circuit board or the battery 189 in FIG. 1) of the electronic device 101 may be disposed.

According to an embodiment, the flexible display 220 may be disposed in the housing 210. For example, the flexible display 220 may be seated on a recess formed by the housing 210 and form most of the front surface of the electronic device 101. In an embodiment, the flexible display 220 may include a first area 221 and a second area 222. The first area 221 and the second area 222 of the flexible display 220 may be divided by a first axis, as a center, about which the electronic device 101 is folded or unfolded. The area division of the flexible display 220 illustrated in FIG. 2A is only an example, and in an embodiment, the flexible display 220 may be divided into two or more areas according to a structure or function. For example, the flexible display 220 may be divided into a folding area having a predetermined curvature when the electronic device 101 is folded about the folding axis (e.g., the first axis) as a center, a first area, based on the folding area, adjacent to the first portion 211, and a second area adjacent to the second portion 212. The first area 221 and the second area 222 may have an overall symmetrical shape with respect to the folding axis (e.g., the first axis).

According to an embodiment, the arrangement structure of the first area 221 and the second area 222 of the flexible display 220 may vary depending on the state of the electronic device 101. For example, when the electronic device 101 is in the unfolded state, the first area 221 and the second area 222 of the flexible display 220 may form an angle of 180 degrees therebetween and may be directed in the same direction (e.g., the −y direction).

As another example, when the electronic device 101 is in the folded state, the first area 221 and the second area 222 of the flexible display 220 may form a narrow angle (e.g., between 0 degrees and 10 degrees) and may face each other. As another example, when the electronic device 101 is in the intermediate state, the first area 221 and the second area 222 of the flexible display 220 may form an angle that is larger than that in the folded state and less than that in the unfolded state. In this case, at least a portion of the flexible display 220 may be formed of a curved surface having a predetermined curvature, and the curvature may be less than that in the folded state.

However, the specific angles formed between the first area 221 and the second area 222 in the folded state and in the unfolded state are provided for convenience of description and the disclosure is not limited thereto.

According to an embodiment, the electronic device 101 may include a camera hole 250 and/or a sub-display 251. In an embodiment, the camera hole 250 may correspond to a hole through which at least one lens of the camera module 180 is exposed. Light may be incident to the camera module 180 disposed inside the electronic device 101 from the outside of the electronic device 101 through the camera hole 250. In an embodiment, when the electronic device 101 is in the folded state, the sub-display 251 may display a specified object (e.g., the current time or the remaining battery level of the electronic device 101).

Figure 2B:
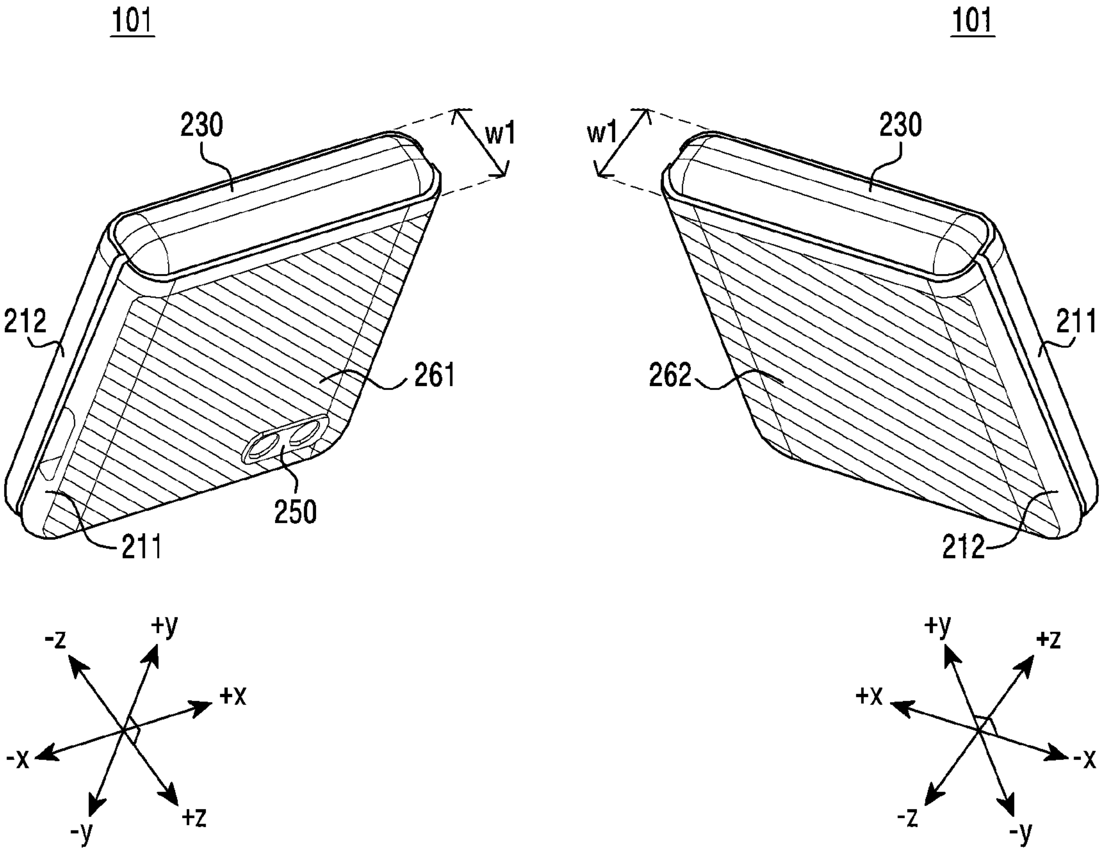
FIG. 2B are perspective views illustrating an electronic device in a folded state according to an embodiment.

FIG. 2B includes perspective views illustrating an electronic device in a folded state according to an embodiment.

Referring to FIG. 2B, an electronic device 101 according to an embodiment may include a hinge cover 230. The hinge cover 230 may be disposed between the first portion 211 and the second portion 212 to cover internal components (e.g., a hinge structure).

In an embodiment, at least a portion of the hinge cover 230 may be covered by a portion of the first portion 211 and the second portion 212 or may be exposed to the outside depending on the state of the electronic device 101. For example, when the electronic device 101 is in the unfolded state, the hinge cover 230 may covered by the first portion 211 and the second portion 212 so as not to be exposed. As another example, when the electronic device 101 is in the folded state, the hinge cover 230 may be exposed to the outside by a first width w1 between the first portion 211 and the second portion 212. As another example, in the intermediate state in which the first portion 211 and the second portion 212 are folded at a certain angle, the hinge cover 230 may be partially exposed to the outside between the first portion 211 and the second portion 212. However, the width of the portion of the hinge cover 230 exposed to the outside in the intermediate state may be less than the width (e.g., the first width w1) exposed to the outside in the folded state. In an embodiment, the hinge cover 230 may include a curved surface. In an embodiment, the hinge cover 230 may include a conductive material (e.g., aluminum).

FIGS. 2A and 2B illustrate an electronic device 101 according to an example embodiment to which the disclosure is applied, and the electronic device to which the disclosure is applied is not limited to the electronic device 101 illustrated in FIGS. 2A and 2B and may be applied to a variety of form factors (e.g., a bar type and a slidable type).

Figure 3A:
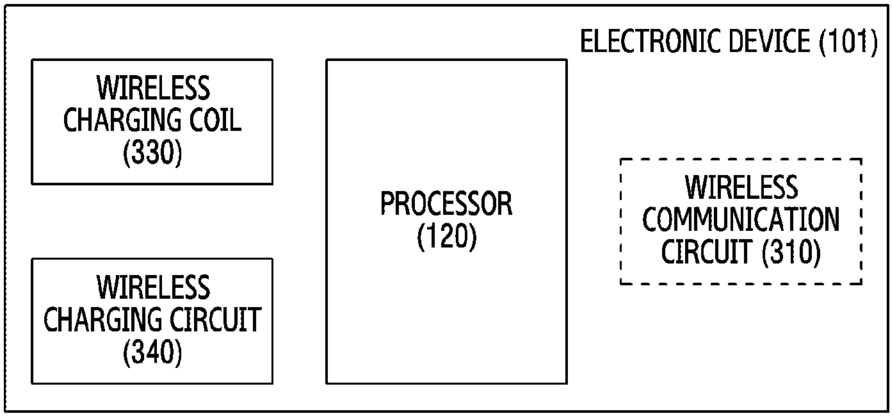
FIG. 3A is a block diagram illustrating an example configuration of an electronic device according to an embodiment.

FIG. 3A is a block diagram illustrating an example configuration of an electronic device according to an embodiment.

Referring to FIG. 3A, an electronic device 101 according to an embodiment may include a wireless communication circuit 310, a processor (e.g., including processing circuitry) 120, a wireless charging coil 330, and/or a wireless charging circuit 340.

According to an embodiment, the wireless communication circuit 310 electrically connected to the processor 120 may establish wireless communication with an external device (e.g., a power supply device). For example, the wireless communication circuit 310 may receive a ping signal for sensing the electronic device 101 from an external device (e.g., a power supply device). Under the control of the processor 120, the wireless communication circuit 310 may transmit feedback to the external device in response to the received ping signal.

According to an embodiment, the wireless charging coil 330 may include at least one wireless charging coil. For example, the wireless charging coil 330 may include a first wireless charging coil and a second wireless charging coil, which will be described later. As another example, the wireless charging coil 330 may include a single wireless charging coil.

According to an embodiment, the processor 120 may be electrically connected to the wireless charging coil 330 and the wireless charging circuit 340, and the processor 120 may include various processing circuitry and control the wireless charging coil 330 through the wireless charging circuit 340 so as to wirelessly charge a battery (e.g., the battery 189 in FIG. 1) of the electronic device 101. For example, an external device (e.g., a power supply device) may transmit power for charging the electronic device 101 in a magnetic resonance method to the electronic device 101. In an example, the processor 120 may receive power from an external device (e.g., a power supply device) by controlling the wireless charging circuit 340 and charge the battery 189 of the electronic device 101 using the power.

Although the wireless charging coil 330 and the wireless charging circuit 340 have been described as separate elements in FIG. 3A, this is for convenience of description and in an embodiment, the wireless charging circuit 340 may be described as a circuit including the wireless charging coil 330 for receiving power from an external device (e.g., a power supply device).

According to an embodiment, the electronic device 101 may use the wireless charging coil 330 for near field communication (NFC). For example, the processor 120 may control the wireless charging coil 330 to be utilized as an NFC antenna radiator for short-range wireless communication using the wireless communication circuit 310.

Figure 3B:
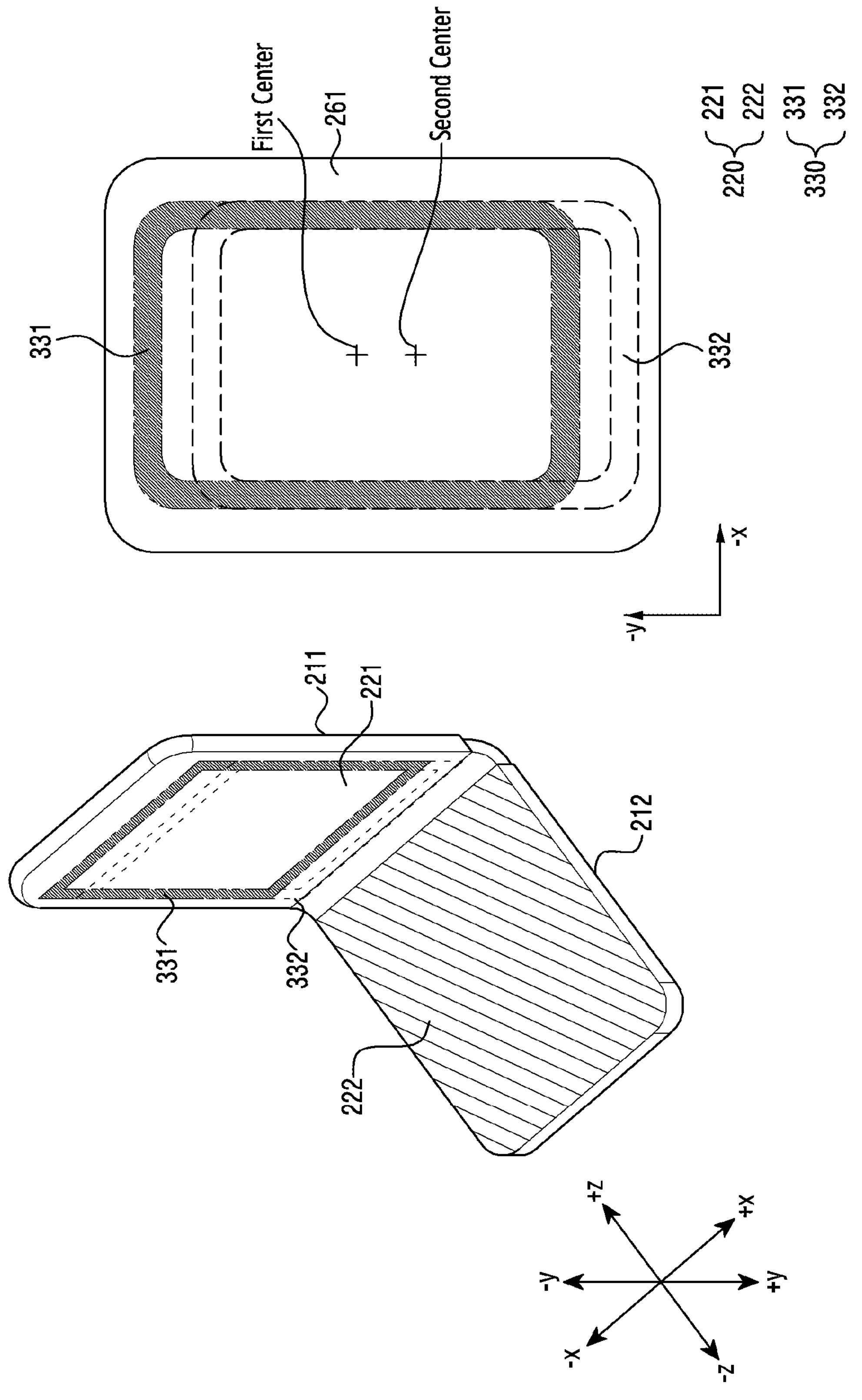
FIG. 3B is a diagram and perspective view illustrating an arrangement structure of a plurality of wireless charging coils according to an embodiment.

FIG. 3B is a diagram illustrating an example arrangement structure of a plurality of wireless charging coils according to an embodiment.

Referring to FIG. 3B, wireless charging coils 330 according to an embodiment may include a first wireless charging coil 331 and a second wireless charging coil 332. The wireless charging coils 330 may be disposed both in the first portion 211 and in the second portion 212 of the housing 210. For example, the first wireless charging coil 331 and the second wireless charging coil 332 may be disposed in the first portion 211 of the housing 210. In an example, the first wireless charging coil 331 disposed in the first portion 211 may be positioned in a first direction (e.g., the −y direction) with respect to the second wireless charging coil 332 when viewing the first portion 211 of the housing 210. As a result, a first center of the first wireless charging coil 331 may not match a second center of the second wireless charging coil 332. In an embodiment, the first center of the first wireless charging coil 331 may substantially match the center of the magnetic flux generated by the first wireless charging coil 331. Substantially, the first center of the first wireless charging coil 331 may correspond to the center of a first magnetic field formed by the first wireless charging coil 331. Similarly, the second center of the second wireless charging coil 332 may match the center of the magnetic flux generated by the second wireless charging coil 332. Substantially, the second center of the second wireless charging coil 332 may correspond to the center of a second magnetic field formed by the second wireless charging coil 332.

Although the wireless charging coils 330 are illustrated as being disposed in the first portion 211 of the housing 210 in FIG. 3B, this is only an example and the disclosure is not limited thereto, and the wireless charging coils 330 may be variously disposed in the housing 210. For example, the wireless charging coils 330 may be disposed in the second portion 212 of the housing 210. As another example, some of the wireless charging coils 330 may be disposed in the first portion 211 of the housing 210, and the remaining may be disposed in the second portion 212.

Although the first wireless charging coil 331 and the second wireless charging coil 332 are illustrated as being disposed on the first rear cover 261 in FIG. 3B, this is due to the limitations of the drawings, and the first wireless charging coil 331 and the second wireless charging coil 332 are actually disposed in an inner space of the electronic device 101 formed by the flexible display 220 and the housing 210. For example, the first wireless charging coil 331 and the second wireless charging coil 332 may be disposed in the first portion 211 so as to be adjacent to the first rear cover 261. As another example, the first wireless charging coil 331 and the second wireless charging coil 332 may be disposed in the second portion 212 so as to be adjacent to the second rear cover 262.

Figure 4A:
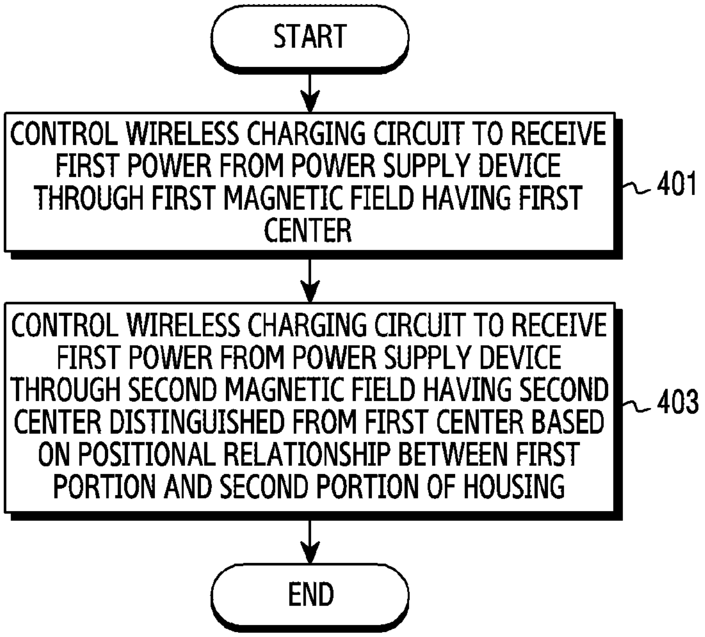
FIG. 4A is a flowchart illustrating an example operation in which an electronic device receives power from a power supply device, based on a positional relationship of a housing, according to an embodiment.

FIG. 4A is a flowchart illustrating an example operation in which an electronic device receives power from a power supply device, based on a positional relationship of a housing, according to an embodiment.

Referring to FIG. 4A, in operation 401, an electronic device 101 according to an embodiment may control the wireless charging circuit 340 to receive first power from a power supply device through a first magnetic field having a first center. In an embodiment, the first magnetic field having the first center may be formed by the first wireless charging coil 331 of the wireless charging coils 330.

According to an embodiment, when the relative positions between the power supply device and the first portion 211 of the housing 210 are fixed, in operation 403, the electronic device 101 may control the wireless charging circuit 340 to receive the first power from the power supply device through a second magnetic field having a second center distinguished from (e.g., different from) the first center, based on a positional relationship between the first portion 211 and the second portion 212 of the housing 210. In an embodiment, the second magnetic field having the second center may be formed in various ways. For example, the second magnetic field may be formed by the second wireless charging coil 332 of the wireless charging coils 330 as will be described in greater detail below with reference to FIG. 4B. As another example, the second magnetic field may be formed as a lumped element (e.g., an inductor) is electrically connected to the first wireless charging coil 331 as will be described in greater detail below with reference to FIG. 4C.

As a result, the electronic device 101 may form a second magnetic field having a second center by connecting an inductor to the first wireless charging coil 331 that forms a first magnetic field having a first center while receiving the first power through the first wireless charging coil 331 or by changing the wireless charging coil for receiving the first power from the first wireless charging coil 331 to the second wireless charging coil 332. In an embodiment, the second center may be further aligned with a third center of a coil for transmitting power in the power supply device, which is an external device, compared to the first center. Accordingly, the electronic device 101 may receive more power from the power supply device. For example, the first center of the first wireless charging coil 331 may be further misaligned with a third center of a coil of the power supply device, which is an external device, compared to the second center. On the other hand, the second center of the second wireless charging coil 332 may be further aligned with the third center of the coil of the power supply device, which is an external device, compared to the first center. Accordingly, the electronic device 101 may receive more power from the power supply device. That the coils are aligned may refer, for example, to when an imaginary line is drawn perpendicular to the coils from the centers of the respective coils, the angle formed between the lines is close to 0 degrees. This will be described in greater detail below with reference to FIG. 6A.

The center of a magnetic field may indicate a center of a magnetic flux. For example, referring to the first wireless charging coil 331 illustrated in FIG. 3B, the center of the magnetic field formed by the first wireless charging coil 331 may indicate the first center of the first wireless charging coil 331. For example, when a current flows through the first wireless charging coil 331, a magnetic flux may be produced in a direction perpendicular to the first wireless charging coil 331. In this case, the center of the magnetic flux may substantially match the first center of the first wireless charging coil 331. As another example, referring to the second wireless charging coil 332 shown in FIG. 3B, the center of the magnetic field formed by the second wireless charging coil 332 may indicate the second center of the second wireless charging coil 332.

Figure 4B:
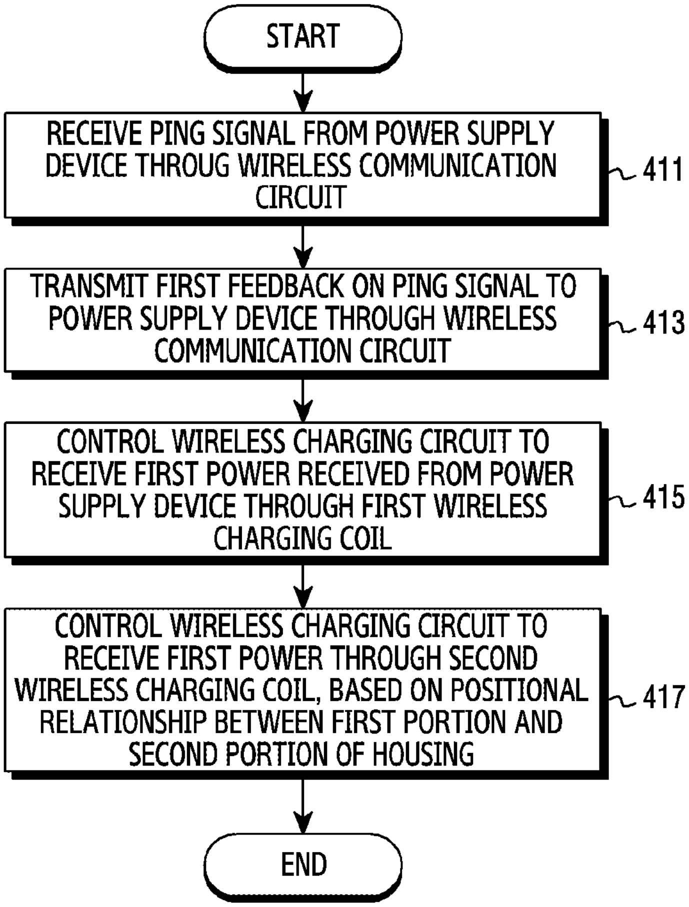
FIG. 4B is a flowchart illustrating an example operation in which an electronic device receives power from a power supply device using a plurality of wireless charging coils, based on a positional relationship between a first portion and a second portion of a housing, according to an embodiment.

FIG. 4B is a flowchart illustrating an example operation in which an electronic device receives power from a power supply device using a plurality of wireless charging coils, based on a positional relationship between a first portion and a second portion of a housing, according to an embodiment.

Referring to FIG. 4B, an electronic device 101 according to an embodiment may receive a ping signal from a power supply device outside the electronic device 101 through the wireless communication circuit 310 in operation 411. In an embodiment, the ping signal transmitted by the power supply device may be a signal for detecting the electronic device 101.

According to an embodiment, in operation 413, the electronic device 101 may transmit first feedback on the ping signal to the power supply device through the wireless communication circuit 310. For example, the processor 120 of the electronic device 101 may transmit the first feedback to the power supply device in response to receiving the ping signal. As the power supply device receives the first feedback, the power supply device may identify the electronic device 101, thereby establishing wireless communication between the power supply device and the electronic device 101.

According to an embodiment, the electronic device 101 may control the wireless charging circuit 340 to receive first power received from the power supply device through the first wireless charging coil 331 in operation 415.

According to an embodiment, the electronic device 101 may control the wireless charging circuit 340 to receive the first power through the second wireless charging coil 332, based on a positional relationship between the first portion 211 and the second portion 212 of the housing 210, in operation 417. The positional relationship between the first portion 211 and the second portion 212 may indicate a positional relationship when the relative positions of the first portion 211 of the housing 210 and the power supply device are fixed. In an embodiment, the 5 positional relationship between the first portion 211 and the second portion 212 may include an angle formed between the first portion 211 and the second portion 212. For example, if the angle between the first portion 211 and the second portion 212 is 45 degrees or less, the electronic device 101 may control the wireless charging circuit 340 to perform reception through the second wireless charging coil 332 of the wireless charging coils 330.

It has been described in FIG. 4B that the electronic device 101 performs control to receive the first power through the second wireless charging coil 332, based on the positional relationship between the first portion 211 and the second portion 212 of the housing 210 (e.g., the folding angle between the first portion 211 and the second portion 212), while the electronic device 101 receives the first power through the first wireless charging coil 331. However, this is for convenience of description, and the electronic device 101 may perform control to receive the first power through the first wireless charging coil 331, based on the positional relationship between the first portion 211 and the second portion 212, while receiving the first power through the second wireless charging coil 332. A criterion for selecting a wireless charging coil for receiving the first power from among the wireless charging coils 330, based on the positional relationship, will be described later in detail with reference to FIG. 9C.

Figure 4C:
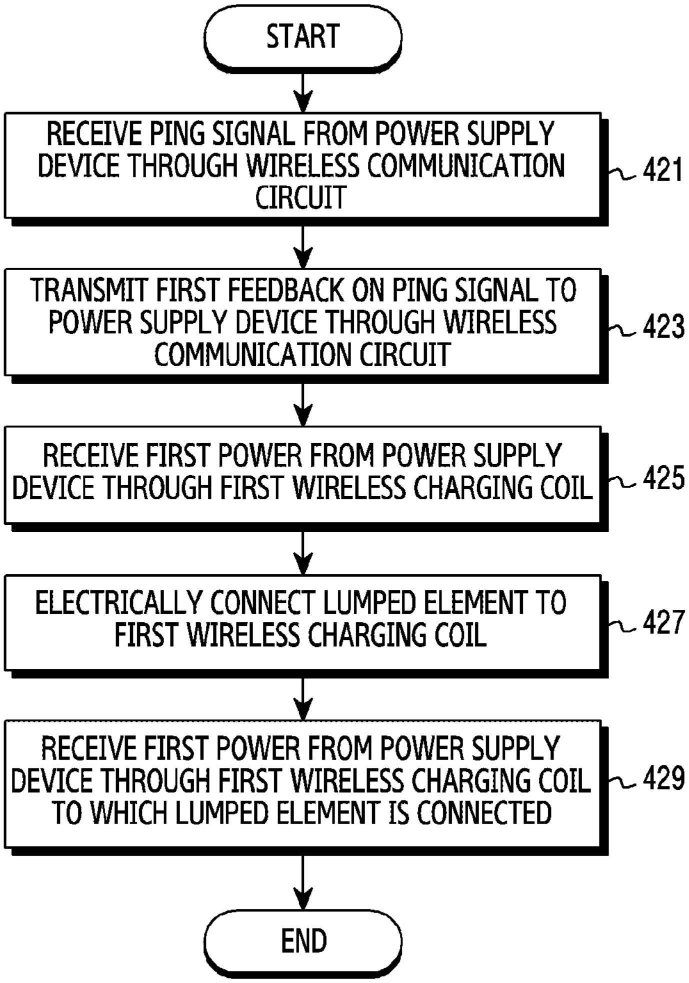
FIG. 4C is a flowchart illustrating an example operation in which an electronic device receives power from a power supply device using a single wireless charging coil, based on a positional relationship between a first portion and a second portion of a housing, according to an embodiment.

FIG. 4C is a flowchart illustrating an example operation in which an electronic device receives power from a power supply device using a single wireless charging coil, based on a positional relationship between a first portion and a second portion of a housing, according to an embodiment.

Referring to FIG. 4C, an electronic device 101 according to an embodiment may receive a ping signal from a power supply device through the wireless communication circuit 310 in operation 421. In an embodiment, the ping signal transmitted by the power supply device may be a signal for detecting the electronic device 101.

According to an embodiment, in operation 423, the electronic device 101 may transmit first feedback on the ping signal to the power supply device through the wireless communication circuit 310. In an embodiment, the first feedback may include information related to the electronic device 101. For example, it may include information about the positional relationship of the housing 210, the number or sizes of the wireless charging coils 330, and/or the type of the electronic device 101.

According to an embodiment, the electronic device 101 may receive first power from the power supply device through the first wireless charging coil 331 in operation 425. In an embodiment, the first power may indicate transmission power transmitted by the power supply device, and, first reception power received by the electronic device 101 may be different from the first power in consideration of transmission efficiency of power.

According to an embodiment, the electronic device 101 may electrically connect a lumped element (e.g., an inductor) to the first wireless charging coil 331 in operation 427. For example, the electronic device 101 may include an inductor and a switch circuit electrically connected to the inductor. The processor 120 may control the switch circuit so that the inductor is electrically connected to the first wireless charging coil 331. As a result, the position of the first center of the first wireless charging coil 331 may be changed through the connection of the inductor. For example, the changed position of the first center may be further aligned with the coil of the power supply device, compared to the unchanged position.

According to an embodiment, in operation 429, the electronic device 101 may receive first power from the power supply device through the first wireless charging coil 331 to which the lumped element is connected. In an embodiment, when the lumped element is connected to the first wireless charging coil 331, the transmission efficiency of power may increase, so second reception power received by the electronic device 101 in operation 429 is may be more than the first reception power. As a result, even if the power supply device transmits substantially the same first power, since the lumped element is connected to the first wireless charging coil 331, the electronic device 101 may receive more power.

In an embodiment, although the description was made based on the first wireless charging coil 331, the description in FIG. 4C may also be applied to the second wireless charging coil 332.

Figure 5:
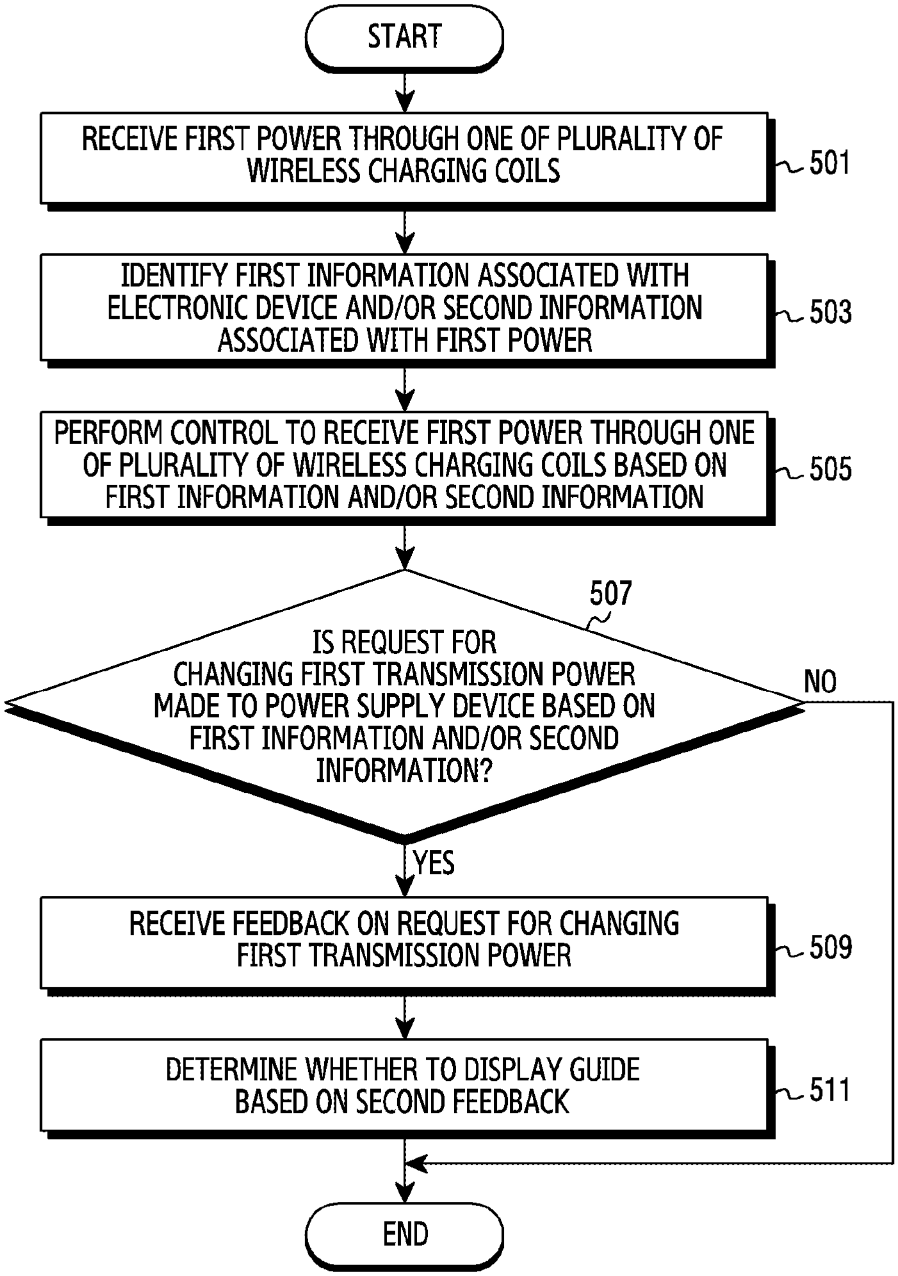
FIG. 5 is a flowchart illustrating an example operation in which an electronic device receives power from a power supply device and requests the power supply device to change transmission power according to an embodiment.

FIG. 5 is a flowchart illustrating an example operation in which an electronic device receives power from a power supply device and requests the power supply device to change transmission power according to an embodiment.

Referring to FIG. 5, the electronic device 101 according to an embodiment may receive first power through one (e.g., the first wireless charging coil 331) of the wireless charging coils 330 in operation 501. Operation 501 may correspond to operation 415 in FIG. 4B.

According to an embodiment, in operation 503, the electronic device 101 may identify first information associated with the electronic device 101 and/or second information associated with the first power. In an embodiment, the first information associated with the electronic device 101 may include at least one of information about the sizes of the wireless charging coils 330, information about the threshold power required to charge the battery 189 of the electronic device 101, information about the type of the electronic device 101 (e.g., bar type, foldable type, or smart watch), a first positional relationship between the housing 210 and the power supply device, and a second positional relationship between the first portion 211 and the second portion 212 of the housing 210. In an embodiment, the first positional relationship between the housing 210 and the power supply device may include a distance and an angle between the housing 210 and the power supply device. For example, the first positional relationship may include a distance and an angle between the first portion 211 of the housing 210 and the power supply device. As another example, the first positional relationship may include a distance and an angle between the second portion 212 of the housing 210 and the power supply device. In an embodiment, since the wireless charging coils 330 are disposed in the first portion 211 and/or the second portion 212 of the housing 210, identifying the first positional relationship between the housing 210 and the power supply device may indicate identifying a positional relationship between the wireless charging coils 330 and coils of the power supply device. As a result, the electronic device 101 may identify the positional relationship between the wireless charging coils 330 and the coils of the power supply device by identifying the first positional relationship. In an embodiment, the second positional relationship between the first portion 211 and the second portion 212 of the housing 210 may include an angle formed between the first portion 211 and the second portion 212. In an embodiment, identifying the second positional relationship may indicate identifying the effect by the conductive portions in the housing 210 when receiving power from the power supply device. For example, in the case where the wireless charging coils 330 are disposed in the first portion 211, a conductive portion (e.g., a substrate of the flexible display 220 or a conductive portion of the second portion 212) disposed in the second portion 212 may affect the wireless charging coils 330 that receive power from the power supply device. In this case, the effect may vary depending on the angle formed between the first portion 211 and the second portion 212 of the housing 210. As a result, the electronic device 101 may identify the effect by the conductive portions in the housing 210 upon receiving power from the power supply device through identifying the second positional relationship. According to an embodiment, the second information associated with the first power received from the power supply device may include information about a coil that is transmitting power to the electronic device 101, among the coils of the power supply device, and/or information about the first transmission power to be transmitted to the electronic device 101. In an embodiment, in the case where the power supply device includes a plurality of charging coils, the information about the coil transmitting power may include information about a charging coil that transmits power to the electronic device 101 among the plurality of charging coils. In an embodiment, the first transmission power may be distinguished from the first power received by the electronic device 101. For example, the first power received by the electronic device 101 may be lower than the first transmission power depending on the transmission efficiency of the first transmission power transmitted to the electronic device 101.

According to an embodiment, in operation 505, the electronic device 101 may perform control to receive the first power through one (e.g., the second wireless charging coil 332) of the wireless charging coils 330, based on the first information and/or the second information. For example, when the angle formed between the first portion 211 and the second portion 212 of the housing 210 is about 180 degrees, the electronic device 101 may perform control to receive the first power through one of the wireless charging coils 330, based on the first information including a positional relationship between the first portion 211 and the second portion 212. The case where the angle between the first portion 211 and the second portion 212 is about 180 degrees may correspond to the case in which the electronic device 101 is substantially in an unfolded state.

According to an embodiment, in operation 507, the electronic device 101 may determine whether to request the power supply device to change the first transmission power, based on the first information and/or the second information. For example, the electronic device 101 may identify first information including information about threshold power and second information including information about the first power received by the electronic device 101, may identify whether the received first power is greater than the threshold power, and, accordingly, determine whether to request the power supply device to change the first transmission power. In an example, based on the determination, the electronic device 101 may request the power supply device to change the first transmission power. In an embodiment, if the electronic device 101 determines that the first power is greater than the threshold power, the electronic device 101 may not request the power supply device to change the first transmission power. In an embodiment, in the case where the electronic device 101 requests changing of the first transmission power, the power supply device may transmit second feedback in response to the request to the electronic device 101.

According to an embodiment, in operation 509, the electronic device 101 may receive the second feedback on the request for changing the first transmission power. For example, the electronic device 101 may receive feedback from the power supply device using the wireless communication circuit 310.

According to an embodiment, the electronic device 101 may determine whether to change a guide of the electronic device 101, based on the second feedback in operation 511. For example, if the second feedback received from the power supply device includes information indicating that the first transmission power is unable to be changed, the electronic device 101 may display a guide on the flexible display 220. The guide may include a user interface that requests changing of the position of the electronic device 101 such that the first power received by the electronic device 101 becomes greater than the threshold power. In an embodiment, the user interface may include text and/or an indicator indicating a direction of movement of a position in which the electronic device is to be moved. As another example, in the case where the second feedback received from the power supply device includes information indicating that the first transmission power is able to be changed, the electronic device 10 may not display a separate guide on the flexible display 220.

Figure 6A:
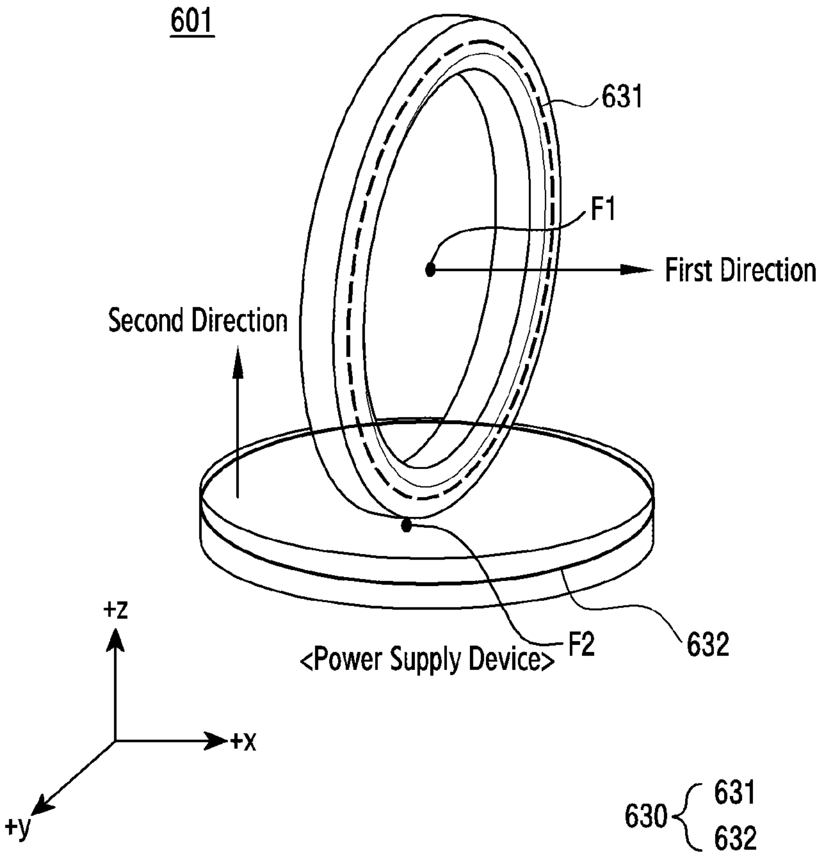
FIG. 6A is a diagram illustrating an example power supply device and charging coils disposed in the power supply device according to an embodiment.

FIG. 6A is a diagram illustrating an example power supply device and charging coils disposed in the power supply device according to an embodiment.

Referring to FIG. 6A, a power supply device 601 according to an embodiment may include charging coils 630, and a first charging coil 631 of the charging coils 630 may have a circular shape and may be disposed inside the power supply device 601 so as to be directed in a first direction (e.g., the +x direction). In addition, a second charging coil 632 of the charging coils 630 may have a substantially circular shape and may be disposed inside the power supply device 601 to be directed in a second direction (e.g., the +z direction). In an embodiment, the first charging coil 631 may have a first charging center F1, and the second charging coil 632 may have a second charging center F2.

However, the form and arrangement of the power supply device 601 is not limited to the form and arrangement shown in FIG. 6A, and may have various forms and arrangements.

The coils of the disclosure being are aligned may refer, for example, to the angle between a first imaginary line perpendicular to the charging coil transmitting power and a second imaginary line perpendicular to the wireless charging coil receiving power being substantially close to 0 degrees. For example, in the case where the power supply device 601 transmits power through the first charging coil 631 and where the electronic device 101 receives power through the first wireless charging coil 331, as the angle formed between a first imaginary line extending from the first charging center F1 of the power supply device 601 in a direction (e.g., a first direction) perpendicular to the first charging coil 631 and a second imaginary line extending from the first center (e.g., the first center in FIG. 3B) of the electronic device 101 in a direction perpendicular to the first wireless charging coil 331 is closer to 0 degrees, the first charging coil 631 and the first wireless charging coil 331 may be regarded as being aligned. As another example, in the case where the power supply device 601 transmits power through the second charging coil 632 and where the electronic device 101 receive power through the first wireless charging coil 331, as the angle between a third imaginary line extending from the second charging center F2 of the power supply device 601 in a direction (e.g., a second direction) perpendicular to the second charging coil 632 and a second imaginary line extending from the first center (e.g., the first center in FIG. 3B) of the electronic device 101 in a direction perpendicular to the first wireless charging coil 331 is closer to 0, the second charging coil 632 and the first wireless charging coil 331 may be regarded as being aligned.

Figure 6B:
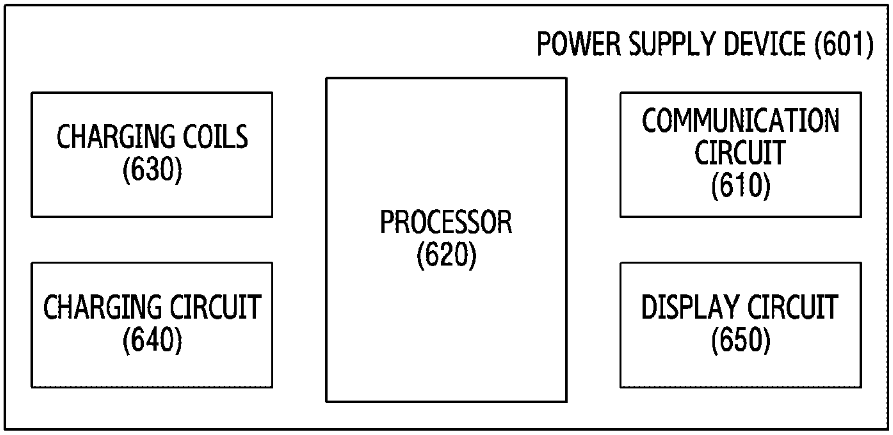
FIG. 6B is a block diagram illustrating an example configuration of a power supply device according to an embodiment.

FIG. 6B is a block diagram illustrating an example configuration of a power supply device according to an embodiment.

Referring to FIG. 6B, a power supply device 601 according to an embodiment may include a communication circuit 610, a processor (e.g., including processing circuitry) 620, charging coils 630, a charging circuit 640, and/or a display circuit 650.

According to an embodiment, the processor 620 may be electrically connected to the communication circuit 610, and the processor 620 may include various processing circuitry and control the communication circuit 610 to establish wireless communication with the electronic device 101. As described above with reference to FIG. 3A, the processor 620 may control the communication circuit 610 to transmit a ping signal for detecting the electronic device 101 and receive a response to the ping signal from the electronic device 101.

According to an embodiment, the processor 620 may control the charging circuit 640 such that at least one of the charging coils 630 transmits a first transmission power for charging the electronic device 101 in a magnetic resonance method. In an embodiment, the processor 620 may control the communication circuit 610 to transmit information about the first transmission power and/or information about the charging coils 630 to the electronic device 101.

According to an embodiment, the processor 620 may control the display circuit 650 to display a guide for charging around the power supply device 601. In an embodiment, the display circuit 650 may include a light-emitting circuit including a light-emitting diode (LED) circuit. The guide may be displayed in various forms. For example, the guide may be displayed in a circular, oval, or rectangular shape around the power supply device 601. As another example, turning on/off the guide may be repeated for a specified time.

Figure 7:
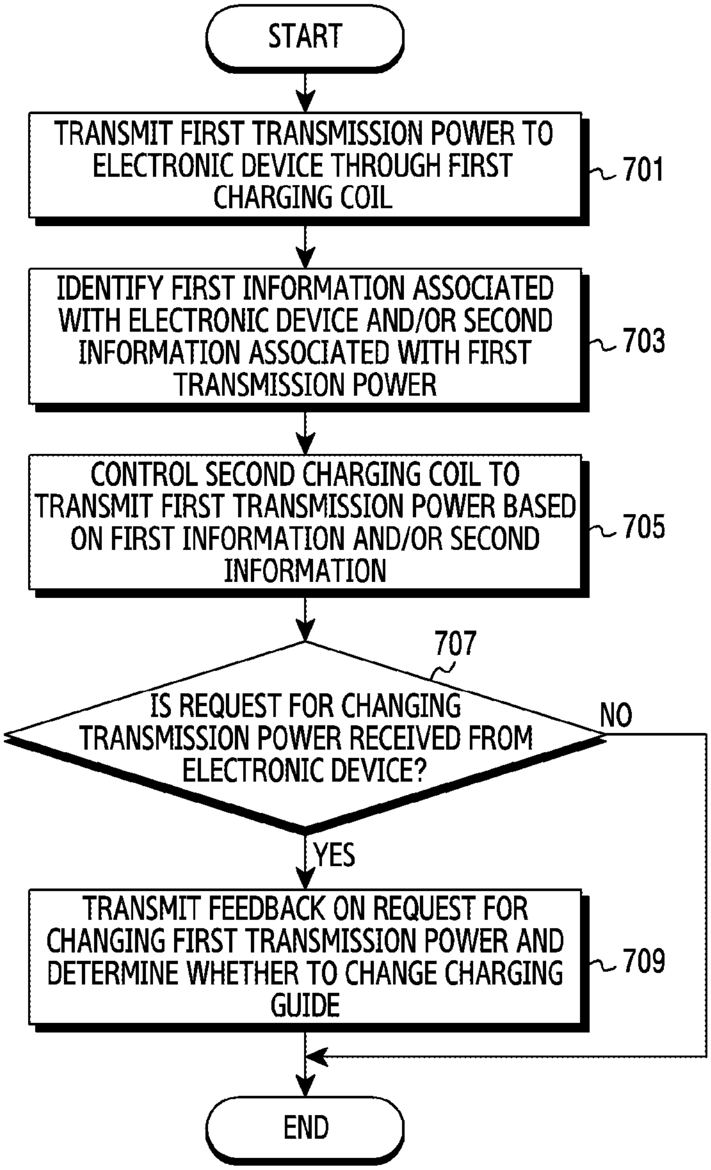
FIG. 7 is a flowchart illustrating an example operation in which a power supply device transmits power to an electronic device according to an embodiment.

FIG. 7 is a flowchart illustrating an example operation in which a power supply device transmits power to an electronic device according to an embodiment.

Referring to FIG. 7, the power supply device 601 according to an embodiment may transmit first transmission power to the electronic device 101 through a first charging coil 631 in operation 701.

According to an embodiment, the power supply device 601 may identify first information associated with the electronic device and/or second information associated with the first power received by the electronic device 101 in operation 703. In an embodiment, the first information associated with the electronic device 101 may include at least one of information about the sizes of the wireless charging coils 330 of the electronic device 101, information about threshold power required to charge the battery 189 of the electronic device 101, information about the type of the electronic device 101 (e.g., bar type, foldable type, or smart watch), a first positional relationship between the housing 210 and the power supply device, and a second positional relationship between the first portion 211 and the second portion 212 of the housing 210. In an embodiment, the first information may be received from the electronic device 101. For example, the power supply device 601 may receive the first information associated with the electronic device 101 from the electronic device 101 through the communication circuit 610. In an embodiment, the second information associated with the first power received from the power supply device may include information about a coil that is transmitting power to the electronic device 101, among the coils of the power supply device, and/or information about the first transmission power to be transmitted to the electronic device 101.

According to an embodiment, in operation 705, the power supply device 601 may control the second charging coil 632 to transmit the first transmission power, based on the first information and/or the second information. For example, based on the first information and/or the second information, if the first power received by the electronic device 101 is lower than threshold power required to charge the electronic device 101, the power supply device 601 may perform control transmit the first transmission power through the second charging coil 632. In an example, when the electronic device 101 is positioned in a second direction (e.g., the +z direction) with respect to the power supply device 601 in FIG. 6A, the electronic device 101 may receive power with higher transmission efficiency in the case of transmitting the first transmission power through the second charging coil 632 than the case of transmitting the same through the first charging coil 631.

According to an embodiment, the power supply device 601 may determine whether a request for changing the first transmission power is received from the electronic device 101 in operation 707. For example, even in the case where the power supply device 601 transmits the first transmission power to the electronic device 101 by switching from the first charging coil 631 to the second charging coil 632, if the first power received by the electronic device 101 is still lower than the threshold power, the electronic device 101 may request the power supply device 601 to change the first transmission power. In an example, the power supply device 601 may determine whether the request for changing the first transmission power has been received through the communication circuit 610.

According to an embodiment, upon receiving the request for changing the first transmission power, the power supply device 601 may perform operation 709. In operation 709, the electronic device 101 may transmit feedback on the request for changing the transmission power and determine whether to change a charging guide. For example, in the case where the power supply device 601 is able to change the first transmission power, the power supply device 601 may transmit feedback including information indicating that the first transmission power is able to be changed (e.g., information stating that the first transmission power can be increased) to the electronic device 101. In an example, as the first transmission power is changed, the power supply device 601 may not change the charging guide. As another example, if the first transmission power is unable to be changed, the power supply device 601 may transmit feedback including information indicating that the first transmission power is unable to be changed to the electronic device 101. In an example, as the first transmit power fails to be changed, the power supply device 601 may change the charging guide. For example, the power supply device 601 may display the same by reducing the width of a circular charging guide. The embodiment of adjusting the charging guide will be described later in detail with reference to FIG. 20A. According to an embodiment, the power supply device 601 may establish communication connections for wireless charging with a plurality of electronic devices. For example, the power supply device 601 may establish communication connections for wireless charging with a first electronic device (e.g., the electronic device 101) and a second electronic device. In an example, the power supply device 601 may transmit first transmission power to the first electronic device (e.g., the electronic device 101) through a first charging coil 631 and transmit second transmission power to the second electronic device through the second charging coil 632. In an example, the first electronic device (e.g., the electronic device 101) and/or the second electronic device may transmit feedback on the transmission power to the power supply device 601. In this case, the first electronic device and/or the second electronic device may compare a direction in which the magnetic field formed by the first charging coil 631 is directed with a predetermined threshold direction, and, if the direction in which the magnetic field formed by the first charging coil 631 is directed exceeds the threshold direction, transmit feedback requesting changing of the charging guide to the power supply device 601. The threshold direction may indicate the direction in which the charging coil 631 of the power supply device 601 should be directed in order to charge the first electronic device and/or the second electronic device in consideration of the positions or structures of the wireless charging coils of the first electronic device and/or the second electronic device. In an example, the power supply device 601 may determine whether to change a first charging guide corresponding to the first electronic device, based on first feedback received from the first electronic device (e.g., the electronic device 101). Likewise, the power supply device 601 may determine whether to change a second charging guide corresponding to the second electronic device, based on second feedback received from the second electronic device.

Although whether changing the first transmission power has been described in connection with whether to change the charging guide in FIG. 7, this is only for convenience of description, and they may not actually be related to each other. For example, even when the power supply device 601 is able to change the first transmission power, the power supply device 601 may change the charging guide while changing the first transmission power. Through this, the power supply device 601 may maximize/increase the first power received by the electronic device 101.

Figure 8:
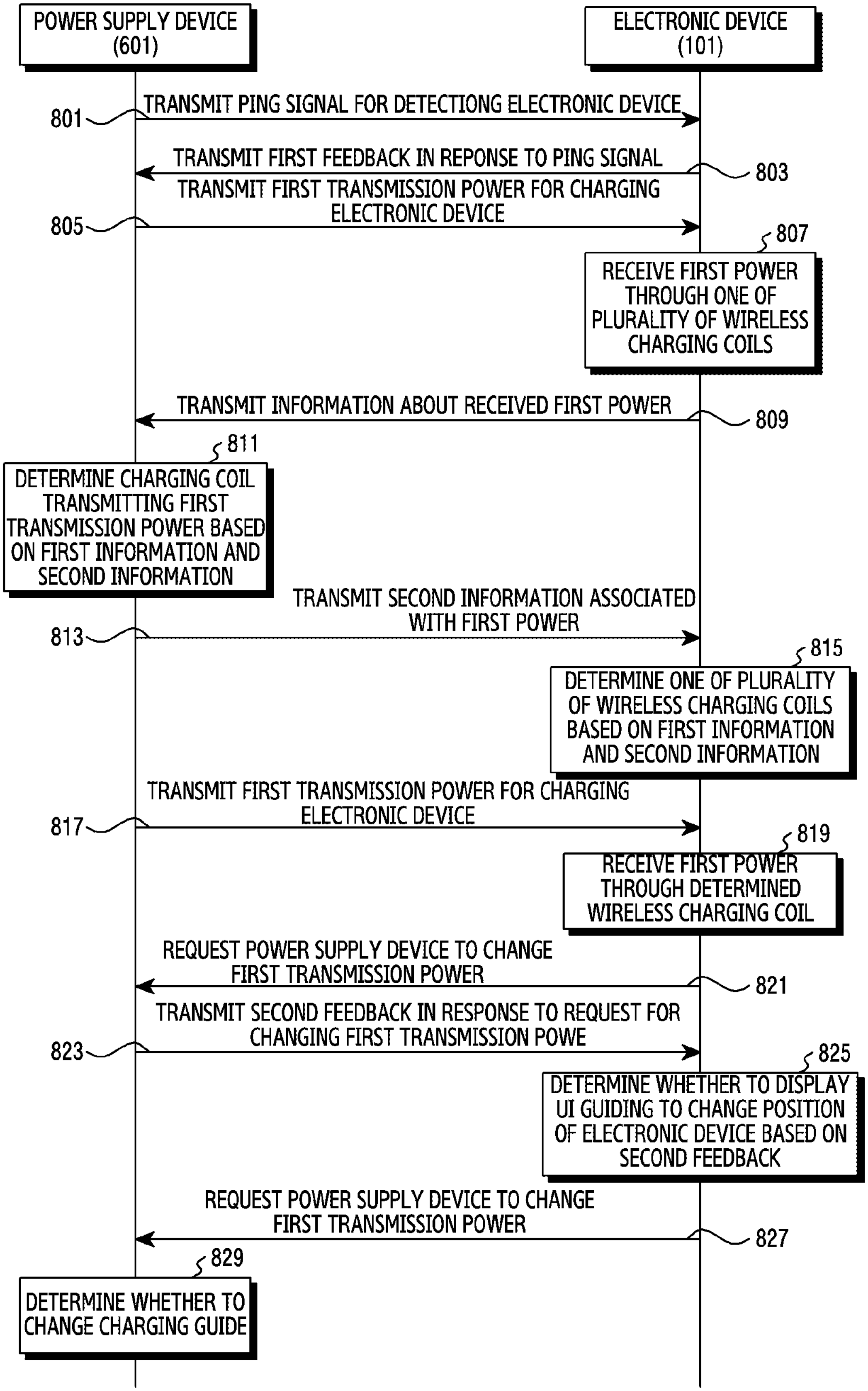
FIG. 8 is a signal flow diagram illustrating example power transmission/reception between a power supply device and an electronic device according to an embodiment.

FIG. 8 is a signal flow diagram illustrating example power transmission/reception between a power supply device and an electronic device according to an embodiment.

FIG. 8 illustrates the operation of the electronic device 101 in FIG. 5 and the operation of the power supply device 601 in FIG. 7.

Referring to FIG. 8, the power supply device 601 according to an embodiment may transmit a ping signal for detecting the electronic device 101 in operation 801. In an embodiment, the electronic device 101 may transmit first feedback to the power supply device 601 in response to reception of the ping signal in operation 803. The first feedback may include first information associated with the electronic device 101. For example, the first information may include at least one of information about the sizes of the wireless charging coils 330 of the electronic device 101, information about the threshold power required to charge the battery 189 of the electronic device 101, information about the type of the electronic device 101 (e.g., bar type, foldable type, or smart watch), a first positional relationship between the housing 210 and the power supply device 601, and a second positional relationship between the first portion 211 and the second portion 212 of the housing 210. In an embodiment, the first positional relationship (e.g., distance or angle) between the housing 210 and the power supply device 601 may be measured in various ways. For example, the electronic device 101 may measure a distance and/or an angle with the power supply device 601 using Bluetooth low energy (BLE) or an ultra-wideband (UWB) antenna. In an embodiment, the second positional relationship between the first portion 211 and the second portion 212 of the housing 210 may be measured by at least one sensor of the electronic device 101. For example, the electronic device 101 may include at least one sensor (e.g., a gyro sensor or an acceleration sensor), and the electronic device 101 may measure the angle between the first portion 211 and the second portion 212 of the housing 210 using the at least one sensor.

In an embodiment, the power supply device 601 may transmit first transmission power for charging the electronic device 101 in operation 805.

According to an embodiment, in operation 807, the electronic device 101 may receive first power through one (e.g., the first wireless charging coil 331) of the wireless charging coils 330.

According to an embodiment, the electronic device 101 may transmit information about the received first power in operation 809. For example, the information about the first power may include a power value of the first power. As another example, the information about the first power may include information about determining whether the first power is greater than threshold power for charging the electronic device 101.

According to an embodiment, the power supply device 601 may determine a charging coil (e.g., the second charging coil 632) that transmits the first transmission power, based on the first information and the second information associated with the first power in operation 811. The second information may include information about the charging coils 630 of the power supply device 601 and/or information about the first transmission power transmitted to the electronic device 101 through the charging coils 630. For example, the power supply device 601 may determine a charging coil (e.g., the second charging coil 632) that transmits the first transmission power, based on the first positional relationship between the power supply device 601 and the housing 210 of the electronic device 101.

According to an embodiment, the power supply device 601 may transmit second information associated with the first power in operation 813. The second information may include information about a charging coil (e.g., the second charging coil 632) of the power supply device 601, which transmits the first transmission power.

According to an embodiment, in operation 815, the electronic device 101 may determine one (e.g., the second wireless charging coil 332) of the wireless charging coils 330, which is to receive the first power from the power supply device 601, based on the first information and the second information. For example, the electronic device 101 may determine one of the wireless charging coils 330, based on the first information including the angle formed between the first portion 211 and the second portion 212 of the housing 210. As another example, the electronic device 101 may determine one of the wireless charging coils 330, based on the second information including information about the charging coils 630 of the power supply device 601. In an example, in order to increase power transmission efficiency between the power supply device 601 and the electronic device 101, the center of the charging coil of the power supply device 601 and the center of the wireless charging coil of the electronic device 101 should correspond to each other. Accordingly, in the case where the first charging coil 631 of the power supply device 601 transmits the first transmission power, the electronic device 101, based on the second information including information about the first charging coil 631 of the power supply device 601, may determine one (e.g., the second wireless charging coil 332) of the wireless charging coils 330 of the electronic device 101, which has a center corresponding to the center of the first charging coil 631.

According to an embodiment, the power supply device 601 may transmit the first transmission power for charging the electronic device 101 in a magnetic resonance method in operation 817.

According to an embodiment, in operation 819, the electronic device 101 may receive first power through the wireless charging coil (e.g., the second wireless charging 332) determined from among the wireless charging coils 330 in operation 815.

According to an embodiment, the electronic device 101 may request the power supply device 601 to change the first transmission power in operation 821. For example, if the first power received through the wireless charging coil (e.g., the second wireless charging coil 332 determined in operation 815 is still lower than the threshold power, the electronic device 101 may request the power supply device 601 to change the first transmit power.

According to an embodiment, the power supply device 601 may transmit second feedback to the electronic device 101 in response to the request for changing the first transmission power in operation 823. In an embodiment, in operation 825, the electronic device 101 may determine whether to display, on the flexible display 220, a user interface guiding to change the position of the electronic device 101, based on the second feedback. In an embodiment, the electronic device 101 may request the power supply device 601 to change a charging guide in operation 827. In an embodiment, the power supply device 601 may determine whether to change the charging guide of the power supply device 601 in response to the request of changing the charging guide in operation 829.

Figure 9A:
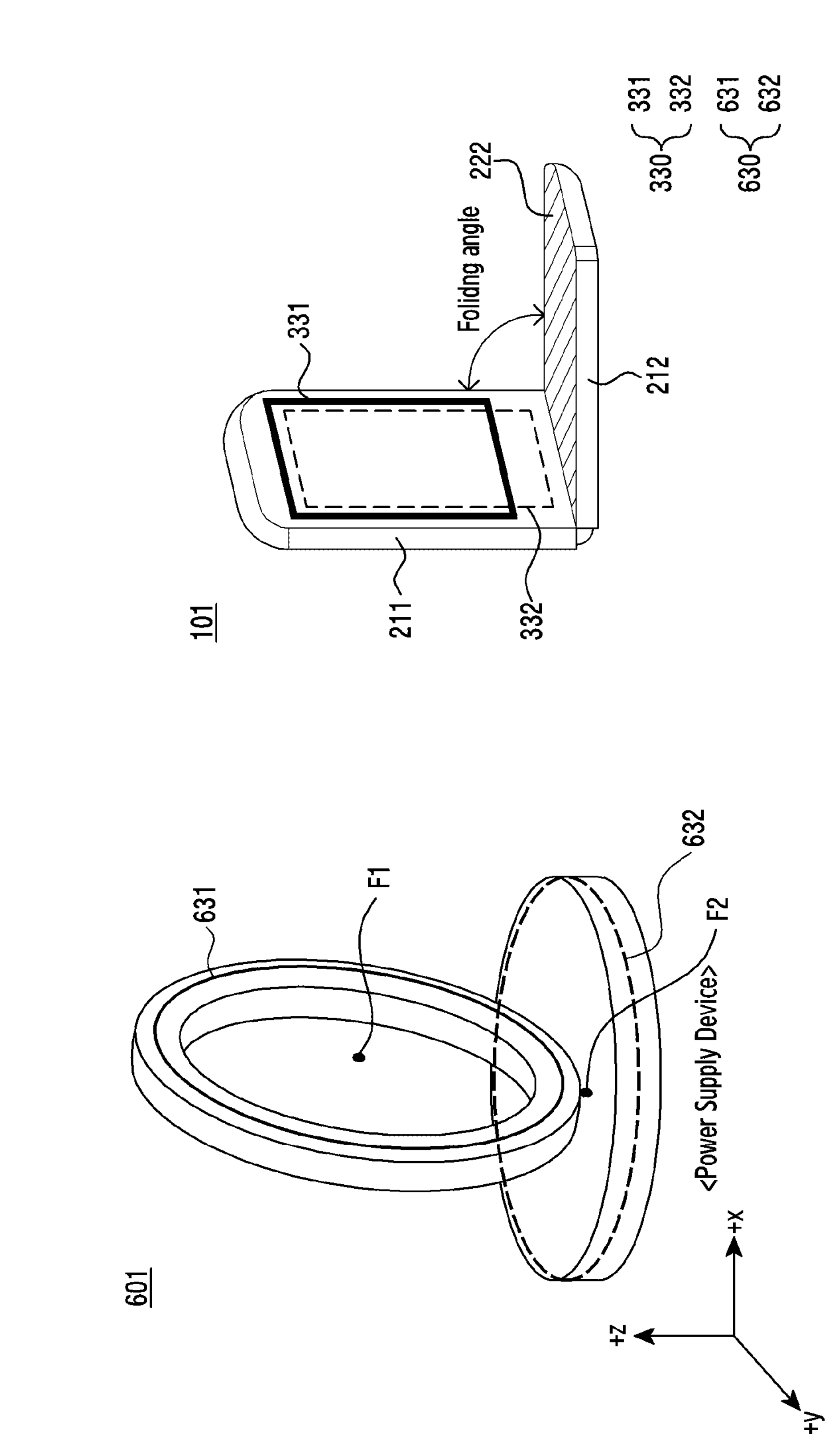
FIG. 9A is a diagram illustrating an example arrangement of an electronic device having a plurality of wireless charging coils disposed in a first portion and a power supply device according to an embodiment.

FIG. 9A is a diagram illustrating an arrangement of an electronic device having a plurality of wireless charging coils disposed in a first portion and a power supply device according to an embodiment.

Referring to FIG. 9A, wireless charging coils 330 may be disposed in a first portion 211 of the housing 210 according to an embodiment. In an embodiment, the power supply device 601 may transmit first transmission power for charging the electronic device 101 in a magnetic resonance method through a first charging coil 631 among a plurality of charging coils 630. Accordingly, the electronic device 101 may receive first power through one of the wireless charging coils 330, based on a positional relationship (e.g., angle) between the first portion 211 and the second portion 212 of the housing 210. The criteria of selecting the wireless charging coil according to the positional relationship between the first portion 211 and the second portion 212 will be described later in detail with reference to FIG. 9C.

Figure 9B:
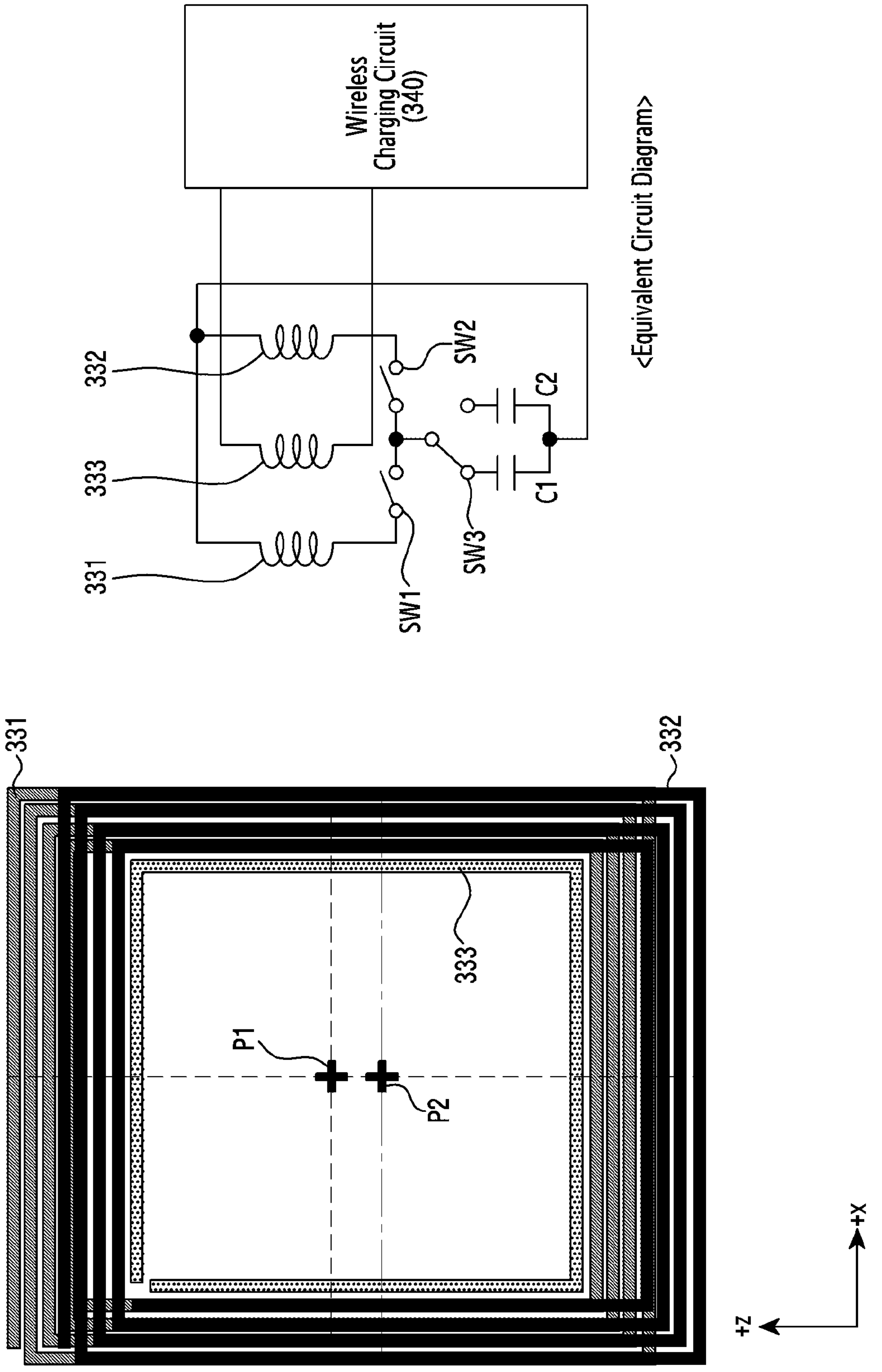
FIG. 9B is a diagram illustrating an arrangement structure of the wireless charging coils of the electronic device according to the embodiment shown in FIG. 9A.

FIG. 9B is a diagram illustrating an example arrangement of the wireless charging coils of the electronic device according to the embodiment shown in FIG. 9A.

Referring to FIG. 9B, a first center of a first wireless charging coil 331 and a second center of a second wireless charging coil 332 according to an embodiment may be different from each other. For example, the first center of the first wireless charging coil 331 may be positioned at a first point P1, and the second center of the second wireless charging coil 332 may be positioned at a second point P2. Accordingly, the first center of the first wireless charging coil 331 may be further positioned in a first direction (e.g., the +z direction), compared to the second wireless charging coil 332.

According to an embodiment, the electronic device 101 may include a load coil 333, and the load coil 333 may be electrically connected to the wireless charging circuit 340. In an embodiment, the load coil 333 may transmit power received by the first wireless charging coil 331 and/or the second wireless charging coil 332 to the wireless charging circuit 340. For example, referring to the equivalent circuit diagram in FIG. 9B, the case where a first switch circuit SW1 is short-circuited and where a third switch circuit SW3 is electrically connected to a first capacitor C1 or a second capacitor C2 may indicate that the electronic device 101 controls the first wireless charging coil 331 to receive the first power. In an example, the first power received by the first wireless charging coil 331 may be transmitted to the wireless charging circuit 340 through the load coil 333. As another example, referring to the equivalent circuit diagram in FIG. 9B, the case where a second switch circuit SW2 is short-circuited and where the third switch circuit SW3 is electrically connected to the first capacitor C1 or the second capacitor C2 may indicate that the electronic device 101 controls the second wireless charging coil 332 to receive the first power. In an example, the first power received by the second wireless charging coil 332 may be transmitted to the wireless charging circuit 340 through the load coil 333.

According to an embodiment, the first capacitor C1 and the second capacitor C2 may have different capacitance values from each other, and the electronic device 101 may control the third switch circuit SW3 to adjust the impedances of the wireless charging coils 330. For example, the electronic device 101 may control the third switch circuit SW3 such that the wireless charging coils 330 are electrically connected to the first capacitor C1 or the second capacitor C2.

According to an embodiment, the electronic device 101 may control the first switch circuit SW1 and the second switch circuit SW2, thereby utilizing the first wireless charging coil 331 and the second wireless charging coil 332 as NFC antennas. For example, the electronic device 101 may short-circuit the first switch circuit SW1 and the second switch circuit SW2, and utilize the first wireless charging coil 331 and the second wireless charging coil 332 as near-field communication (NFC) antennas.

Figure 9C:
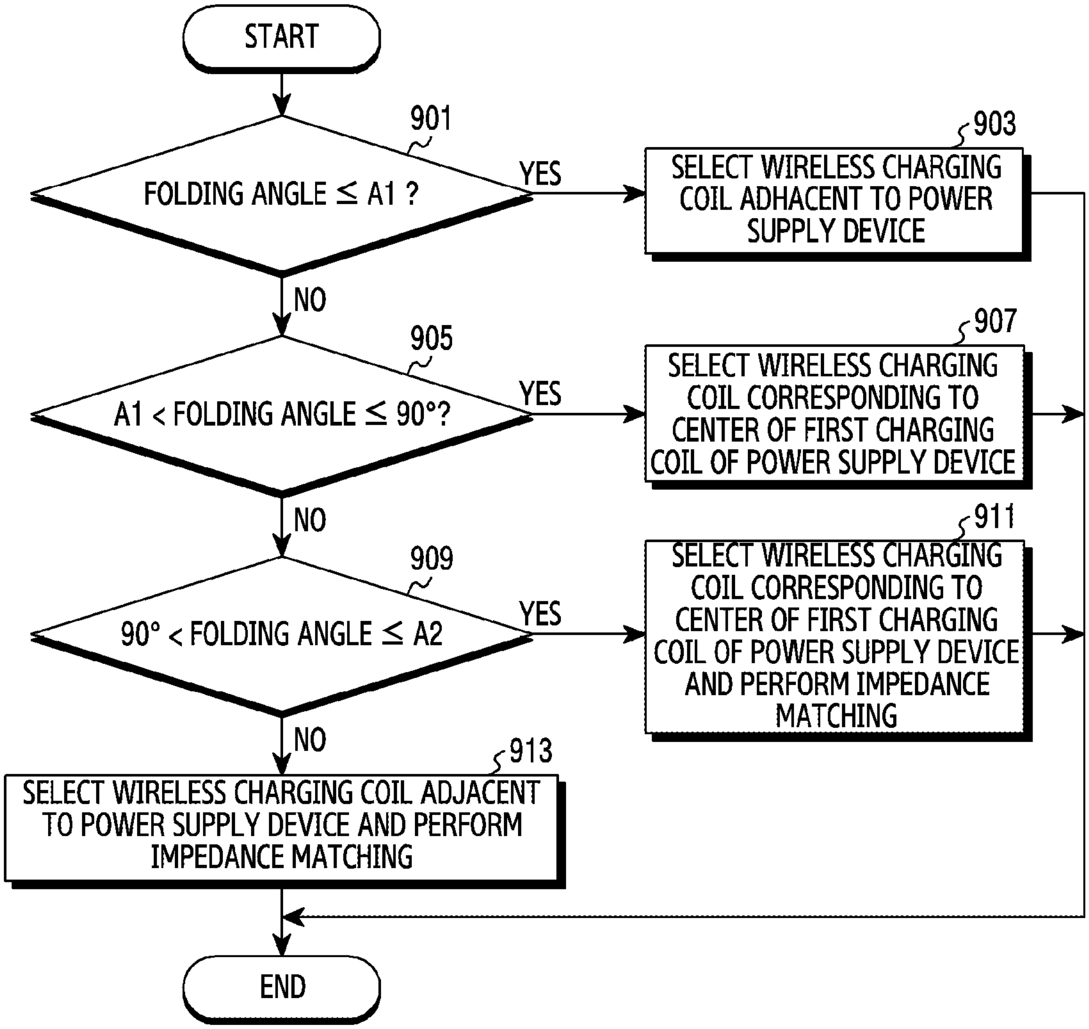
FIG. 9C is a flowchart illustrating an example operation for selecting a wireless charging coil for receiving first power, based on a positional relationship between the first portion and the second portion of the electronic device, according to the embodiment shown in FIG. 9A.

FIG. 9C is a flowchart illustrating an example operation for selecting a wireless charging coil for receiving first power, based on a positional relationship between the first portion and the second portion of the electronic device, according to the embodiment shown in FIG. 9A.

Referring to FIG. 9C, according to an embodiment, the operation of the electronic device 101 for selecting a wireless charging coil that receives first power according to a folding angle formed between a first portion 211 and a second portion 212 of a housing 210 in the case where the electronic device 101 and the power supply device 601 have the positional relationship shown in FIG. 9A is illustrated.

According to an embodiment, in operation 901, the electronic device 101 may determine whether a folding angle formed between the first portion 211 and the second portion 212 is less than a first threshold angle A1 (e.g., 45 degrees). In an embodiment, the case where the folding angle is less than the first threshold angle A1 may indicate that the electronic device 101 is in a folded state. In an embodiment, if it is determined that the folding angle is less than the first threshold angle A1, the electronic device 101 may select a wireless charging coil adjacent to the power supply device 601 in operation 903. For example, if the folding angle is 0 degrees, since the second wireless charging coil 332 is closer to the power supply device 601 than the first wireless charging coil 331, the electronic device 101 may select the second wireless charging coil 332. It is possible to maximize/increase power transmission efficiency by selecting a wireless charging coil adjacent to the power supply device 601 in operation 903.

According to an embodiment, if the electronic device 101 determines that the folding angle is not less than the first threshold angle A1, the electronic device 101 may determine whether the folding angle between the first portion 211 and the second portion 212 is greater than the first threshold angle A1 and less than 90 degrees in operation 905. In an embodiment, if the folding angle is greater than the first threshold angle A1 and less than 90 degrees, the electronic device 101 may select a wireless charging coil corresponding to the center of a first charging coil 631 of the power supply device 601 in operation 907. For example, if a first center of the first wireless charging coil 331 is further correspond to the center of the first charging coil of the power supply device 601 than a second center of the second wireless charging coil 332 in the state in which the folding angle is greater than the first threshold angle A1 and less than 90 degrees, the electronic device 101 may select the first wireless charging coil 331. Through this, transmission efficiency of power received by the electronic device 101 may be maximized/increased.

According to an embodiment, if the electronic device 101 determines that the folding angle is not less than 90 degrees, the electronic device 101, in operation 909, may determine whether the folding angle is greater than 90 degrees and less than a second threshold angle A2 (e.g., 135 degrees). In an embodiment, if it is determined that the folding angle is greater than 90 degrees and less than the second threshold angle A2, the electronic device 101, in operation 911, may select a wireless charging coil corresponding to the center of the first charging coil 631 of the power supply device 601 and perform impedance matching. For example, the electronic device 101 may select the first wireless charging coil 331. In addition, the electronic device 101 may perform impedance matching in consideration of the influence of a substrate of the flexible display 220. The reason why the electronic device 101 performs further impedance matching in operation 911 differently from operation 907 is as follows. For example, when the folding angle is about 120 degrees (in operation 911), the substrate of the flexible display 220 may affect wireless charging of the power supply device 601, differently from the case where the folding angle is about 75 degrees (in operation 907). Accordingly, in this case, impedance matching may be performed using a lumped element in consideration of the influence of the substrate of the flexible display 220.

According to an embodiment, if the electronic device 101 determines that the folding angle is greater than the second threshold angle A2, the electronic device 101 may select a wireless charging coil adjacent to the power supply device 601 and perform impedance matching in operation 913. For example, in operation 913, the electronic device 101 may select the first wireless charging coil 331 adjacent to the power supply device 601 from among the wireless charging coils 330. In addition, the electronic device 101 may perform impedance matching in consideration of the influence of the flexible display 220.

Figure 10A:
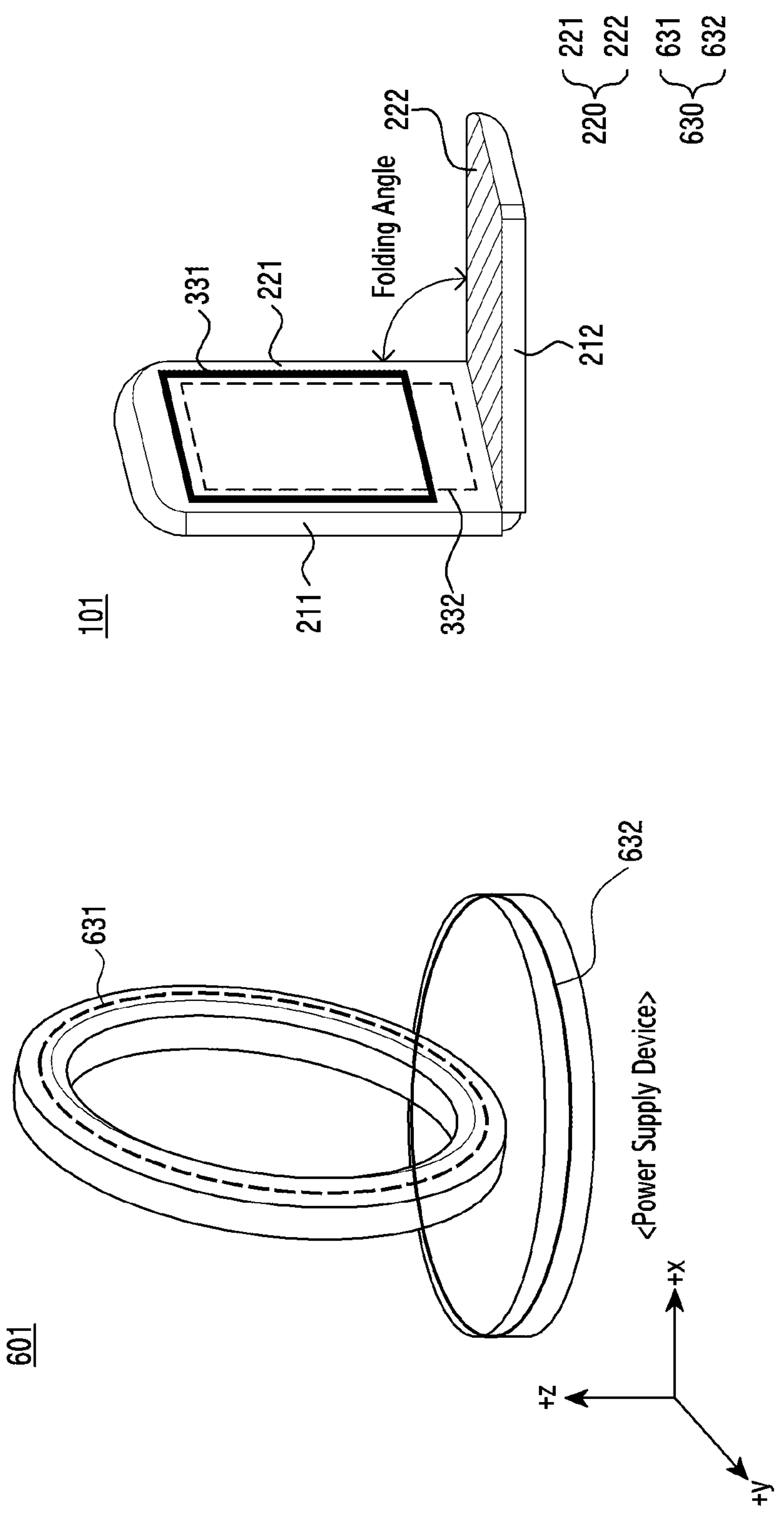
FIG. 10A is a diagram illustrating an arrangement of an electronic device having a plurality of wireless charging coils disposed in a first portion and a power supply device according to an embodiment.

FIG. 10A is a diagram illustrating an example arrangement of an electronic device having a plurality of wireless charging coils disposed in a first portion and a power supply device according to an embodiment.

Referring to FIG. 10A, unlike the embodiment in FIG. 9A, the power supply device 601 according to an embodiment may transmit first transmission power to the electronic device 101 through the second charging coil 632.

Figure 10B:
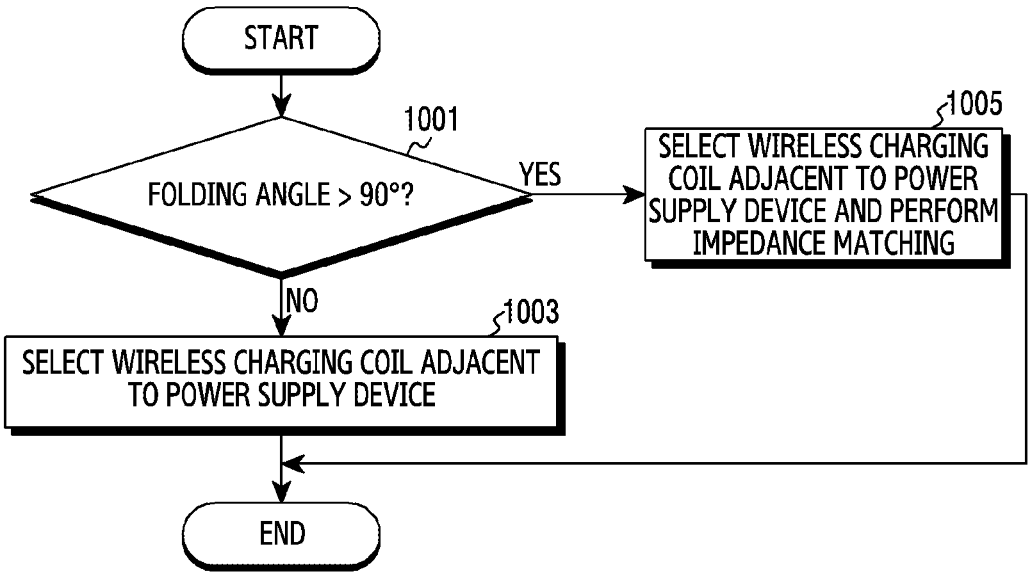
FIG. 10B is a flowchart illustrating an example operation for selecting a wireless charging coil for receiving first power, based on a positional relationship between the first portion and the second portion of the electronic device, according to the embodiment of FIG. 10A.

FIG. 10B is a flowchart illustrating an example operation for selecting a wireless charging coil for receiving first power, based on a positional relationship between the first portion and the second portion of the electronic device, according to the embodiment of FIG. 10A.

Referring to FIG. 10B, an electronic device 101 according to an embodiment may determine whether the folding angle formed between the first portion 211 and the second portion 212 of the housing 210 is greater than 90 degrees in operation 1001. In an embodiment, if the folding angle is less than 90 degrees, the electronic device 101 may select a wireless charging coil adjacent to the power supply device in operation 1003. For example, when the folding angle is 45 degrees, the second wireless charging coil 332 may be closer to the power supply device 601 than the first wireless charging coil 331. Accordingly, the electronic device 101 may select a second wireless charging coil 332 that is closer to the power supply device 601 from among the wireless charging coils 330.

In an embodiment, if the folding angle is greater than 90 degrees, the electronic device 101 may select a wireless charging coil adjacent to the power supply device 601 and perform impedance matching in operation 1005. For example, if the folding angle is 120 degrees, the electronic device 101 may select the second wireless charging coil 332 adjacent to the power supply device 601 from among the wireless charging coils 330. In addition, the electronic device 101 may perform impedance matching in consideration of the influence of the substrate of the flexible display 220.

Figure 11A:
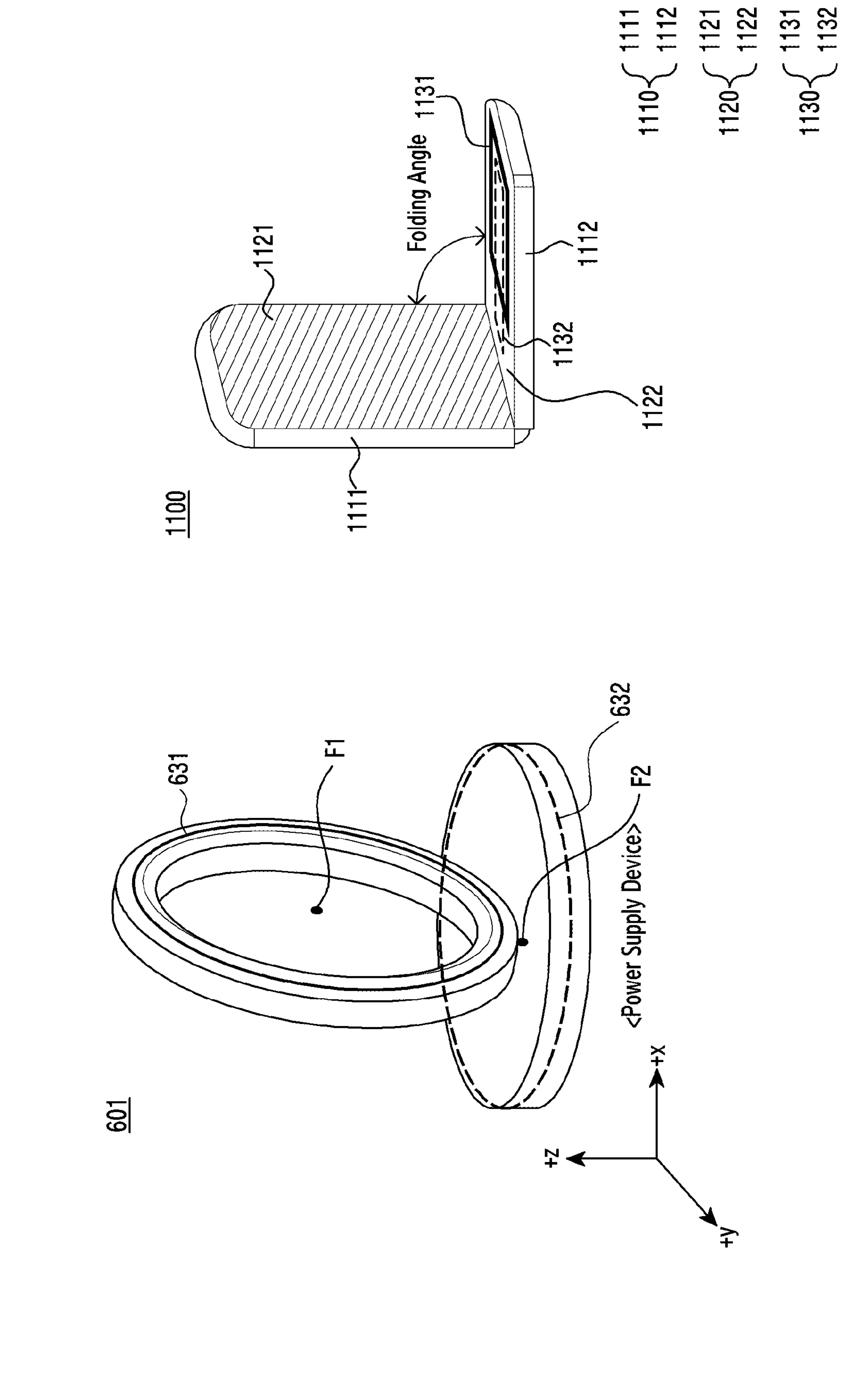
FIG. 11A is a diagram illustrating an arrangement of an electronic device having a plurality of wireless charging coils disposed in a second portion and a power supply device according to an embodiment.

FIG. 11A is a diagram illustrating an example arrangement of an electronic device having a plurality of wireless charging coils disposed in a second portion and a power supply device according to an embodiment.

Referring to FIG. 11A, a housing 1110 of an electronic device 1100 according to an embodiment may include a first portion 1111 and a second portion 1112, and, unlike the wireless charging coils 330 in FIG. 10A, a plurality of charging coils 1130 may be disposed in the second portion 1112 of the housing 1110. The electronic device 101 may perform impedance matching of the plurality of wireless charging coils 1130, based on a positional relationship between the first portion 1111 and the second portion 1112 of the housing 1110. Hereinafter, a specific method of impedance matching depending on the positional relationship between the first portion 1111 and the second portion 1112 will be described with reference to FIG. 11B. The electronic device 101 may include a flexible display 1120, and the flexible display 1120 may include a first region 1121 and a second region 1122.

Figure 11B:
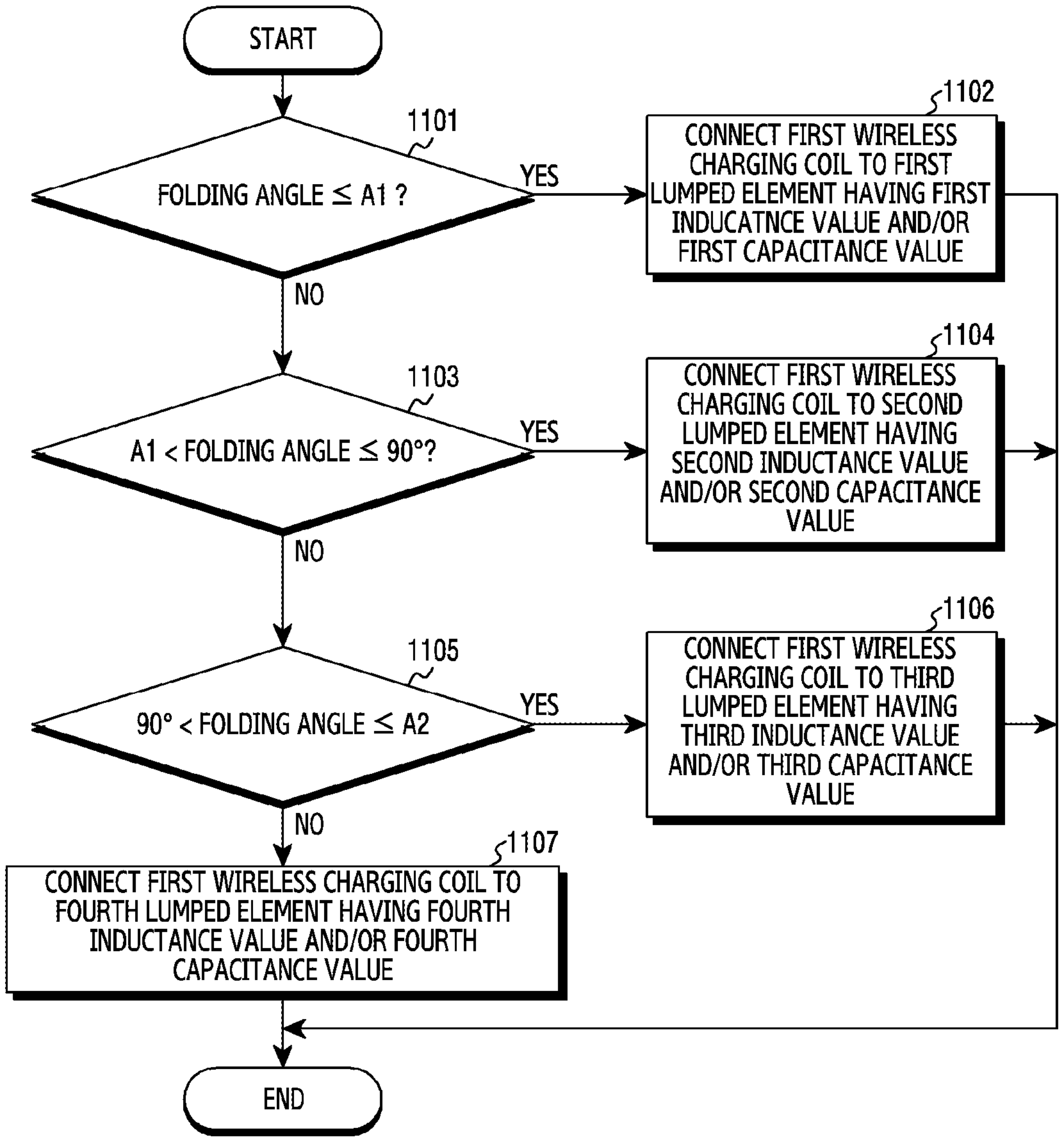
FIG. 11B is a flowchart illustrating an example operation of performing impedance matching depending on a positional relationship of the first portion and the second portion of the housing according to the embodiment shown in FIG. 11A.

FIG. 11B is a flowchart illustrating an example operation for performing impedance matching depending on a positional relationship between the first portion and the second portion of the housing according to the embodiment shown in FIG. 11A.

Referring to FIG. 11B, in operation 1101, the electronic device 1100 according to an embodiment may determine whether a folding angle formed between the first portion 1111 and the second portion 1112 of the housing 1110 is less than a first threshold angle A1 (e.g., 45 degrees). In an embodiment, if the electronic device 1100 determines that the folding angle is less than the first threshold angle A1, the electronic device 1100 may connect the first wireless charging coil 1131 for receiving first power to a first lumped element having a first inductance value and/or a first capacitance value in operation 1102. In an embodiment, as the first wireless charging coil 1131 is electrically connected to the first lumped element (e.g., a capacitor and an inductor), the electronic device 1100 may reduce or minimize influence by the housing 1110 and reduce or prevent reduction in resonance efficiency. For example, when receiving first power from the power supply device 601 through a plurality of wireless charging coils 1130 disposed in the second portion 1112 of the housing 1110, the first portion 1111 including a conductive material (e.g., aluminum) may affect the same. Therefore, in order to minimize and/or reduce the influence of the first portion 1111 including the conductive material, the electronic device 1100 may electrically connect the first lumped element and the first wireless charging coil 1131, thereby reducing the influence of the housing 1110.

According to an embodiment, if the electronic device 1100 determines that the folding angle is greater than the first threshold angle A1 (e.g., 45 degrees), the electronic device 101, in operation 1103, may determine whether the folding angle is greater than the first threshold angle A1 and less than 90 degrees. In an embodiment, if the electronic device 1100 determines that the folding angle is greater than the first threshold angle A1 and less than 90 degrees, the electronic device 1100 may connect the first wireless charging coil 1131 to a second lumped element having a second inductance value and/or a second capacitance value in operation 1104. In an embodiment, the second inductance value may be less than the first inductance value, and the second capacitance value may be less than the first capacitance value. The reason the electronic device 101 connects the first wireless charging coil 1131 to the second lumped element having a smaller inductance and/or capacitance value than those of the first lumped element in operation 1104 is as follows. For example, as the angle between the first portion 1111 and the second portion 1112 of the housing 1110 decreases, the influence of the first portion 1111 including a conductive material on the plurality of wireless charging coils 1130 disposed in the second portion 1112 may increase. Accordingly, the inductance value and/or the capacitance value to be offset through impedance matching may also decrease. As a result, as the angle of the first portion 1111 and the second portion 1112 increases, the inductance value and/or the capacitor value of the lumped element for impedance matching may decrease.

According to an embodiment, if the electronic device 1100 determines that the folding angle is greater than 90 degrees, the electronic device 1100 may determine whether the folding angle is greater than 90 degrees and less than a second threshold angle A2 (e.g., 135 degrees) in operation 1105. In an embodiment, if the electronic device 1100 determines that the folding angle is greater than 90 degrees and less than the second threshold angle A2, the electronic device 1100 may connect the first wireless charging coil 1131 to a third lumped element having a third inductance value and/or a third capacitance value in operation 1106. In an embodiment, the third inductance value may be less than the second inductance value, and the third capacitance value may be less than the second capacitance value.

According to an embodiment, if the electronic device 1100 determines that the folding angle is greater than the second threshold angle A2, the electronic device 1100 may connect the first wireless charging coil 1131 to a fourth lumped element having a fourth inductance value and/or a fourth capacitance value in operation 1107. In an embodiment, the fourth inductance value may be less than the third inductance value, and the fourth capacitance value may be less than the third capacitance value.

Figure 11C:
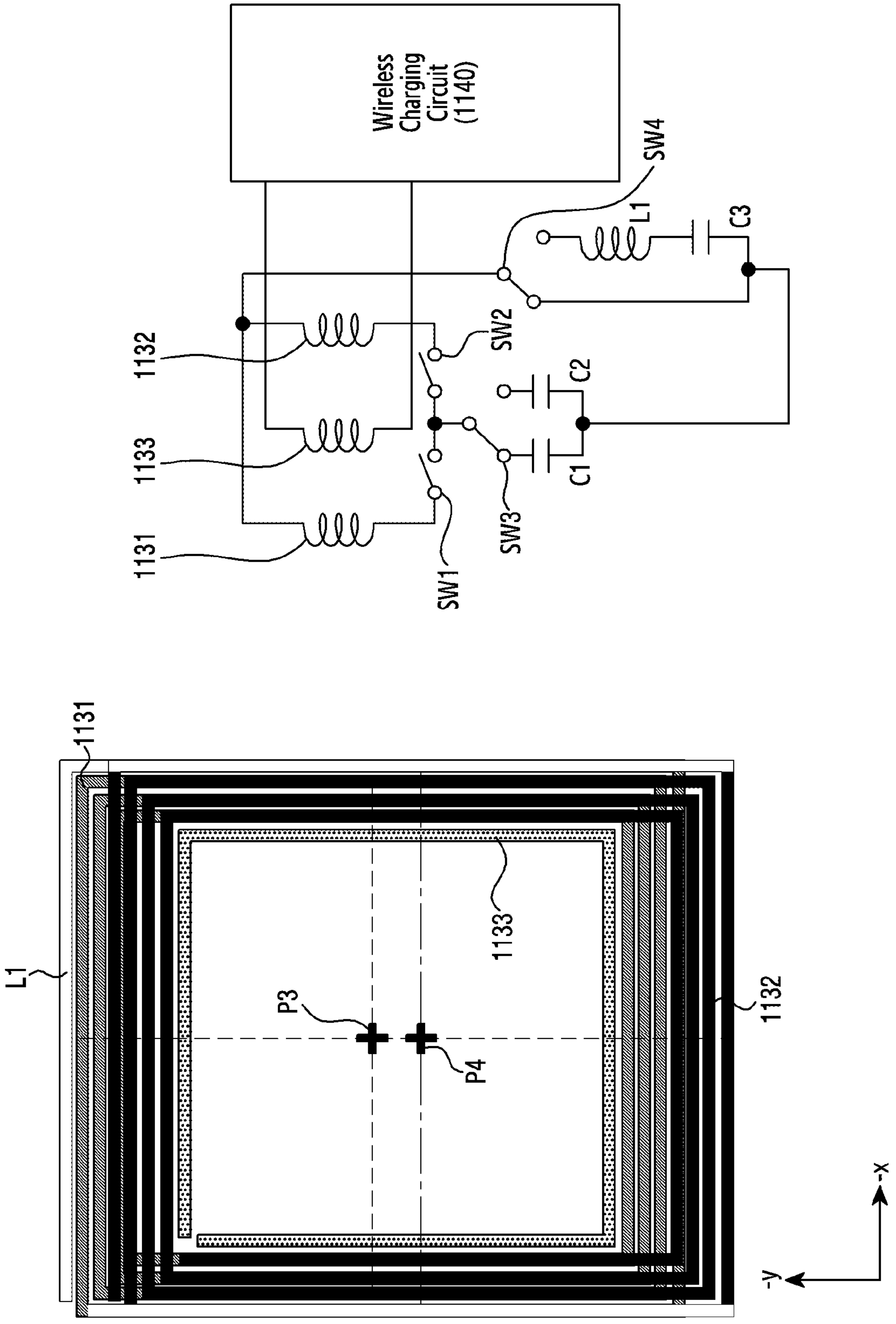
FIG. 11C is a diagram illustrating a change in the centers of wireless charging coils through connection of an inductor according to an embodiment.

FIG. 11C is a diagram illustrating an example change in the centers of wireless charging coils through connection of an inductor according to an embodiment.

Referring to FIG. 11C, an electronic device 1100 according to an embodiment may include a first wireless charging coil 1131, a second wireless charging coil 1132, and a load coil 1133. In an embodiment, the first wireless charging coil 1131 may have a third center P3, and the second wireless charging coil 1132 may have a fourth center P4.

According to an embodiment, the electronic device 1100 may control a fourth switch circuit SW4 to connect an additional inductor L1 to the first wireless charging coil 1131 or the second wireless charging coil 1132. In an embodiment, the center of the magnetic field formed by the first wireless charging coil 1131 may be changed from the third center P3 to the fourth center P4.

In an embodiment, the fourth center P4 of the first wireless charging coil 1131 to which the additional inductor L1 may be further aligned with the center of a charging coil of the power supply device 601, compared to the third center P3. As a result, the electronic device 101 may receive more power from the power supply device 601. That is, the power transmission efficiency of the power supply device 601 may be improved.

Although it has been described in the embodiment in FIG. 11C that the center of the magnetic field formed by the first wireless charging coil 1131 is moved from the third center P3 to the fourth center P4 by connecting the additional inductor L1 to the first wireless charging coil 1131, this is only an example. Actually, the center of the magnetic field formed by the first wireless charging coil 1131 may be changed to various positions by connecting the additional inductor L1 to the first wireless charging coil 1131. For example, the center of the magnetic field formed by the first wireless charging coil 1131 may move from the third center P3 in a first direction (e.g., the −y direction) or a second direction (e.g., the +y direction) depending on the electrical length (or inductance value) of the additional inductor L1. As another example, the center of the magnetic field formed by the first wireless charging coil 1131 may move from the third center P3 in a third direction (e.g., the −x direction) or a fourth direction (e.g., the +x direction). As another example, the center of the magnetic field formed by the first wireless charging coil 1131 may move in a diagonal direction.

Although the description has been made based on first wireless charging coil 1131 in the embodiment in FIG. 11C, this is only an example, and the embodiment described in FIG. 11C may also be applied to the second wireless charging coil 1132.

Although it has been described in the embodiment in FIG. 11C that the electronic device 101 includes both the first wireless charging coil 1131 and the second wireless charging coil 1132, this is only for convenience of description, and in an embodiment, only one of the first wireless charging coil 1131 or the second wireless charging coil 1132 may be included.

Figure 12:
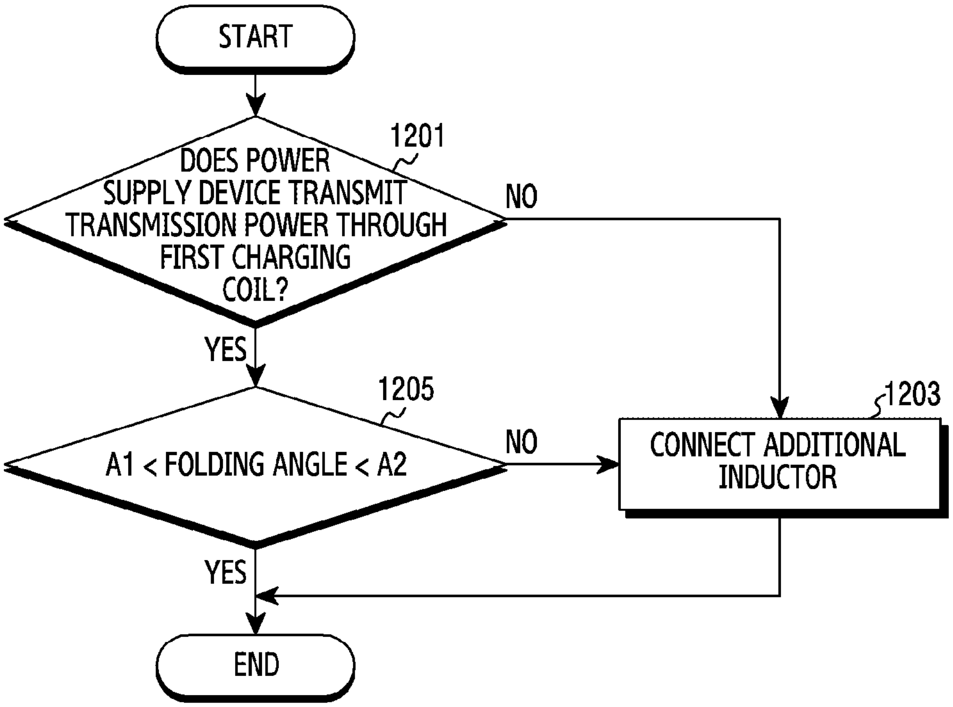
FIG. 12 is a flowchart illustrating an example operation of connecting an additional inductor depending on a folding angle between a first portion and a second portion of a housing according to an embodiment.

FIG. 12 is a flowchart illustrating an example operation for connecting an additional inductor depending on a folding angle between a first portion and a second portion of a housing according to an embodiment.

Referring to FIG. 12, the electronic device 101 according to an embodiment may determine whether the power supply device 601 transmits transmission power through the first charging coil 631 in operation 1201. For example, the power supply device 601 may transmit transmission power to the electronic device 101 through the first charging coil 631 as described with reference to FIG. 9A, and transmit transmission power to the electronic device 101 through the second charging coil 632 as described with reference to FIG. 10A. In an example, the electronic device 101 may receive, from the power supply device 601, information about whether the coil transmitting power is the first charging coil 631 or the second charging coil 632 of the charging coils 630, and may determine whether the power supply device 601 transmits the transmission power through the first charging coil 631, based on the information.

According to an embodiment, if the power supply device 601 does not transmit the transmission power through the first charging coil 631, the electronic device 101 may connect an additional inductor to the wireless charging coils 330 in operation 1203. For example, if the power supply device 601 transmits power through the second charging coil 632 instead of the first charging coil 631, the electronic device 101 may connect an additional inductor L1 to the wireless charging coils 330 to maximize/increase the magnitude of the received first power.

According to an embodiment, if the power supply device 601 transmits the transmission power through the first charging coil 631, in operation 1205, the electronic device 101 may determine whether the folding angle between the first portion 211 and the second portion 212 of the housing 210 is greater than a first threshold angle A1 (e.g., 45 degrees) and less than a second threshold angle A2 (e.g., 135 degrees). In an embodiment, if the folding angle is greater than the first threshold angle A1 and less than the second threshold angle A2, the electronic device 101 may not connect the additional inductor L1 to the wireless charging coils 330. The case where the folding angle is greater than the first threshold angle A1 and less than the second threshold angle A2 may indicate the state in which the center of the magnetic field formed by the wireless charging coil 330 of the electronic device 101 is aligned with the center of the power supply device 601. Accordingly, the electronic device 101 may receive power greater than or equal to the threshold power required to charge the electronic device 101 without connection of a separate additional inductor L1, and accordingly, the additional inductor L1 may not be connected to the wireless charging coils 330.

According to an embodiment, if the folding angle is less than or equal to the first threshold angle A1 or if the folding angle is greater than or equal to the second threshold angle A2, the electronic device 101 may connect an additional inductor L1 to the wireless charging coils 330 in operation 1203. In an embodiment, the case where the folding angle is less than the first threshold angle A1 or larger than the second threshold angle A2 may indicate that the electronic device 101 is in a substantially unfolded state or an unfolded state. In this case, the center of the magnetic field formed by the wireless charging coils 330 of the electronic device 101 may not be aligned with the center of the magnetic field formed by the charging coil 631 of the power supply device 601. Accordingly, the electronic device 101 may electrically connect the additional inductor L1 to the wireless charging coils 330 in order to increase received power. The center of the wireless charging coils 330 may be further aligned with the center of the first charging coil 631 of the power supply device 601 through the connection of the additional inductor L1, compared to the state before the additional inductor L1 is connected. Accordingly, the electronic device 101 may maximize/increase the received power by connecting the additional inductor L1 to the wireless charging coils 330.

Figure 13:
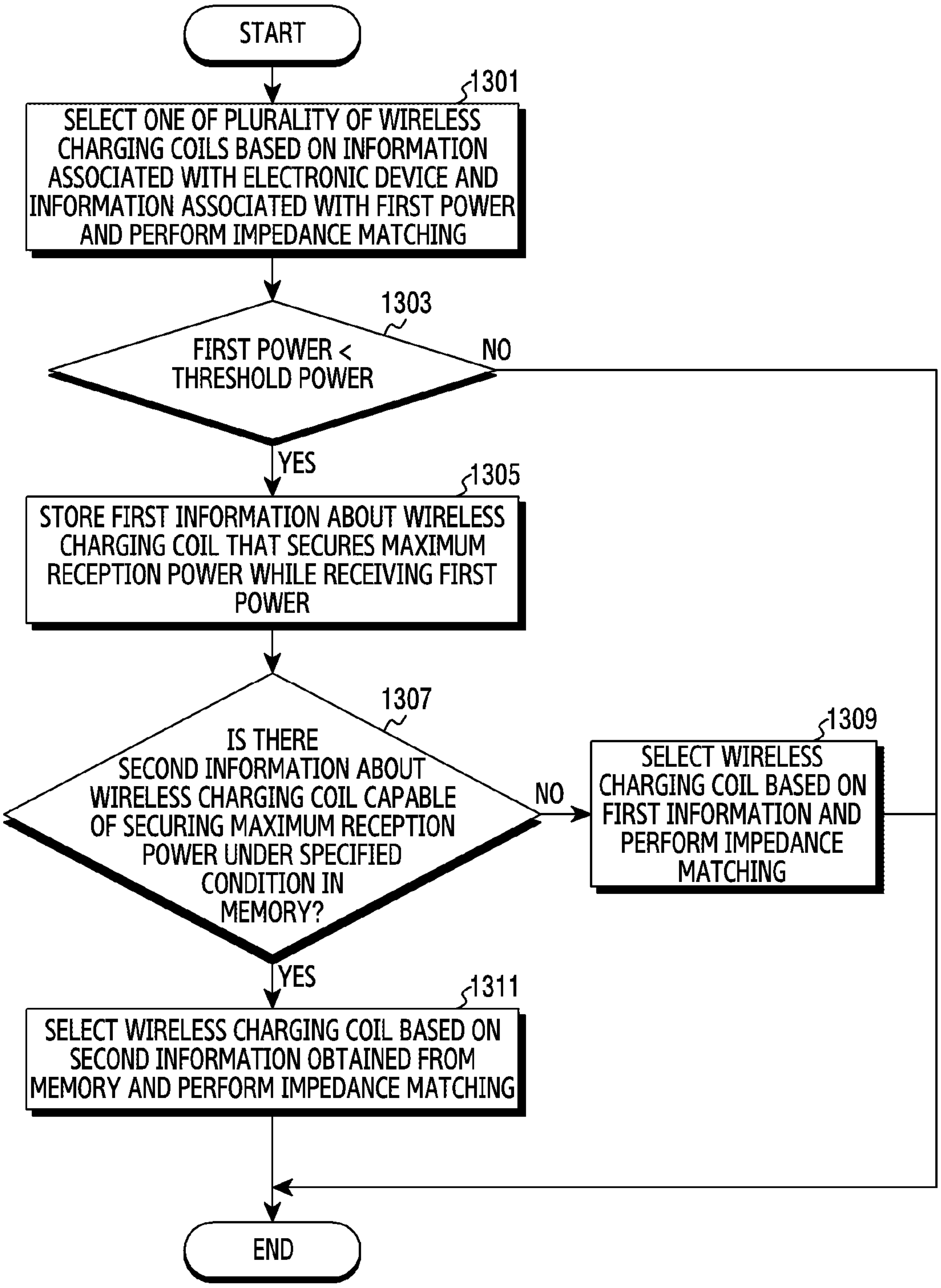
FIG. 13 is a flowchart illustrating an example operation of selecting a wireless charging coil corresponding to a positional relationship of a first portion and a second portion of a housing and an impedance matching method using a memory according to an embodiment.

FIG. 13 is a flowchart illustrating an example operation for selecting a wireless charging coil corresponding to a positional relationship of a first portion and a second portion of a housing and an impedance matching method using a memory according to an embodiment.

Referring to FIG. 13, in operation 1301, the electronic device 101 according to an embodiment may select one (e.g., the first wireless charging coil 331) of the wireless charging coils 330, based on information associated with the electronic device 101 and information associated with first power, and perform impedance matching. In an embodiment, the information associated with the electronic device 101 may include the type of the electronic device 101, a positional relationship between the electronic device 101 and the power supply device 601, and information about the threshold power of the electronic device 101 and/or a positional relationship between the first portion 211 and the second portion 212 of the housing 210 of the electronic device 101. In an embodiment, the information associated with the first power may include information about charging coils 630 of the power supply device 601 and/or information about numerical information of the first power.

According to an embodiment, the electronic device 101 may determine whether the first power received is less than a threshold power in operation 1303. In an embodiment, if the electronic device 101 determines that the received first power is less than the threshold power, the electronic device 101 may store, in a memory (e.g., the memory 130 in FIG. 1), information about a wireless charging coil (e.g., the first wireless charging coil 331 or the second wireless charging coil 332) that secures the maximum reception power while receiving the first power for a specified period in operation 1305.

According to an embodiment, in operation 1307, the electronic device 101 may determine whether there is prestored information about a wireless charging coil (e.g., the first wireless charging coil 331) capable of securing the maximum reception power in the memory 130 under a specified condition. In an embodiment, the specified condition may indicate a condition for the folding angle of the housing 210 and the relative distance between the electronic device 101 and the power supply device 601. In an embodiment, if the electronic device 101 determines that there is no prestored information about a wireless charging coil capable of securing the maximum reception power under the specified condition in the memory 130, the electronic device 101 may select one of the wireless charging coils 330, based on information about the wireless charging coil that has secured the maximum reception power while receiving the first power, and perform impedance matching in operation 1309.

According to an embodiment, if the electronic device 101 determines that there is prestored information about a wireless charging coil capable of securing the maximum reception power under the specified condition in the memory 130, the electronic device 101 may select one of the wireless charging coils 330, based on the prestored information obtained from the memory 130, and perform impedance matching in operation 1311.

Figure 14:
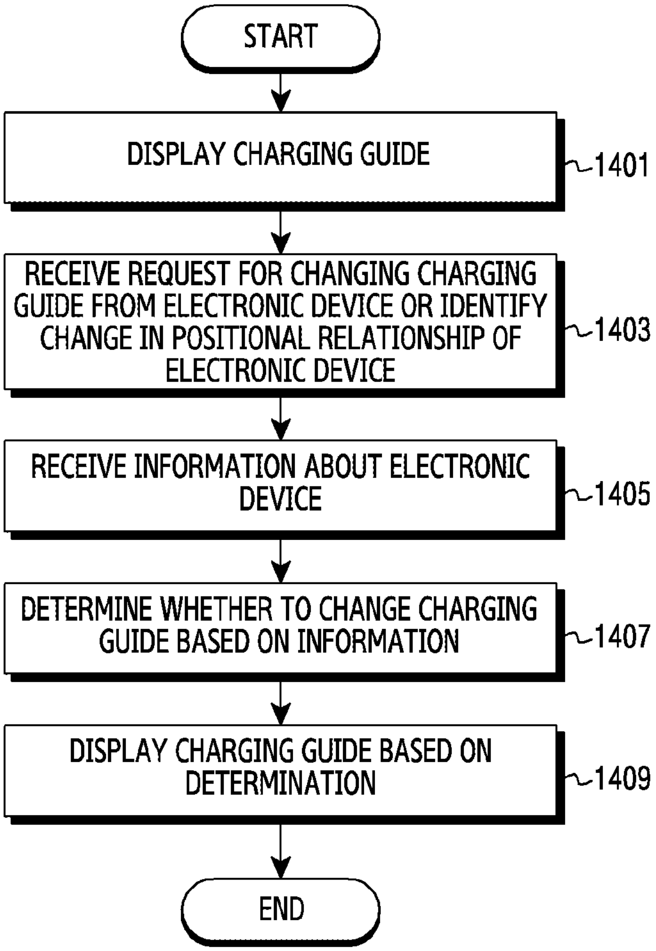
FIG. 14 is a flowchart illustrating an example operation in which a power supply device displays a charging guide according to an embodiment.

FIG. 14 is a flowchart illustrating an example operation in which a power supply device displays a charging guide according to an embodiment.

Referring to FIG. 14, the power supply device 601 according to an embodiment may display a charging guide in operation 1401. For example, a display 5 circuit 650 of the power supply device 601 may include a light-emitting circuit, and the power supply device 601 may control the display circuit 650 to display the charging guide around the power supply device 601. In an embodiment, the charging guide may distinguish a minimum distance required for the electronic device 101 to be charged. For example, the first power received by the electronic device 101 in the area within the charging guide displayed by the power supply device 601 may greater than threshold power, so that the electronic device 101 may be charged. As another example, the first power received by the electronic device 101 in the area outside the charging guide displayed by the power supply device 601 may be less than the threshold power, so that the electronic device 101 may not be charged.

According to an embodiment, in operation 1403, the power supply device 601 may receive a request for changing the charging guide from the electronic device 101 or identify a change in the positional relationship with the electronic device 101. For example, if the received first power is still less than the threshold power value even when the electronic device 101 is disposed in the area within the charging guide, the electronic device 101 may request the power supply device 601 to change the charging guide. In an example, the power supply device 601 may receive a request for changing the charging guide from the electronic device 101. As another example, if the positional relationship between the electronic device 101 and the power supply device is changed due to a change in the distance and/or direction between the electronic device 101 and the power supply device 601, the power supply device 601 may identify the change in the positional relationship.

According to an embodiment, the power supply device 601 may receive information about the electronic device 101 in operation 1405. In an embodiment, the information about the electronic device 101 may include at least one of the type of the electronic device 101 (e.g., bar type or foldable type), information about power received by the electronic device 101, information about threshold power of the electronic device 101, or a positional relationship between the electronic device 101 and the power supply device 601.

According to an embodiment, the power supply device 601 may determine whether to change the charging guide, based on the received information in operation 1407. For example, if the power supply device 601 determines that the first power received by the electronic device 101 is greater than the threshold power, the power supply device 601 may not change the charging guide. As another example, if the power supply device 601 determines that the first power received by the electronic device 101 is less than the threshold power, the power supply device 601 may change the charging guide.

According to an embodiment, the power supply device 601 may display a charging guide, based on the determination, in operation 1409. For example, if the charging guide is determined to be changed, the electronic device 101 may change the shape and/or width of the charging guide. An embodiment of changing the width of the charging guide will be described later with reference to FIG. 20A. As another example, if the charging guide is determined not to be changed, the electronic device 101 may display the shape and/or width of the charging guide substantially the same as those before receiving the request for changing the charging guide from the electronic device 101.

Figure 15A:
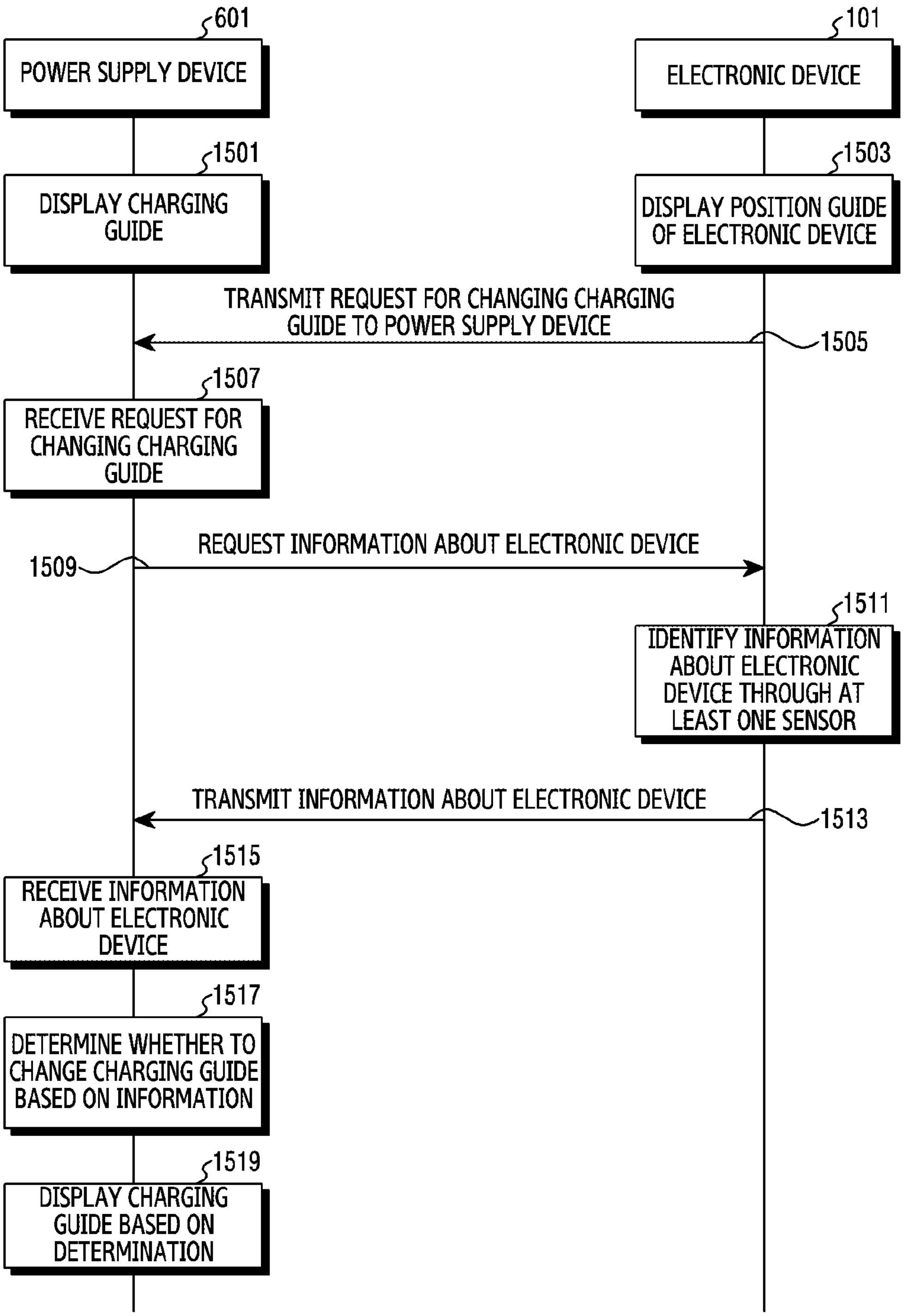
FIG. 15A is a signal flow diagram illustrating an example operation of displaying a charging guide of a power supply device in response to a request for changing a charging guide of an electronic device according to an embodiment.

FIG. 15A is a signal flow diagram illustrating operation of displaying a charging guide of a power supply device in response to a request for changing the charging guide of an electronic device according to an embodiment.

Referring to FIG. 15A, the power supply device 601 according to an embodiment may display a charging guide in operation 1501.

According to an embodiment, the electronic device 101 may display position guide of the electronic device 101 in operation 1503. For example, if received first power is less than threshold power for charging the electronic device 101, the electronic device 101 may display, on a flexible display 220 of the electronic device 101, a position guide requesting changing of the position of the electronic device 101.

According to an embodiment, the electronic device 101 may transmit a request for changing the charging guide to the power supply device 601 in operation 1505. For example, if the received first power is still less than the threshold power value even when the electronic device 101 is disposed in the area within the charging guide, the electronic device 101 may request the power supply device 601 to change the charging guide.

According to an embodiment, the power supply device 601 may receive a request for changing the charging guide transmitted from the electronic device 101 in operation 1507. In an embodiment, the power supply device 601 may request information about the electronic device 101 in operation 1509. In an embodiment, the information about the electronic device 101 may include at least one of the type of the electronic device 101 (e.g., bar type or foldable type), information about power received by the electronic device 101, information about threshold power of the electronic device 101, or a positional relationship between the electronic device 101 and the power supply device 601.

According to an embodiment, the electronic device 101 may identify information about the electronic device 101 through at least one sensor in operation 1511. For example, the electronic device 101 may include at least one sensor (e.g., a gyro sensor, an acceleration sensor, and an infrared sensor). In an example, the electronic device 101 may identify information about a positional relationship (e.g., an angle or direction between the first portion 211 and the second portion 212 of the housing 210) of the electronic device 101 through a gyro sensor and/or an acceleration sensor. As another example, the electronic device 101 may identify information about the relative distance between the power supply device 601 and the electronic device 101 using an infrared sensor.

According to an embodiment, the electronic device 101 may transmit information about the electronic device 101 in operation 1513.

Although it has been described in the embodiment in FIG. 15A that the power supply device 601 requests information about the electronic device 101 in operation 1509 and that the electronic device 101 transmits information about the electronic device 101 in operation 1513, this is only an example, and an operation (e.g., operations 1509 to 1515) in which the power supply device 601 requests and receives information about the electronic device 101 may be omitted. For example, even if the power supply device 601 does not separately request information about the electronic device 101 that needs to be identified for changing the guide, the electronic device 101 may transmit simultaneously transmit the information about the electronic device 101 when transmitting the request for changing the guide in operation 1505. In this case, the operation of the power supply device 601 requesting and receiving information about the electronic device 101 in operations 1509 to 1515 may be omitted. As another example, in response to the guide change request from the electronic device 101, the power supply device 601 may determine whether to change the charging guide, based on prestored information, instead of newly obtaining information about the electronic device 101. In this case, the operation of the power supply device 601 requesting and receiving information about the electronic device 101 in operations 1509 to 1515 may be omitted.

In an embodiment, the power supply device 601 may receive information about the electronic device 101 in operation 1515. The power supply device 601 may determine whether to change the charging guide, based on the information, in operation 1517. In an embodiment, the power supply device 601 may display a charging guide, based on the determination, in operation 1519.

Figure 15B:
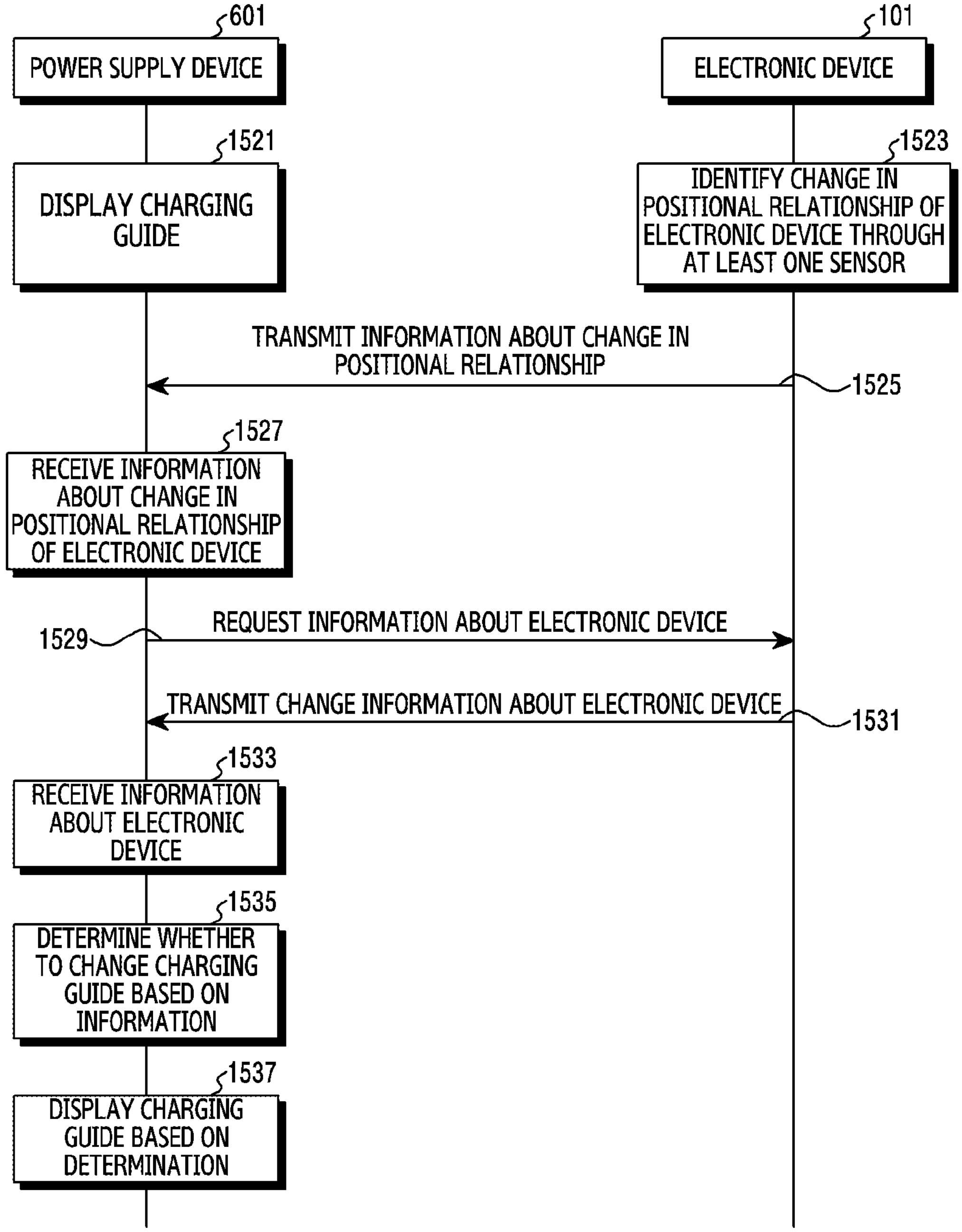
FIG. 15B is a signal flow diagram illustrating an example operation of displaying a charging guide of a power supply device according to identification of a change in a positional relationship of an electronic device according to an embodiment.

FIG. 15B is a signal flow diagram illustrating an example operation of displaying a charging guide of a power supply device according to identification of a change in a positional relationship of an electronic device according to an embodiment.

Referring to FIG. 15B, the power supply device 601 according to an embodiment may display a charging guide in operation 1521.

According to an embodiment, the electronic device 101 may identify a change in the positional relationship of the electronic device 101 through at least one sensor in operation 1523. For example, a relative distance between the electronic device 101 and the power supply device 601 may be increased or reduced by a user. The electronic device 101 may include a gyro sensor and/or an acceleration sensor, and a change in the positional relationship between the electronic device 101 and the power supply device 601 may be identified using the gyro sensor and/or the acceleration sensor. As another example, the folding angle formed between the first portion 211 and the second portion 212 of the electronic device 101 may be changed by the user. The electronic device 101 may identify a change in the positional relationship of the electronic device 101 depending on a change in the folding angle using a gyro sensor and/or an acceleration sensor.

According to an embodiment, in operation 1525, the electronic device 101 may transmit information about the change in the positional relationship to the power supply device 601. In an embodiment, the power supply device 601 may receive information about the change in the positional relationship of the electronic device 101 in operation 1527.

According to an embodiment, the power supply device 601 may request changed information about the electronic device 101 in operation 1529. In an embodiment, the information about the electronic device 101 may include at least one of information about the power received by the electronic device 101, information about threshold power of the electronic device 101, or a positional relationship (e.g., distance) between the electronic device 101 and the power supply device 601.

According to an embodiment, the electronic device 101 may transmit changed information about the electronic device 101 in operation 1531. For example, the electronic device 101 may transmit information about the reception power changed as the relative distance from the power supply device 601 increases. As another example, as the angle formed between the first portion 211 and the second portion 212 of the housing 210 of the electronic device 101 changes, information about the changed reception power may be transmitted. In an embodiment, the power supply device 601 may receive information about the electronic device 101 in operation 1533. In an embodiment, the power supply device 601 may determine whether to change the charging guide, based on the information, in operation 1535. In an embodiment, the power supply device 601 may display a charging guide, based on the determination, in operation 1537.

Figure 16A:
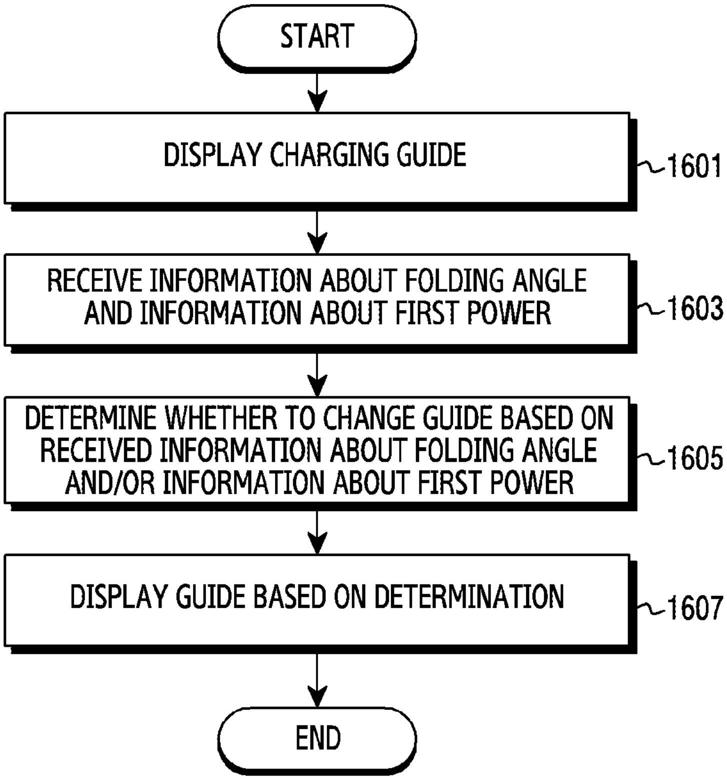
FIG. 16A is a flowchart illustrating an example operation in which a power supply device changes a charging guide depending on a folding angle of an electronic device according to an embodiment.

FIG. 16A is a flowchart illustrating an example operation in which a power supply device changes a charging guide depending on a folding angle of an electronic device according to an embodiment.

Referring to FIG. 16A, the power supply device 601 according to an embodiment may display a charging guide in operation 1601. For example, the power supply device 601 may display a guide having a circular shape along the periphery of the power supply device 601.

According to an embodiment, the power supply device 601 may receive information about the folding angle of the electronic device 101 and information about the first power in operation 1603. For example, the user may change the angle formed between the first portion 211 and the second portion 212 of the housing 210 while the electronic device 101 is being charged. In an example, the electronic device 101 may include at least one sensor (e.g., a gyro sensor or an acceleration sensor) and identify that the folding angle between the first portion 211 and the second portion 212 has been changed through the at least one sensor. The electronic device 101 may transmit information about the folding angle to the power supply device 601. As another example, the electronic device 101 may transmit information about the first power received from the power supply device 601 to the power supply device 601.

According to an embodiment, the power supply device 601 may determine whether to change the charging guide, based on the received information about the folding angle and/or information about the first power in operation 1605. For example, if the electronic device 101 is in a folded state in consideration of the folding angle of the electronic device 101, the power supply device 601 may determine that the power received by the electronic device 101 will be reduced due to the influence of the flexible display 220. Accordingly, the power supply device 601 may determine to reduce the width of the charging guide in order to increase transmission efficiency of power to the electronic device 101.

According to an embodiment, the power supply device 601 may display a charging guide, based on the determination about whether to change the charging guide in operation 1607. For example, if it is determined to change the charging guide, the power supply device 601 may change the shape of the charging guide or adjust the width of the charging guide. As another example, if it is determined not to change the charging guide, the power supply device 601 may display the previously displayed charging guide as it is.

Figure 16B:
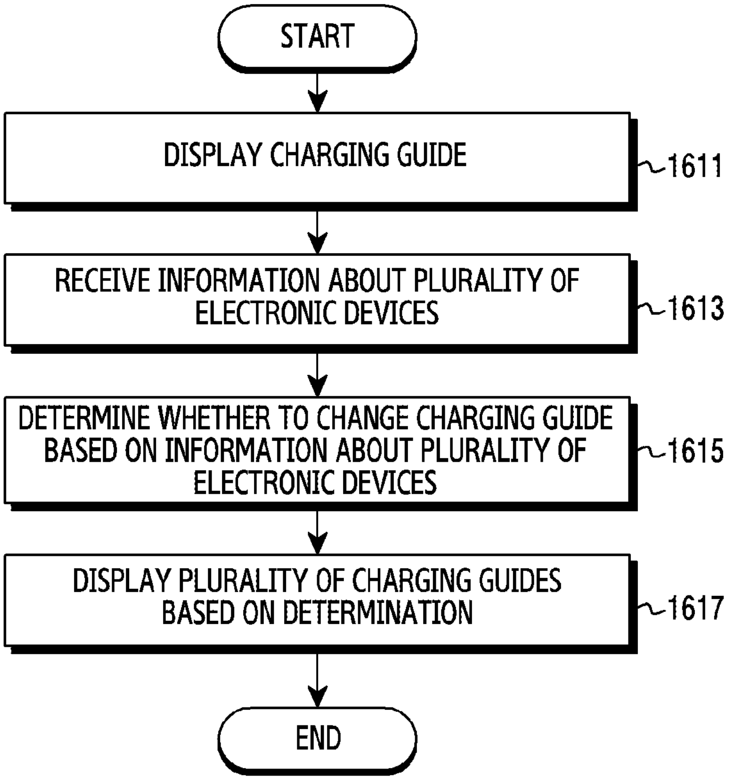
FIG. 16B is a flowchart illustrating an example operation for determining whether to change a guide, based on information on a positional relationship between a plurality of electronic devices, when a power supply device is electrically connected to a plurality of electronic devices according to an embodiment.

FIG. 16B is a flowchart illustrating an example operation for determining whether to change a guide, based on information on a positional relationship between a plurality of electronic devices, when a power supply device is electrically connected 5 to a plurality of electronic devices according to an embodiment.

Referring to FIG. 16B, a power supply device 601 according to an embodiment may display a charging guide in operation 1611. For example, the power supply device 601 may display a guide having a circular shape along the periphery of the power supply device 601. In an embodiment, the power supply device 601 may be connected to a plurality of electronic devices, and, in this case, display a plurality of charging guides for the plurality of electronic devices. For example, in the case where a first electronic device among the plurality of electronic devices is a wearable electronic device (e.g., a smart watch) and where a second electronic device thereof is the electronic device 101, the wireless charging coils included in the first electronic device may have different sizes from those of the wireless charging coils 330 of the electronic device 101. Accordingly, even if the first electronic device and the electronic device 101 are positioned at substantially the same distance from the power supply device 601, the magnitude of power received by the first electronic device and the electronic device 101 may be different from each other. Accordingly, the power supply device 601 may display a plurality of charging guides corresponding to the plurality of electronic devices. In an embodiment, the power supply device 601 may display one charging guide, regardless of the types of the plurality of electronic devices.

According to an embodiment, the power supply device 601 may receive information about a plurality of electronic devices in operation 1613. For example, information about a plurality of electronic devices may include at least one piece of information about wireless charging coils of a plurality of electronic devices, information about the threshold power required to charge batteries of a plurality of electronic devices, information about the types of a plurality of electronic devices (e.g., bar type, foldable type, or smartwatch), information about the relative distance between the power supply device 601 and each of the plurality of electronic devices, or information about power received by each of the plurality of electronic devices. The information about the plurality of electronic devices may be stored in a memory (e.g., the memory 130 in FIG. 1).

According to an embodiment, the power supply device 601 may determine whether to change the charging guide, based on the information about the plurality of electronic devices received in operation 1615. In an embodiment, determining whether to change the charging guide may indicate determining whether to change the number and/or size of the charging guide to be displayed by the power supply device 601. For example, the power supply device 601 may determine to reduce the widths of the plurality of charging guides in order to increase transmission efficiency of power to the plurality of electronic devices.

In an embodiment, an example of changing the number of charging guides by the power supply device 601 is as follows. For example, although the power supply device 601 displays a plurality of charging guides in operation 1611, if there is only one electronic device connected to the power supply device 601, the power supply device 601 may display only one charging guide. As another example, although the power supply device 601 displays one charging guide in operation 1611, if the power supply device 601 is connected to a plurality of electronic devices, the power supply device 601 may display a plurality of charging guides. According to an embodiment, the power supply device 601 may display a plurality of charging guides corresponding to a plurality of electronic devices, based on the determination of whether to change the charging guide, in operation 1617. For example, if it is determined to change the charging guide, the power supply device 601 may change the shape of the charging guide or adjust the width of the charging guide. As another example, if it is determined not to change the charging guide, the power supply device 601 may display the previously displayed charging guide as it is.

According to an embodiment, in the case of displaying a plurality of charging guides, the power supply device 601 may display the charging guides in consideration of types of electronic devices and/or positional relationships with the electronic devices.

For example, a first electronic device may be a wearable device (e.g., an earbud), and a second electronic device may be a mobile communication device (e.g., a mobile phone). In an example, if there is no change in the positional relationship between the first electronic device and the second electronic device (e.g., the relative distance with respect to the power supply device 601), the power supply device 601 may display a plurality of charging guides, based on the types of the first electronic device and the second electronic device. For example, the second electronic device may include a larger wireless charging coil than the first electronic device, and the power supply device 601 may display a plurality of charging guides by considering that the first electronic device includes a larger wireless charging coil.

As another example, if the positional relationship between the first electronic device and the power supply device 601 is changed, but if the positional relationship between the second electronic device and the power supply device 601 is not changed, the power supply device 601 may display a first charging guide in consideration of the changed positional relationship with the first electronic device and the type of the first electronic device (e.g., a wearable device). On the other hand, the power supply device 601 may display a second charging guide, based on the type of the second electronic device (e.g., a mobile communication device), because the positional relationship with the second electronic device is not changed.

As another example, if both the positional relationship between the first electronic device and the power supply device 601 and the positional relationship between the second electronic device and the power supply device 601 are changed, the power supply device 601 may display a first charging guide in consideration of both the changed positional relationship and the type (e.g., a wearable device) of the first electronic device. In addition, the power supply device 601 may display a second charging guide in consideration of both the changed positional relationship and the type (e.g., a mobile communication device) of the second electronic device.

Figure 16C:
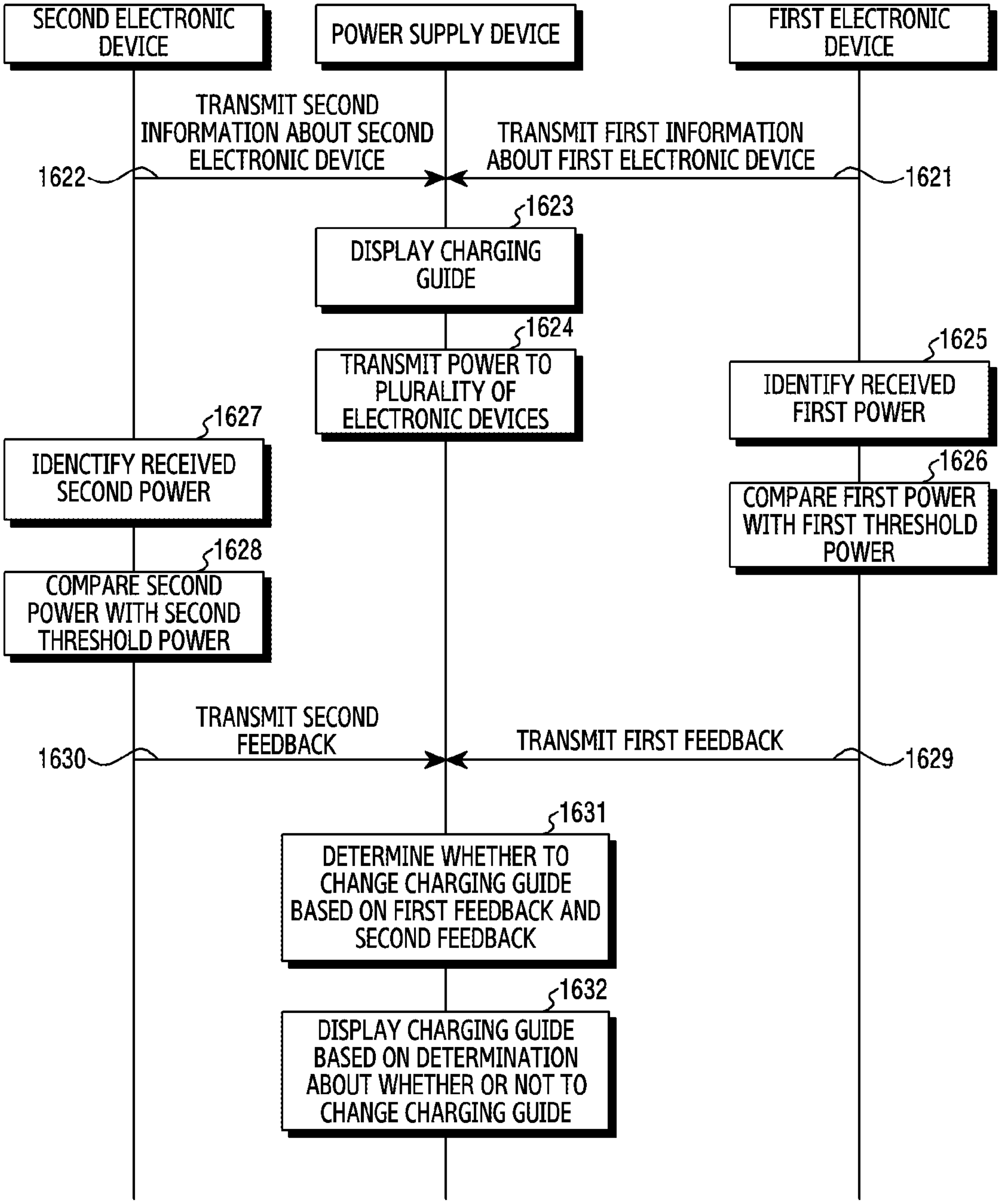
FIG. 16C is a signal flow diagram illustrating an example operation of a first electronic device and a second electronic device that transmit feedback to a power supply device, based on received power or a distance to the power supply device, according to an embodiment.

FIG. 16C is a diagram illustrating an example operation of a first electronic device and a second electronic device that transmit feedback to a power supply device, based on received power or a distance to the power supply device, according to an embodiment.

Referring to FIG. 16C, according to an embodiment, a first electronic device (e.g., the electronic device 101) may transmit first information about the first electronic device to the power supply device 601 in operation 1621. In an embodiment, the first information about the first electronic device may include the type of the first electronic device, the number and/or sizes of the wireless charging coils included in the first electronic device, a positional relationship of the first electronic device, and/or first threshold power of the first electronic device. In an embodiment, the second electronic device may transmit second information about the second electronic device in operation 1622. In an embodiment, the second information about the second electronic device may include the type of the second electronic device, the number and/or sizes of the wireless charging coils included in the second electronic device, a positional relationship of the second electronic device, and/or second threshold power of the second electronic device.

According to an embodiment, the power supply device 601 may display charging guides in operation 1623. In an embodiment, the power supply device 601 may display charging guides, based on the first information and the second information. For example, the power supply device 601 may display a first charging guide, based on the positional relationship of the first electronic device (e.g., the relative distance between the first electronic device and the power supply device 601 or the angle between housings if the first electronic device is a foldable device) and the type of the first electronic device. As another example, the power supply device 601 may display a second recharging guide, based on the positional relationship of the second electronic device and/or the type of the second electronic device.

According to an embodiment, the power supply device 601 may transmit power to a plurality of electronic devices (e.g., the first electronic device and the second electronic device) in operation 1624. For example, the power supply device 601 may transmit first transmission power to the first electronic device. As another example, the power supply device 601 may transmit second transmission power to the second electronic device. In an embodiment, the first transmission power and the second transmission power may be the same or different.

According to an embodiment, the first electronic device may receive first power from the power supply device 601 in operation 1625. The first electronic device may compare the identified first power with first threshold power required to charge the first electronic device in operation 1626. In an embodiment, the first electronic device may identify a relative first distance to the power supply device 601, instead of identifying the first power received from the power supply device 601. In this case, the first electronic device may compare the first distance with a first threshold distance required to charge the first electronic device.

According to an embodiment, the second electronic device may receive second power from the power supply device 601 in operation 1627. The second electronic device may compare the identified second power with second threshold power required to charge the second electronic device in operation 1628. In an embodiment, the second electronic device may identify a relative second distance to the power supply device 601, instead of identifying the second power received from the power supply device 601. In this case, the first electronic device may compare the second distance with a second threshold distance required to charge the second electronic device.

According to an embodiment, the first electronic device may transmit first feedback to the power supply device 601 in operation 1629. For example, the first feedback may include information requesting the power supply device 601 to change the charging guide. For example, if the first power is lower than the first threshold power, the first electronic device may transmit first feedback including information requesting the power supply device 601 to change the charging guide. As another example, the first feedback may include information stating that the first power is greater than the first threshold power.

In an embodiment, the second electronic device may transmit second feedback to the power supply device 601 in operation 1630. For example, the second feedback may include information requesting the power supply device 601 to change the charging guide. As another example, the second feedback may include information stating that the second power is greater than the second threshold power.

According to an embodiment, the power supply device 601 may determine whether to change the charging guide, based on the first feedback and the second feedback, in operation 1631. For example, if the received first feedback includes information that requests changing of the charging guide, the power supply device 601 may determine to change the position where the charging guide is displayed. As another example, the power supply device 601 may determine not to change the charging guide if the received first feedback includes information stating that the first power is greater than the first threshold power.

In an embodiment, the power supply device 601 may display a charging guide, based on the determination of whether to change the charging guide, in operation 1632. For example, the power supply device 601 may display a first charging guide, which corresponds to the first electronic device, having a reduced width.

Figure 17:
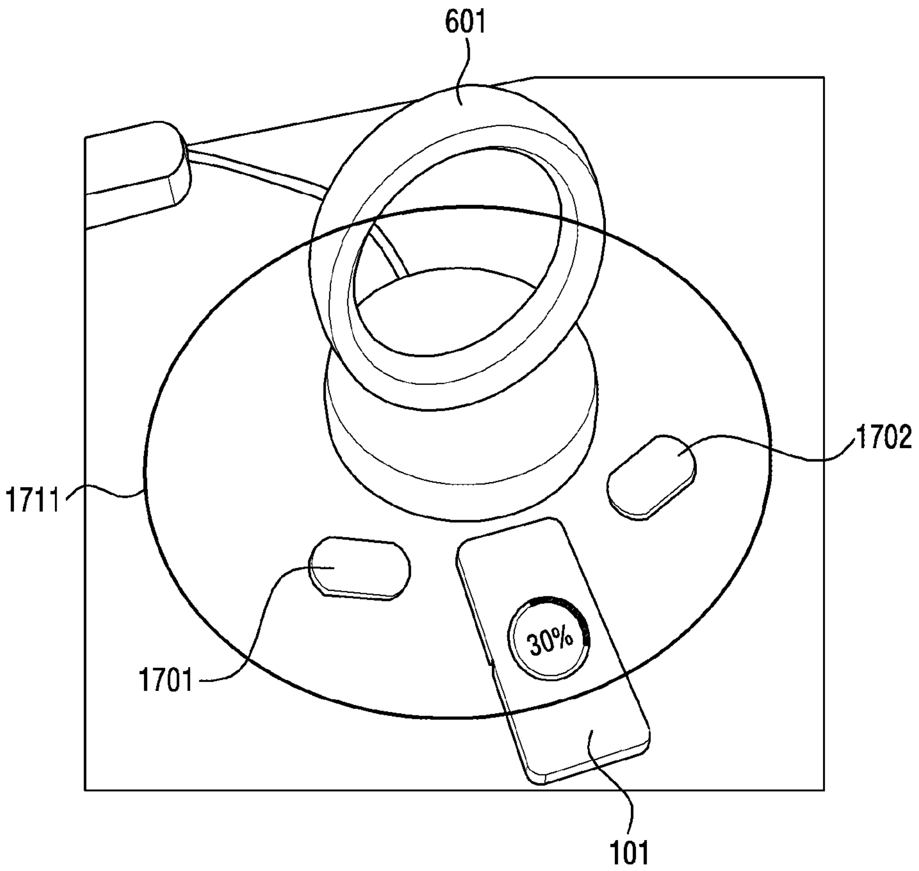
FIG. 17 is a diagram illustrating a power supply device displaying a single charging guide according to an embodiment.

FIG. 17 is a perspective view illustrating an example power supply device displaying a single charging guide according to an embodiment.

Referring to FIG. 17, a power supply device 601 according to an embodiment may display a single first charging guide 1711 for a plurality of electronic devices. For example, for an electronic device 101, a first wearable electronic device 1701, and a second wearable electronic device 1702, which are connected to the power supply device 601, the power supply device 601 may display a first charging guide 1711. In an embodiment, an area in which first power received by a plurality of electronic devices is greater than threshold power of the plurality of electronic devices may be divided based on the first charging guide 1711. For example, the area inside the first charging guide 1711 may indicate the area in which the received first power is greater than first threshold power for charging the first wearable device 1701. As another example, an area inside the second charging guide based on the first charging guide 1711 may indicate the area in which the received second power is greater than second threshold power for charging the second wearable device 1702.

According to an embodiment, the first charging guide 1711 may have various shapes. For example, the first charging guide 1711 may have a circular shape with the power supply device 601 as a center. As another example, the first charging guide 1711 may have a square or rectangular shape.

Figure 18:
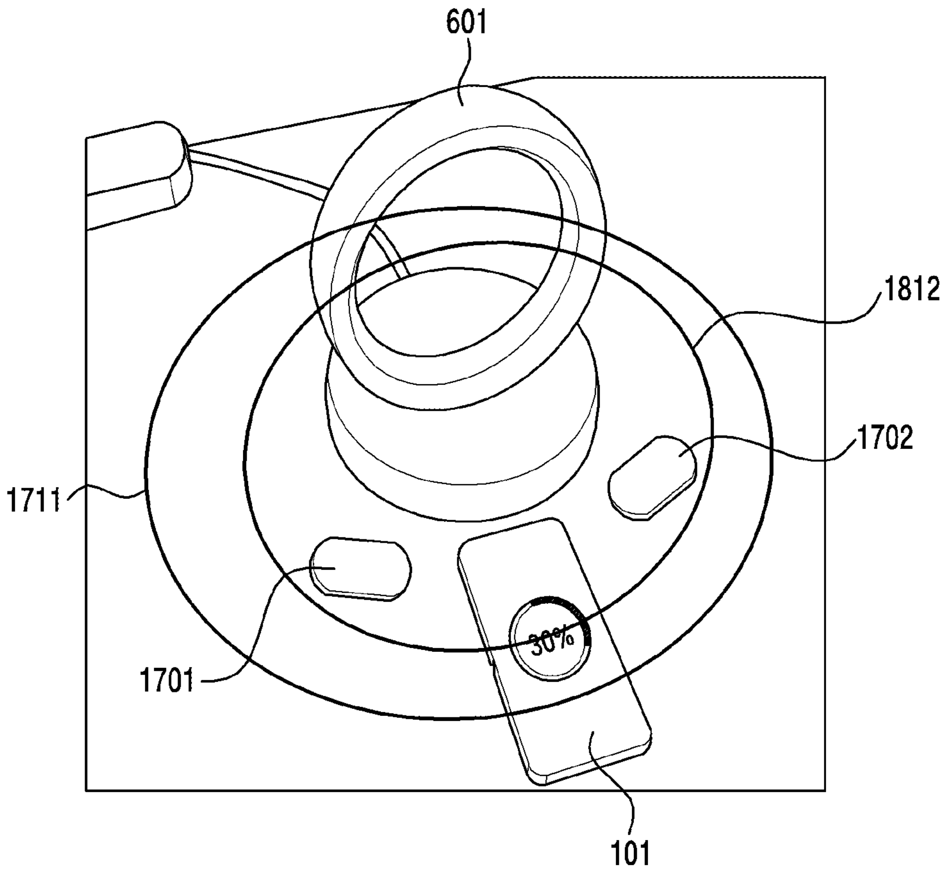
FIG. 18 is a diagram illustrating a power supply device displaying a plurality of charging guides corresponding to a plurality of electronic devices according to an embodiment.

FIG. 18 is a diagram illustrating an example power supply device displaying a plurality of charging guides corresponding to a plurality of electronic devices according to an embodiment.

Referring to FIG. 18, a power supply device 601 according to an embodiment a plurality of charging guides 1711 and 1812 corresponding to a plurality of electronic devices (e.g., the electronic device 101, the first wearable electronic device 1701, and the second wearable electronic device 1702). For example, the power supply device 601 may display a first charging guide 1711 corresponding to the electronic device 101. As another example, the power supply device 601 may display a second charging guide 1812 corresponding to the first wearable electronic device 1701 and/or the second wearable electronic device 1702. In an embodiment, the power supply device 601 may display the plurality of charging guides 1711 and 1812 corresponding to the plurality of electronic devices, thereby reducing or preventing some of the plurality of electronic devices from failing to be charged. For example, the first wearable device 1701 may have fewer or smaller coil for wireless charging than the electronic device 101. Accordingly, if the power supply device 601 displays only a single charging guide (e.g., the first charging guide 1711), the first wearable device 1701 may have reduced charging efficiency or fail to be charged. On the other hand, since the power supply device 601 according to an embodiment displays a plurality of charging guides 1711 and 1812 corresponding to a plurality of electronic devices, the power supply device 601 may reduce or prevent some of the plurality of electronic devices from failing to be charged.

Figure 19A:
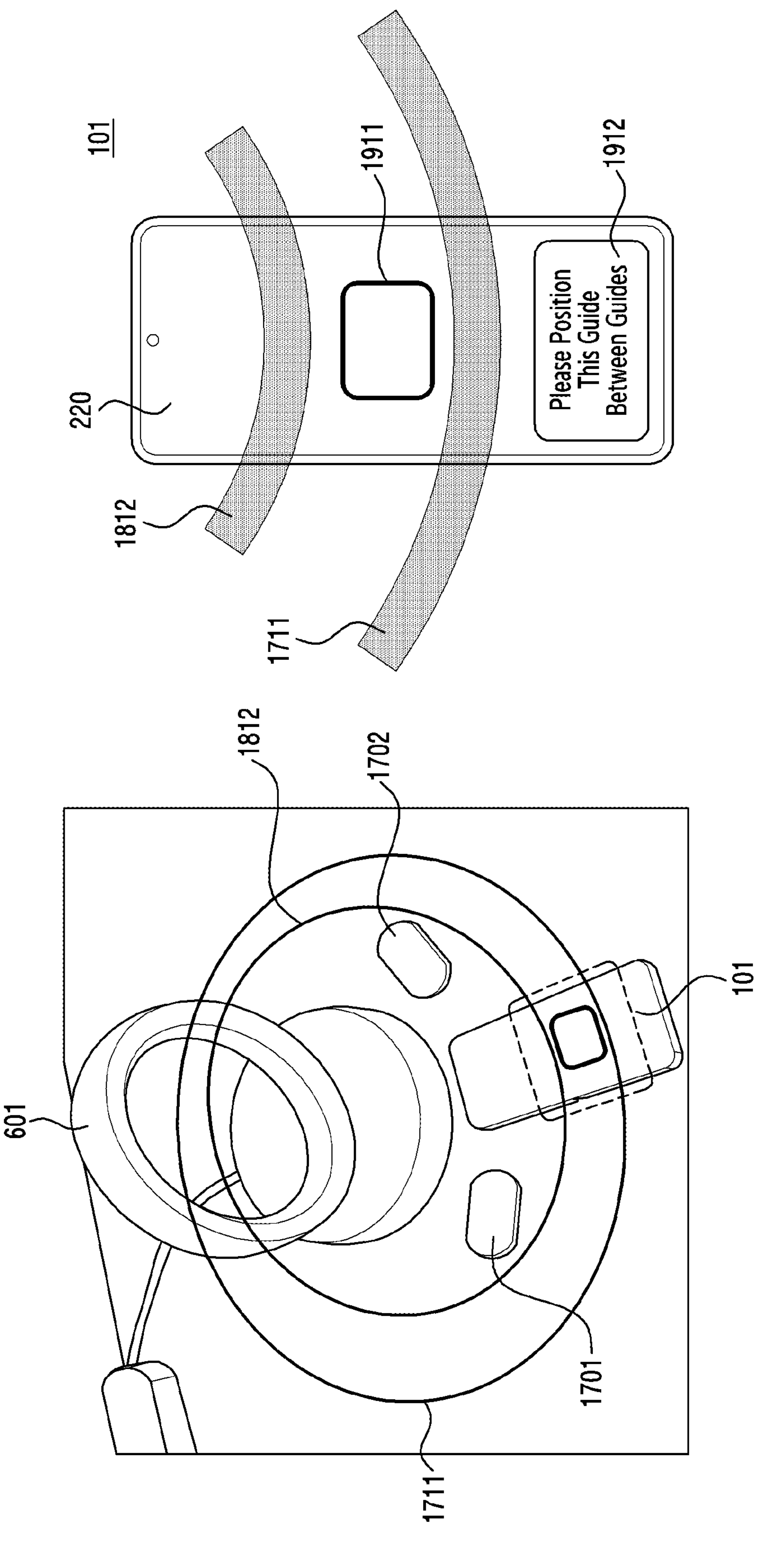
FIG. 19A is a diagram illustrating a position guide of an electronic device according to an embodiment.

FIG. 19A is a diagram illustrating an example position guide of an electronic device according to an embodiment.

Referring to FIG. 19A, an electronic device 101 according to an embodiment may display position guides 1911 and 1912 on a flexible display 220. In an embodiment, the position guides 1911 and 1912 may correspond to a user interface displayed on the flexible display.

In an embodiment, the electronic device 101 may display the position guides 1911 and 1912 on the flexible display 220, thereby providing a user with information about the position where the electronic device 101 to be charge should be placed. For example, the electronic device 101 may display a first position guide 1911 and a second position guide 1912 on the flexible display 220. The electronic device 101 may provide information about the first position guide 1911 to the second position guide 1912 through text. For example, the electronic device 101 may display the sentence "Please place this guide between the guides" in the second position guide 1912 to provide information about the first position guide 1911 to the user.

According to an embodiment, the second charging guide 1812 may correspond to the first wearable device 1701 and/or the second wearable device 1702, and also guide the position where the electronic device 101 must be placed together with the first charging guide 1811.

Figure 19B:
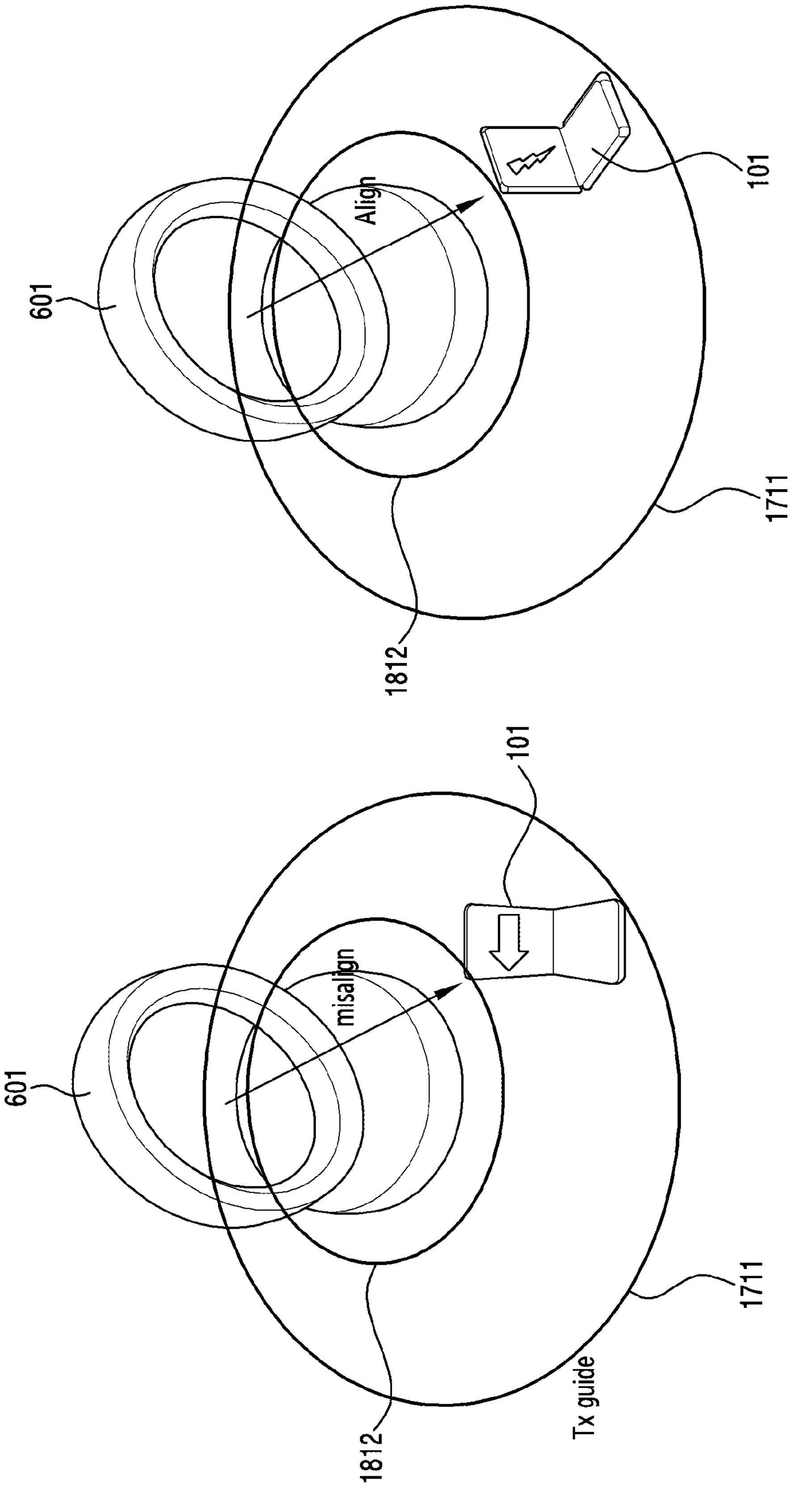
FIG. 19B is a diagram illustrating a change in display of a position guide of an electronic device depending on a direction in which the electronic device is directed according to an embodiment.

FIG. 19B is a diagram illustrating an example change in display of a position guide of an electronic device depending on a direction in which the electronic device is directed according to an embodiment.

Referring to FIG. 19B, if an electronic device 101 according to an embodiment is misaligned with the power supply device 601, the electronic device 101 may display, on the flexible display 220, a user interface for requesting changing of the position of the electronic device 101. For example, the electronic device 101 may display, on the flexible display 220, an indicator (e.g., an arrow) indicating the direction in which the electronic device 101 needs to be moved in order to align the electronic device 101. As another example, the electronic device 101 may display text requesting moving of the position of the electronic device 101 on the flexible display 220.

According to an embodiment, if the electronic device 101 is aligned with the power supply device by a user's manipulation, the electronic device 101 may display a user interface indicating that charging is in progress on the flexible display 220. For example, the electronic device 101 may display an icon (e.g., a lightning shape) or display the text "charging" on the flexible display 220.

Figure 20A:
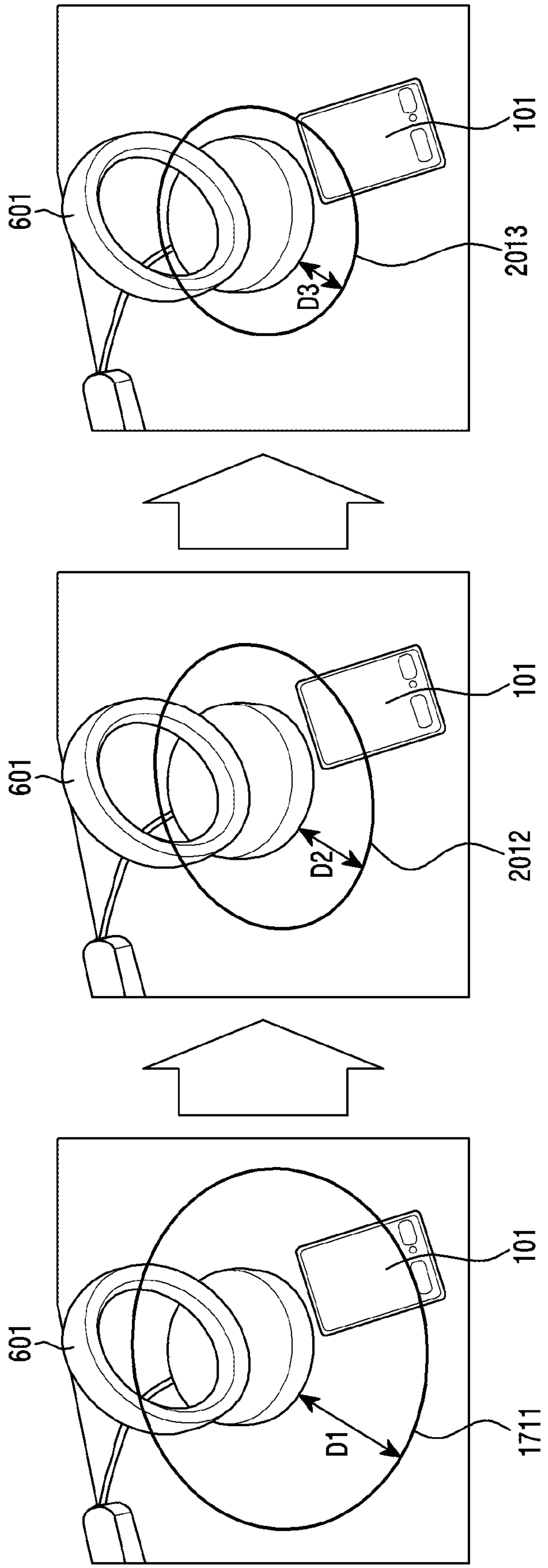
FIG. 20A is a diagram illustrating charging guides of a power supply device, which have various widths, according to an embodiment.

FIG. 20A is a diagram illustrating example charging guides of a power supply device, which have various widths, according to an embodiment.

Referring to FIG. 20A, a power supply device 601 according to an embodiment may display charging guides 1711, 2012, and 2013 having various widths, based on information about the electronic device 101. In an embodiment, the information about the electronic device 101 may include at least one of a positional relationship between the electronic device 101 and the power supply device 601, a positional relationship between a first portion 211 and a second portion 212 of a housing 210 of the electronic device 101, threshold power of the electronic device 101, or information about first power received by the electronic device 101. For example, the power supply device 601 may display a first charging guide 1711 having a first width D1. As another example, the power supply device 601 may display a second charging guide 2012 having a second width D2. As another example, the power supply device 601 may display a third charging guide 2013 having a third width D3.

According to an embodiment, if the first power received by the electronic device 101 is less than the threshold power while the power supply device 601 is displaying the first charging guide 1711 having the first width D1, the power supply device may change the first charging guide to the second charging guide 2012 having the second width D2 and display the same. In an embodiment, if the first power received by the electronic device 101 is less than the threshold power while the power supply device 601 is displaying the second charging guide having the second width D2, the power supply device may change the second charging guide to the third charging guide 2013 having the third width D3 and display the same.

Figure 20B:
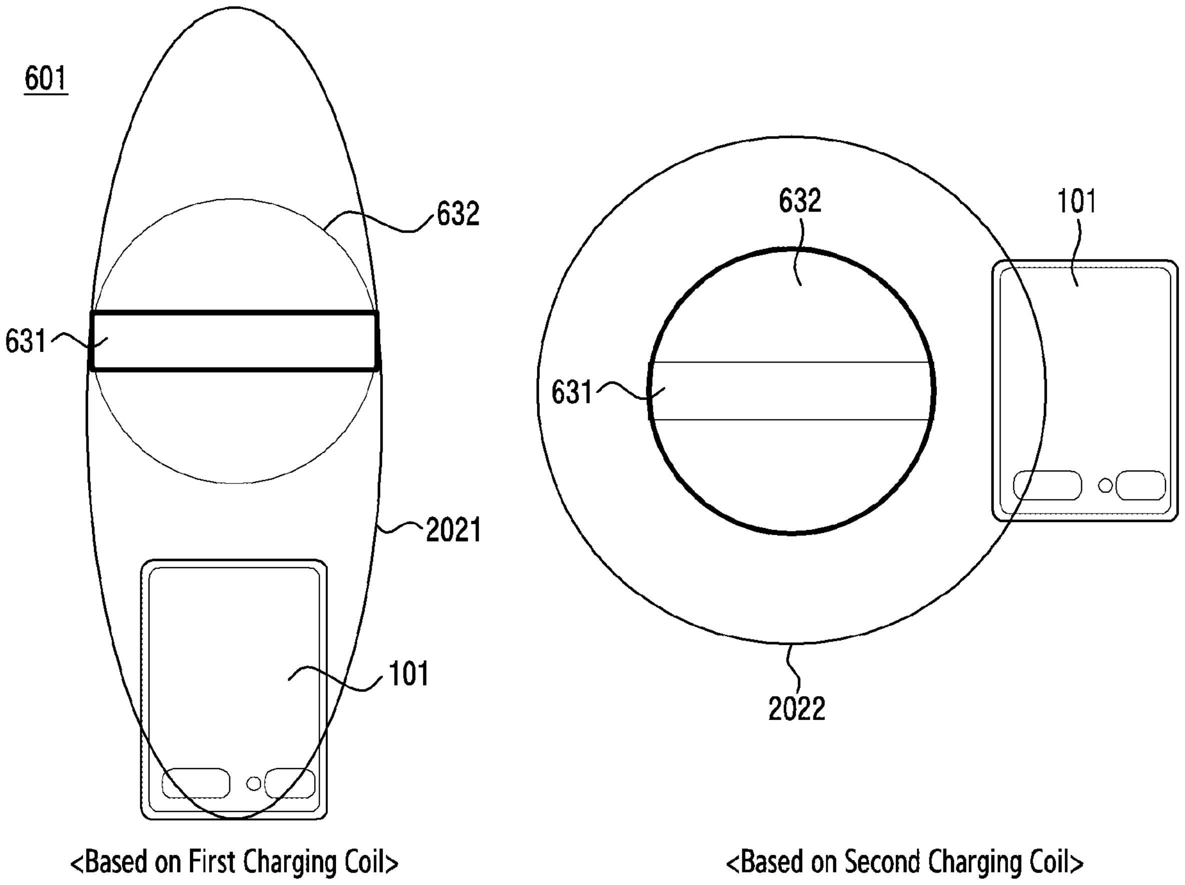
FIG. 20B is a diagram illustrating an example method of displaying a charging guide depending on charging coils for transmitting power according to an embodiment.

FIG. 20B is a diagram illustrating an example method of displaying a charging guide depending on charging coils for transmitting power according to an embodiment.

Referring to FIG. 20B, a power supply device 601 according to an embodiment may display a charging guide differently depending on charging coils 630 that transmit power to the electronic device 101. For example, if power is transmitted to the electronic device 101 using a first charging coil 631, the power supply device 601 may have relatively high power transmission efficiency in a specified direction (e.g., the +x direction and the −x direction). Therefore, in the case of transmitting power using the first charging coil 631, the power supply device 601 may display the first charging guide 2021 further away in a specified direction (e.g., the +x direction and the −x direction). As another example, in the case of transmitting power to the electronic device 101 using a second charging coil 632, the power supply device 601 may transmit power uniformly in all directions. Accordingly, the power supply device 601 may display the second charging guide 2022 uniformly in the case of transmitting power using the second charging coil 632.

Figure 21:
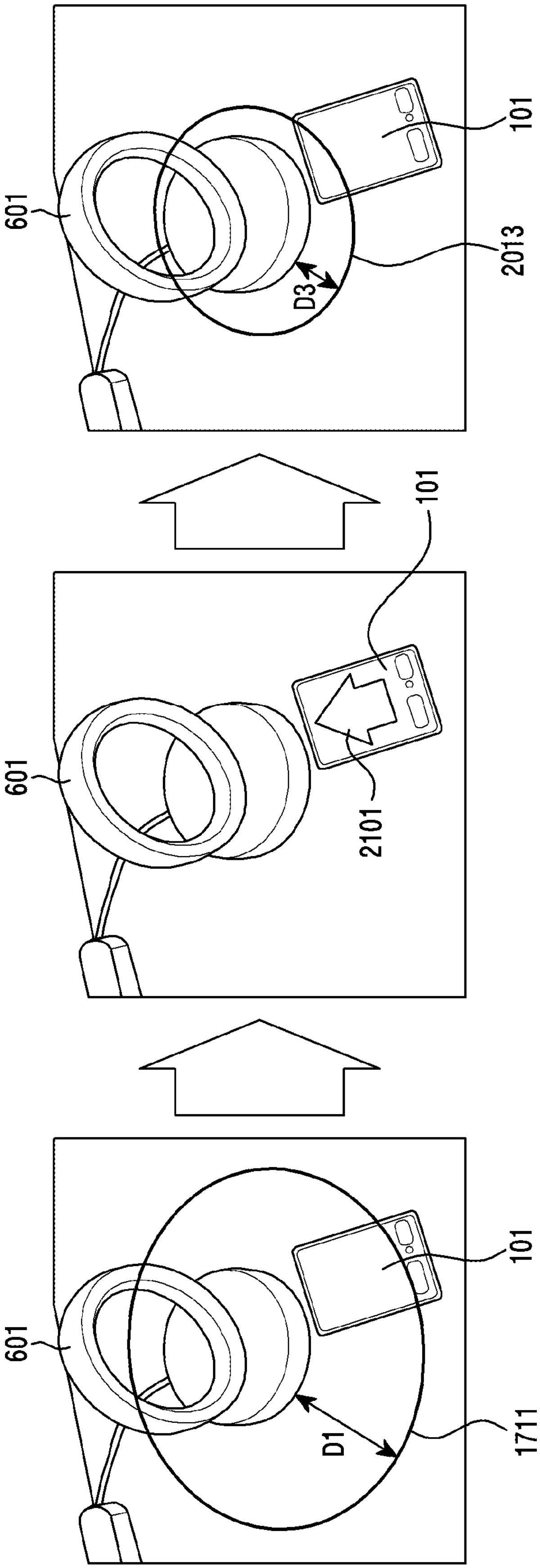
FIG. 21 is a diagram illustrating a power supply device displaying a position guide on an electronic device according to an embodiment.

FIG. 21 is a diagram illustrating an example power supply device displaying a position guide on an electronic device according to an embodiment.

Referring to FIG. 21, a power supply device 601 according to an embodiment may display a first charging guide 1711 for the electronic device 101. In an embodiment, the electronic device 101 may compare the threshold power stored in the memory 130 with the first power received from the power supply device 601 and request the power supply device 601 to change the first charging guide 1711. In an embodiment, the power supply device 601 may display a second charging guide 2101 on the outside of the electronic device 101 in response to reception of the request. The second charging guide 2101 may be displayed on the outside of the electronic device 101 using an LED, and the second charging guide 2101 may have a shape requesting changing of the position of the electronic device 101. For example, the second charging guide 2101 may have an arrow shape toward the power supply device 601.

According to an embodiment, the power supply device 601 may display a third charging guide 2013 having a third width D3 after displaying the second charging guide 2101.

Figure 22:
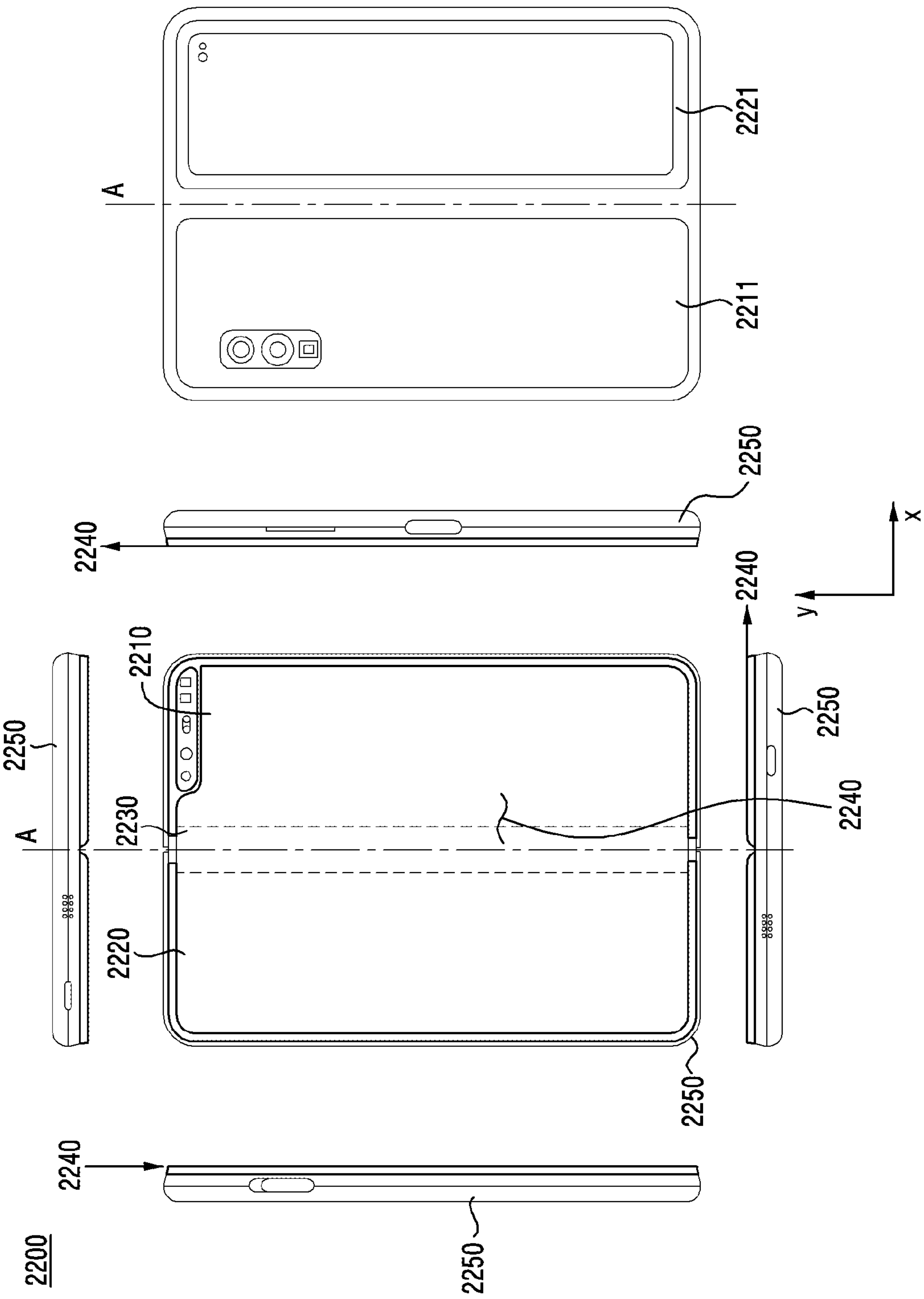
FIG. 22 is a diagram illustrating a foldable electronic device according to an embodiment In connection with the description of the drawings, the same or similar reference numerals may be used for the same or similar elements.

FIG. 22 is a diagram illustrating an example foldable electronic device according to an embodiment.

Referring to FIG. 22, a foldable electronic device 2200 may include a first housing 2210, a second housing 2220, a connection member 2230, a flexible display 2240, and a metal frame 2250.

According to an embodiment, the first housing 2210 and the second housing 2220 may be rotatably connected by a connecting member 2230. For example, the connecting member 2230 may have a hinge structure including a hinge driver.

According to an embodiment, the flexible display 2240 forms the front surface of the foldable electronic device 2200 and may be disposed over the first housing 2210 and the second housing 2220. In an example, when the first housing 2210 and the second housing 2220 rotate about the connecting member 2230 to face each other, at least a portion of the flexible display 2240 may be bent.

According to an embodiment, the rear surface of the first housing 2210 may be formed by a first rear cover 2211, and the rear surface of the second housing 2220 may be formed by a second rear cover 2221. In an example, the first rear cover 2211 and the second rear cover 2221 may protect the first housing 2210 and the second housing 2220 from external impact.

The content of the wireless charging described with reference to FIGS. 1 to 21 in The disclosure may also be applied to the foldable electronic device 2200 illustrated in FIG. 22.

An electronic device according to various example embodiments of the disclosure may include: a housing, a wireless charging circuit, and at least one processor electrically connected to the wireless charging circuit, wherein the housing may include a first portion and a second portion, wherein the second portion may change in a position relative to the first portion depending on the state of the electronic device, wherein the at least one processor may be configured to: control the wireless charging circuit to receive first power from a power supply device through a first magnetic field having a first center and control the wireless charging circuit to receive the first power from the power supply device through a second magnetic field having a second center different from the first center based on a positional relationship between the first portion and the second portion of the housing, based on relative positions of the power supply device and the first portion of the housing being fixed.

An electronic device according to an example embodiment may further include a plurality of wireless charging coils disposed inside the housing, wherein the first magnetic field having the first center may be formed by a first wireless charging coil among the plurality of wireless charging coils, and wherein the second magnetic field having the second center may be formed by a second wireless charging coil among the plurality of wireless charging coils.

An electronic device according to an example embodiment may further include a memory, wherein the at least one processor may be configured to: determine a wireless charging coil that receives power from the power supply device from among the plurality of wireless charging coils depending on an angle formed between the first portion and the second portion of the housing and store information about the determined wireless charging coil in the memory.

An electronic device according to an example embodiment may further include: a first wireless charging coil disposed inside the housing, a switch circuit, and a lumped element electrically connected to the switch circuit, wherein the first magnetic field having the first center may be formed by the first wireless charging coil, and wherein the second magnetic field having the second center may be formed by the first wireless charging coil and the lumped element as the at least one processor is configured to control the switch circuit to electrically connect the lumped element and the first wireless charging coil.

According to an example embodiment, the housing may further include a hinge connecting the first portion and the second portion, and the second portion of the housing may be rotatable about a first axis relative to the first portion.

According to an example embodiment, the positional relationship between the first portion and the second portion of the housing may include an angle formed between the first portion and the second portion.

According to an example embodiment, the at least one processor may be configured to: determine whether the first power is greater than threshold power for charging the electronic device and, based on the first power being less than the threshold power, request the power supply device to transmit second power greater than the threshold power.

An electronic device according to an example embodiment may further include: a flexible display disposed on the front of the electronic device, and the at least one processor may be configured to: receive feedback from the power supply device in response to the request and information about the position of the power supply device, and display, on the flexible display, a user interface requesting changing of the position of the electronic device such that the first power becomes greater than the threshold power, based on the received feedback and information.

According to an example embodiment, the user interface may include text or an indicator indicating a direction of position movement of the electronic device.

An electronic device according to an example embodiment may further include at least one sensor, wherein the at least one processor may be configured to identify an angle formed between the first portion and the second portion of the housing using the at least one sensor.

An electronic device according to an example embodiment may further include a wireless communication circuit electrically connected to the at least one processor, wherein the at least one processor may be configured to transmit information about the identified angle formed between the first portion and the second portion to the power supply device using the wireless communication circuit.

According to various example embodiments of the disclosure, a method of operating an electronic device including a housing including a first portion and a second portion connected to the first portion may include: controlling a wireless charging circuit of the electronic device to receive first power from a power supply device based on a first magnetic field having a first center, and controlling the wireless charging circuit to receive the first power from the power supply device based on a second magnetic field having a second center different from the first center and based on a positional relationship between the first portion and the second portion of the housing, based on relative positions of the power supply device and the first portion of the housing being fixed.

According to an example embodiment, the first magnetic field having the first center may be formed by a first wireless charging coil among a plurality of wireless charging coils of the electronic device, and the second magnetic field having the second center may be formed by a second wireless charging coil among the plurality of wireless charging coils.

According to an example embodiment, the first magnetic field having the first center may be formed by a first wireless charging coil of the electronic device, and the second magnetic field having the second center may be formed by the first wireless charging coil and a lumped element as at least one processor of the electronic device controls a switch circuit to electrically connect the lumped element and the first wireless charging coil.

A method of operating an electronic device according to an example embodiment may further include: determining whether the first power is greater than threshold power for charging the electronic device and, based on the first power being less than the threshold power, requesting the power supply device to transmit second power greater than the threshold power.

A method of operating an electronic device according to an example embodiment may further include: receiving feedback from the power supply device in response to the request and information about the position of the power supply device and displaying, on a flexible display, a user interface requesting changing of the position of the electronic device such that the first power becomes greater than the threshold power, based on the received feedback and information.

According to an example embodiment, the user interface may include text or an indicator indicating a direction of position movement of the electronic device.

According to an example embodiment, the positional relationship between the first portion and the second portion of the housing may include an angle formed between the first portion and the second portion.

A method of operating an electronic device according to an example embodiment may further include identifying an angle formed between the first portion and the second portion of the housing using at least one sensor.

A method of operating an electronic device according to an example embodiment may further include transmitting information about the identified angle formed between the first portion and the second portion to the power supply device.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing-comprising a first housing portion and a second housing portion, wherein the second housing portion is connected to the first housing portion and configured to be rotatable with respect to the first housing portion;

a first wireless charging coil disposed at least partially in the housing;

a switch circuit electrically connected with a lumped element;

a wireless charging circuit;

at least one processor, comprising processing circuitry, electrically connected to the wireless charging circuit; and memory storing instructions that, when executed by the at least one processor individually or collectively, cause the electronic device to control the wireless charging circuit to receive first power from a power supply device using the first wireless charging coil disconnected from the lumped element, for an initial wireless charging of the electronic device, identify an angle formed by the first housing portion and the second housing portion, when a relative position between the power supply device and the first housing portion is fixed, and control the wireless charging circuit to receive the first power from the power supply device using the first wireless charging coil connected with the lumped element via the switch circuit, based on the identified angle being within a designated range, wherein the first wireless charging coil disconnected from the lumped element forms a first magnetic field having a first center, and wherein the first wireless charging coil connected with the lumped element forms a second magnetic field having a second center.

2. The electronic device of claim 1, further comprising:

a plurality of wireless charging coils including the first wireless charging coil and a second wireless charging coil, wherein the second wireless charging coil forms a third magnetic field having at third center.

3. The electronic device of claim 2, wherein the instructions, when executed by the at least one processor individually or collectively, cause the electronic device to:

determine a wireless charging coil configured to receive power from the power supply device from among the plurality of wireless charging coils based on the angle, and store information on the determined wireless charging coil in the memory.

4. The electronic device of claim 1, wherein the housing further comprises a hinge connecting the first housing portion and the second housing portion, and wherein the second housing portion of the housing is rotatable about a first axis relative to the first housing portion.

5. The electronic device of claim 1, wherein the instructions, when executed by the at least one processor individually or collectively, cause the electronic device to:

determine whether the first power is greater than a threshold for charging the electronic device, and;

based on the first power being less than the threshold, request the power supply device to transmit second power greater than the threshold.

6. The electronic device of claim 5, further comprising:

a flexible display, wherein the instructions, when executed by the at least one processor individually or collectively, cause the electronic device to:

receive feedback from the power supply device in response to a request for the second power, and information on a position of the power supply device, and control the flexible display to display a user interface requesting changing of a position of the electronic device such that the first power is greater than the threshold, based on the received feedback and the information on the position of the power supply device.

7. The electronic device of claim 6, wherein the user interface comprises text or an indicator indicating a direction of position movement of the electronic device.

8. The electronic device of claim 1, further comprising:

at least one sensor for identifying the angle between the first housing portion and the second housing portion.

9. The electronic device of claim 8, further comprising:

a wireless communication circuit electrically connected to the at least one processor, wherein the instructions, when executed by the at least one processor individually or collectively, cause the electronic device to:

transmit information on the identified angle formed between the first housing portion and the second housing portion to the power supply device using the wireless communication circuit.

10. A method performed by an electronic device comprising a housing comprising a first housing portion and a second housing portion connected to the first housing portion, the method comprising:

controlling a wireless charging circuit of the electronic device to receive first power from a power supply device using a first wireless charging coil disconnected from a lumped element, for an initial wireless charging of the electronic device;

identifying an angle formed by the first housing portion and the second housing portion, when a relative position between the power supply device and the first housing portion is fixed; and controlling the wireless charging circuit to receive the first power from the power supply device using the first wireless charging coil connected with the lumped element via a switch circuit, based on the identified angle being within a designated range, wherein the first wireless charging coil disconnected from the lumped element forms a first magnetic field having a first center, and wherein the first wireless charging coil connected with the lumped element forms a second magnetic field having a second center.

11. The method of claim 10, wherein the electronic device comprises a plurality of wireless charging coils including the first wireless charging coil and a second wireless charging coil, and wherein the second wireless charging coil forms a third magnetic field having a third center.

12. The method of claim 10, further comprising:

determining whether the first power is greater than a threshold for charging the electronic device; and based on the first power being less than the threshold, requesting the power supply device to transmit second power greater than the threshold.

13. The method of claim 12, further comprising:

receiving feedback from the power supply device in response to a request for the second power, and information on a position of the power supply device; and displaying, on a flexible display, a user interface requesting changing of a position of the electronic device such that the first power is greater than the threshold, based on the received feedback and the information on the position of the power supply device.

14. The method of claim 13, wherein the user interface comprises text or an indicator indicating a direction of position movement of the electronic device.

15. The method of claim 10, further comprising:

identifying the angle formed between the first housing portion and the second housing portion of the housing using at least one sensor.

16. The method of claim 15, further comprising:

transmitting information on the identified angle formed between the first housing portion and the second housing portion to the power supply device.

* * * * *